United States Patent [19]
Fujii et al.

[11] Patent Number: 5,146,470
[45] Date of Patent: Sep. 8, 1992

[54] ADAPTIVE DIGITAL FILTER INCLUDING LOW-PASS FILTER

[75] Inventors: Kensaku Fujii, Yamato; Juro Ohga, Kamakura; Hiroyuki Masuda, Sano, all of Japan

[73] Assignee: Fujitsu Limited, Kawasaki, Japan

[21] Appl. No.: 590,376

[22] Filed: Sep. 28, 1990

[30] Foreign Application Priority Data

Sep. 28, 1989 [JP] Japan .................. 1-253004
Nov. 29, 1989 [JP] Japan .................. 1-307423

[51] Int. Cl.⁵ .................................. H04B 1/10
[52] U.S. Cl. ........................ 375/103; 364/724.11; 364/724.12
[58] Field of Search ............ 375/12, 14, 103; 364/724.01, 724.11, 724.12; 370/32, 32.1; 379/406, 410, 411

[56] References Cited

U.S. PATENT DOCUMENTS

| | | | |
|---|---|---|---|
| 4,535,206 | 8/1985 | Falconer | 370/32.1 |
| 4,897,832 | 1/1990 | Suzuki et al. | 379/410 |
| 4,937,813 | 6/1990 | Schenk | 379/410 |
| 4,956,838 | 9/1990 | Gilloire et al. | 370/32.1 |
| 5,029,167 | 7/1991 | Arnon et al. | 370/32.1 |
| 5,042,026 | 8/1991 | Koike et al. | 379/409 |

*Primary Examiner*—Stephen Chin
*Attorney, Agent, or Firm*—Helfgott & Karas

[57] ABSTRACT

An adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the estimation is carried out so that a difference between the output signal and the estimated output signal is reduced. Each of the filter coefficients is extracted by a low-pass filter where the low-pass filter coefficient in the low-pass filter can be set to a constant. Normalization can be carried out in either the input side or the output side of the low-pass filter. Otherwise, the low-pass filter coefficient may be set to $1 - K \cdot X_j(m)^2/r$, where r is set equal to a norm of the sampled input signals in the beginning, and is then set to an integrated power of the sample input signals.

76 Claims, 37 Drawing Sheets

ADAPTIVE DIGITAL FILTER INCLUDING LOW-PASS FILTER

BACKGROUND OF THE INVENTION (1) Field of the Invention

The present invention relates to an adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the estimation is carried out so that a difference between the output signal and the estimated output signal is reduced. The present invention is applicable, in particular, to an echo canceler which cancels (suppresses) an echo signal in a telephone terminal. In telephone terminals which are each connected to a two-way transmission line in telephone network system, a voice signal propagating in one direction in the transmission line can be coupled to the other direction, for example, in two-line to four-line transforming hybrid circuits due to an impedance mismatching, or through open-type speaker to microphone paths in the telephone terminals. That is, an echo path between the two signal-propagating directions of the transmission lines exists in the telephone terminals. In the echo cancelers, an impulse response characteristic in the echo path is estimated based on an echo signal which is detected in telephone terminals to subtract the estimated signal from a signal propagating in a telephone transmission line in which the above echo signal may propagate. To carry out the above estimation, adaptive digital filters are utilized, and conventionally, the normalized least mean square (NLMS) algorithm is applied.

(2) Description of the Related Art

FIG. 1 shows a construction of an echo canceler which is provided in a telephone terminal. In FIG. 1, reference numeral 1 denotes a subscriber's terminal, 2 denotes a hybrid transformer circuit, 3 denotes a balance network, 4 denotes an adaptive digital filter, and 9 denotes a substracter. In the adaptive digital filter 4, reference numeral 5 denotes an output signal register, 6 denotes a filter coefficient register, 7 denotes a convolution calculator, and 8 denotes a filter coefficient renewing circuit. Further, $X_j(i)$ denotes an $(i-1)$-cycled-delayed sampled output signal where i denotes a tap number and j denotes a sample timing, $S_j$ denotes an audio input signal from the subscriber, $N_j$ denotes a noise signal, $h_j(i)$ denotes a true filter coefficient corresponding to an actual impulse response (echo path gain) which is to be estimated by the adaptive digital filter and generates an echo signal $\Sigma h_j(i)X_j(i)$, $Y_j$ denotes a total input signal which is equal to a sum of the above audio input signal $S_j$, the noise signal $N_j$, and the echo signal $\Sigma h_j(i)X_j(i)$, $E_j(i)$ denotes a residual echo, and $H_j(i)$ denotes an estimated filter coefficient corresponding to the above true filter coefficient $h_j(i)$. In the example of the echo canceler, the word "output signal" is used for indicating "a sound output from the speaker", and the word "input signal" is used for indicating "a sound input from the microphone". Therefore, the "output signal" in the echo canceler includes an input signal to an echo path, and the "input signal" in the echo canceler includes an output signal from the echo path, as shown in FIG. 1.

The output signal register 5 holds a plurality of successive sampled output signals $X_j(i)$. The filter coefficient register 7 holds the (estimated) filter coefficient $H_j(i)$ for each tap of the adaptive digital filter. The convolution calculator 7 carries out a convolution calculation using the $(i-1)$-cycle-delayed sampled output signals $X_j(i)$ and the filter coefficient $H_j(i)$ to obtain an estimated echo $\Sigma H_j(i)X_j(i)$ where $\Sigma$ is a summation of all the taps in the adaptive digital filter. The filter coefficient renewing circuit 8 obtains a new (estimated) filter coefficient $H_{j+1}(m)$ for each tap m for the next timing $j+1$ in accordance with the following equation which is given by the conventional normalized least means square (NLMS) algorithm $$H_{j+1}(m) = H_j(m) + K \cdot E_j X_j(m) / \Sigma X_j(i)^2 \qquad (1)$$

where $E_j$ denotes a residual echo which is detected in the output of the subtractor 9 at the timing j, K is a coefficient correction constant, and the summation in the norm $\Sigma X_j(i)^2$ is carried out over all the taps in the adaptive digital filter. Note that "$\Sigma$" denotes a summation of all the taps in the adaptive digital filter through this specification except when otherwise specified. Conventionally, the above norm $\Sigma X_j(i)^2$ in the divisor is deemed to be included for suppressing influences of variations in amplitude of the output signal on the renewed filter coefficient. The substractor 9 subtracts the above estimated echo $\Sigma H_j(i)X_j(i)$ from the total input signal $Y_j$ to obtain the residual echo $E_j$. The residual echo $E_j$ is a remainder of the echo signal which could not be eliminated by the estimated echo $\Sigma H_j(i)X_j(i)$ in the subtracter 9.

FIG. 2 shows a detailed construction of the output signal register 5, the filter coefficient register 6, and the convolution calculator 7. As shown in FIG. 2, the output signal register 5 comprises a plurality of delay circuits 5a, inputs the above $(i-1)$-cycle-delayed sampled output signal $X_j$, and generates $(m-1)$-cycle-delayed output signal $X_j(m)$ where $m=1$ to I and I is a number of the taps in the adaptive digital filter. The filter coefficient register 6 holds filter coefficients $H_j(m)$ corresponding to the taps $m=1$ to I. The convolution calculator 7 comprises a plurality of multipliers 7a to obtain the multiples of the respective filter coefficients $H_j(i)$ and the corresponding $(i-1)$-cycle-delayed sampled output signals $X_j(i)$, and an accumulator 7b to obtain the summation $\Sigma H_j(i)X_j(i)$ of the multiples $H_j(i)X_j(i)$.

FIG. 3 is a block diagram showing the operation for obtaining an estimated filter coefficient $H_{j+1}(m)$ corresponding to an m-th tap for the next sample time $j+1$ in the echo canceler in accordance with the normalized least mean square (NLMS) algorithm. In FIG. 3, the filter coefficient register 6, the output signal register 5, the convolution calculator 7, and the subtracter 9 are the same as FIGS. 1 and 2, and reference numeral 81 denotes a norm calculation circuit, 80 and 83 each denote a multiplier, 82 denotes a divider, and 84 denotes an adder.

The multiplier 80 is provided for multiplying the residual echo $E_j$ by the coefficient correction constant X, the norm calculation circuit 81 calculates the norm $\Sigma X_j(i)^2$, the divider 82 divides the output of the multiplier 80 by the norm $\Sigma X_j(i)^2$, the multiplier 83 multiplies the output of the divider 82 by the value of the $(m-1)$-cycle-delayed sampled output signal $X_j(m)$, and the adder 84 adds the estimated filter coefficient $H_j(i)$ at the sample time j to the output of the multiplier 83 to obtain the filter coefficient $H_{j+1}(m)$ corresponding to the m-th tap for the next sample time j+1.

FIG. 4 shows the construction of the norm calculation circuit 81 in FIG. 3. In FIG. 4, the output signal register 5 is the same as FIGS. 1, 2, and 3, and reference numerals 10 and 11 each denote a square calculator, 12 denotes a subtracter, and 13 denotes an accumulator. In the accumulator 13, reference numeral 14 denotes an adder, and 15 denotes a delay circuit. The sampled output signal $X_j$ is input in parallel into the square calculator 10 to obtain an $X_j^2$ circuit, and into the output signal register 5 to obtain the abovementioned (m−1)-cycle-delayed output signal $X_j(m)$ where m=1 to I. The square calculator 11 receives the (i−1)-cycle-delayed sampled output signal $X_j(i)$ from the output signal register 5 to obtain $X_j(I)^2$. The subtracter 12 subtracts the output $X_j(I)^2$ of the square calculator 11 from the output $X_j^2 = X_j(1)^2$ of the square calculator 12. The output $X_j^2 - X_j(I)^2$ of the subtractor 10 is supplied to the accumulator 13 to obtain the accumulation of the output $X_j^2 - X_j(I)^2$ of the subtractor 12.

Since the initial values held in the output signal register 5 are zero, the output $X_j(I)$ of the output signal register 5 is zero during the first I sample clock cycles, the output of the square calculator 11 is also zero during the first I sample clock cycles. The output $T_q$ of the accumulator 13 at the sample time q is $$T_q = X_1^2 + X_2^2 + \ldots + X_q^2$$

where $q \leq I$. Then, when the sample time q becomes larger than I, the output $X_j(I)$ of the output signal register 5 becomes effective. For example, when q=I+1, the output of the accumulator 13 becomes $$T_{I+1} = (X_{I+1}^2 - X_1^2) + T_I$$
$$= X_2^2 + X_3^2 + \ldots + X_I^2 + X_{I+1}^2.$$

Further, generally, when q>I, the output of the accumulator 13 becomes $$T_q = (X_q^2 - X_{q-I}^2) + T_{q-1}$$
$$= X_{q-I+1}^2 + X_{q-I+2}^2 + \ldots + X_q^2.$$

Namely, a summation of squares of precedingly sampled successive I output signals is output from the output signal register 5 as the norm $\Sigma X_j(i)^2$.

Generally, regarding the convergence rate of the filter coefficient $H_{j+1}(m)$ in the conventional normalized least means square (NLMS) algorithm as explained above, it is considered that the larger the coefficient correction constant value K becomes, the faster the convergence of the filter coefficient becomes and the less accurate estimation of the echo can be carried out, and the smaller the coefficient correction constant value K becomes, the slower the convergence of the filter coefficient becomes and the more accurate estimation of the echo can be carried out.

In the prior art, it is known that the value of the coefficient correction constant value K must be limited to 0<K<2. However, since the convergence actually becomes slow when the coefficient correction constant K exceeds one, usually, the normalized least mean square (NLMS) algorithm is carried out using the coefficient correction constant K in the range 0<K≦1.

Further, in the prior art, the residual echo is monitored, and the coefficient correction constant K is made large when it is determined that the filter coefficient is in a converging process, and the coefficient correction constant K is made small when it is determined that the filter coefficient is in a stable converged state.

In the echo canceler which operates in accordance with the above conventional normalized least mean square (NLMS) algorithm, the estimated filter coefficient greatly varies responding to an impulse input or a beginning or ending of a word, and the accuracy of the estimation is suddenly and greatly reduced. For example, generally, silent durations each existing before a consonant and continuing for about 200 msec, frequently appear in voice signals, and in response, the estimated filter coefficient greatly varies. Generally, the accuracy of the estimation is quickly reduced by these disturbances, but recovery to accurate estimation is slow.

SUMMARY OF THE INVENTION

An object of the present invention is to provide an adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the estimation is carried out so that a difference between the output signal and the estimated output signal is reduced, and the operation of the adaptive digital filter is stable even when an amplitude of the input signal varies.

Another object of the present invention is to provide an adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the estimation is carried out so that a difference between the output signal and the estimated output signal is reduced, and in which the filter coefficients converge quickly through the operation of the adaptive digital filter.

According to the first aspect of the present invention, there is provided an adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the above estimation is carried out so that a difference between the above output signal and the above estimated output signal is reduced. The adaptive digital filter comprises: an input signal register for holding a plurality of sampled input signals which have been sampled since a predetermined number of cycles before the current time; a filter coefficient register for holding the above predetermined number of filter coefficients which respectively correspond to the plurality of sampled input signals; a convolution calculating means for calculating a convolution between the above input signal and the above estimated response characteristic using the above plurality of successive sampled input signals which are held in the input signal register, and the estimated filter coefficients which are held in the filter coefficient register, an error obtaining means for obtaining a difference between the sampled output signal of the above signal path and the above convolution as an error in the estimation; and a filter coefficient estimating means for estimating the predetermined number of filter coefficients so that the above error is reduced. According to the first aspect of the present invention, the filter coefficient estimating means comprises a filter coefficient renewing means for each of the predetermined number of filter coefficients, for renewing the corresponding filter coefficient in each cycle of the above sampling, and the filter coefficient renewing means comprises: a multiplier for obtaining a product of one of the sampled output signals corresponding to the filter coefficient renewing means, and the sampled input signal; and integrating means for integrating the output of the multiplier to extract a component of the filter coefficient corresponding to the filter coefficient renewing means; a power calculating means for calculating a power of the above one of the sampled output signals corresponding to the filter coefficient renewing means; and a divider for dividing the output of the integrating means by the output of the power calculating means.

According to the second aspect of the present invention, the above filter coefficient renewing means comprises: a multiplier for obtaining a product of one of the sampled output signals corresponding to the filter coefficient renewing means, and the sampled input signal; an accumulating means for accumulating the output of the multiplier; a power calculating means for calculating a power of the above one of the sampled output signals corresponding to the filter coefficient renewing means; a divider for dividing the output of the accumulating means by the output of the power calculating means; and an integrating means for integrating the output of the divider to extract a component of the filter coefficient corresponding to the filter coefficient renewing means.

According to the third aspect of the present invention, the above filter coefficient renewing means comprises: a dividing means for dividing the sampled input signal by one of the sampled output signals corresponding to the filter coefficient renewing means; a zero detecting means for determining that the above one of the sampled output signals corresponding to the filter coefficient renewing means is below a predetermined level; an integrating means for integrating the output of the dividing means so that a component of the filter coefficient corresponding to the filter coefficient renewing means is extracted in the output thereof; and a stop control means for stopping the operation of the integrating means when the zero detecting means determines that the above one of the sampled output signals corresponding to the filter coefficient renewing means is below the predetermined level.

According to the fourth aspect of the present invention, m-th filter coefficient renewing means corresponding to m-th filter coefficient, where m is an integer satisfying $1 \leq m \leq I$ where I is equal to the number of the filter coefficients, comprises a low-pass filter for integrating the sampled input signals so that a component of the filter coefficient corresponding to the filter coefficient renewing means is extracted in the output thereof. The above low-pass filter comprises: a first multiplier for multiplying each of the sampled input signals by a first factor which is equal to $K \cdot X_j(m)/r$, where K is a coefficient correction constant, $X_j(m)$ is the sampled input signal which has been sampled $(m-1)$ cycles before the current time j, where j denotes a number indicating a current time, and r denotes a value for normalizing the first factor; an adder; a delay means for delaying the output of the adder; and a second multiplier for multiplying the output of the delay means by a second factor which is equal to $1 - K \cdot X_j(m)^2/r$. The adder adds the outputs of the first and second multipliers, and the output of the adder becomes the output of the filter coefficient renewing means.

According to the fifth aspect of the present invention, the above filter coefficient renewing means comprises: a first multiplier for multiplying each of the sampled output signals by a coefficient correction constant; a divider for dividing the output of the first multiplier by a value r for normalizing the first factor; a second multiplier for multiplying the output of the divider by one of the sampled output signals, where m denotes the corresponding filter coefficient renewing means; and an adder for adding a previously estimated filter coefficient corresponding to the filter coefficient renewing means, to the output of the second multiplier.

DESCRIPTION OF THE PREFERRED EMBODIMENTS

Derivation of the Basic Concepts of the Present Invention

First, the cause of the aforementioned drawbacks in the echo canceler in accordance with the conventional normalized least mean square (NLMS) algorithm, is considered as follows.

Figure 1:
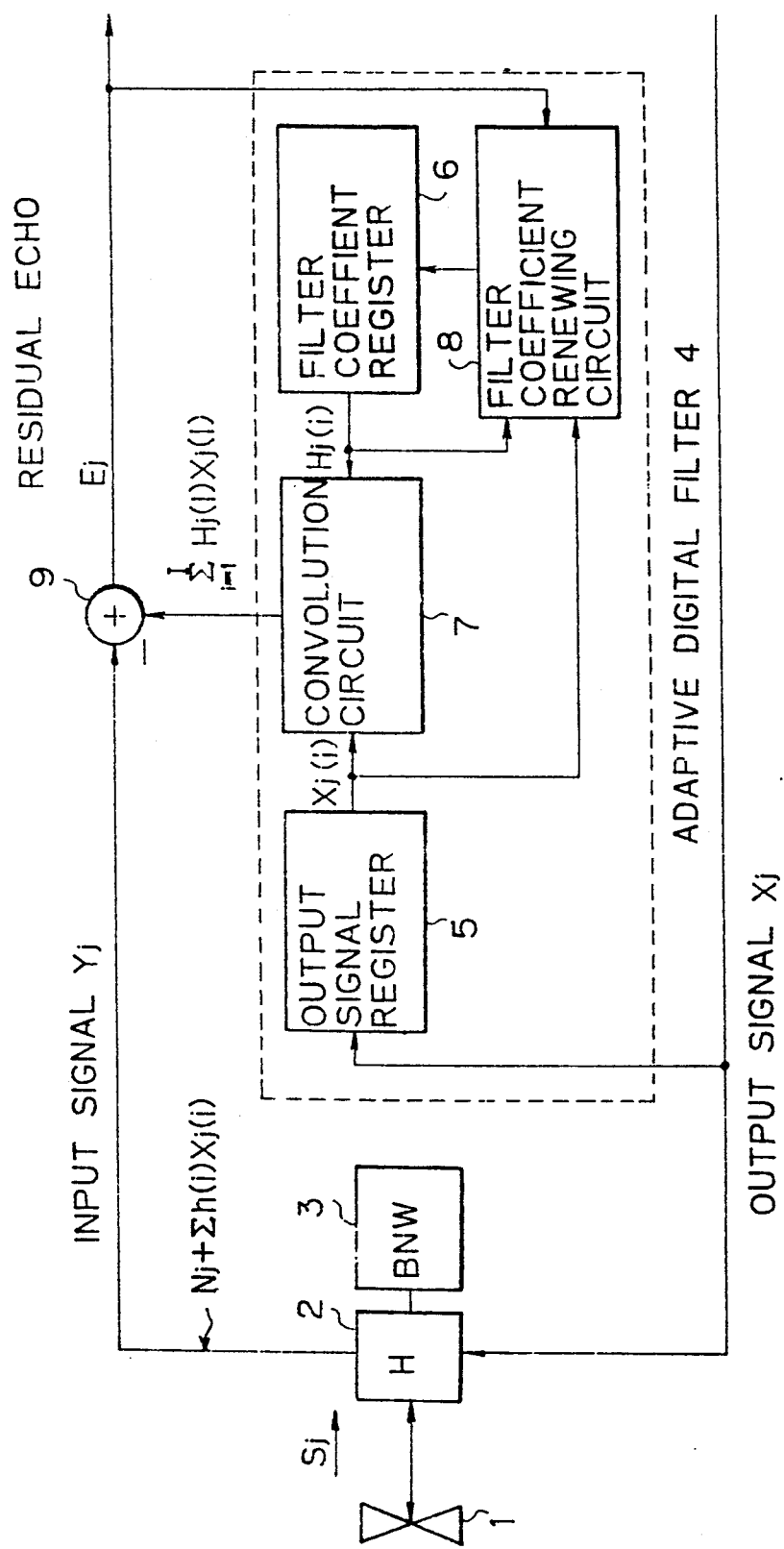
FIG. 1 shows a construction of an echo canceler which is provided in a telephone terminal.
Figure 3:
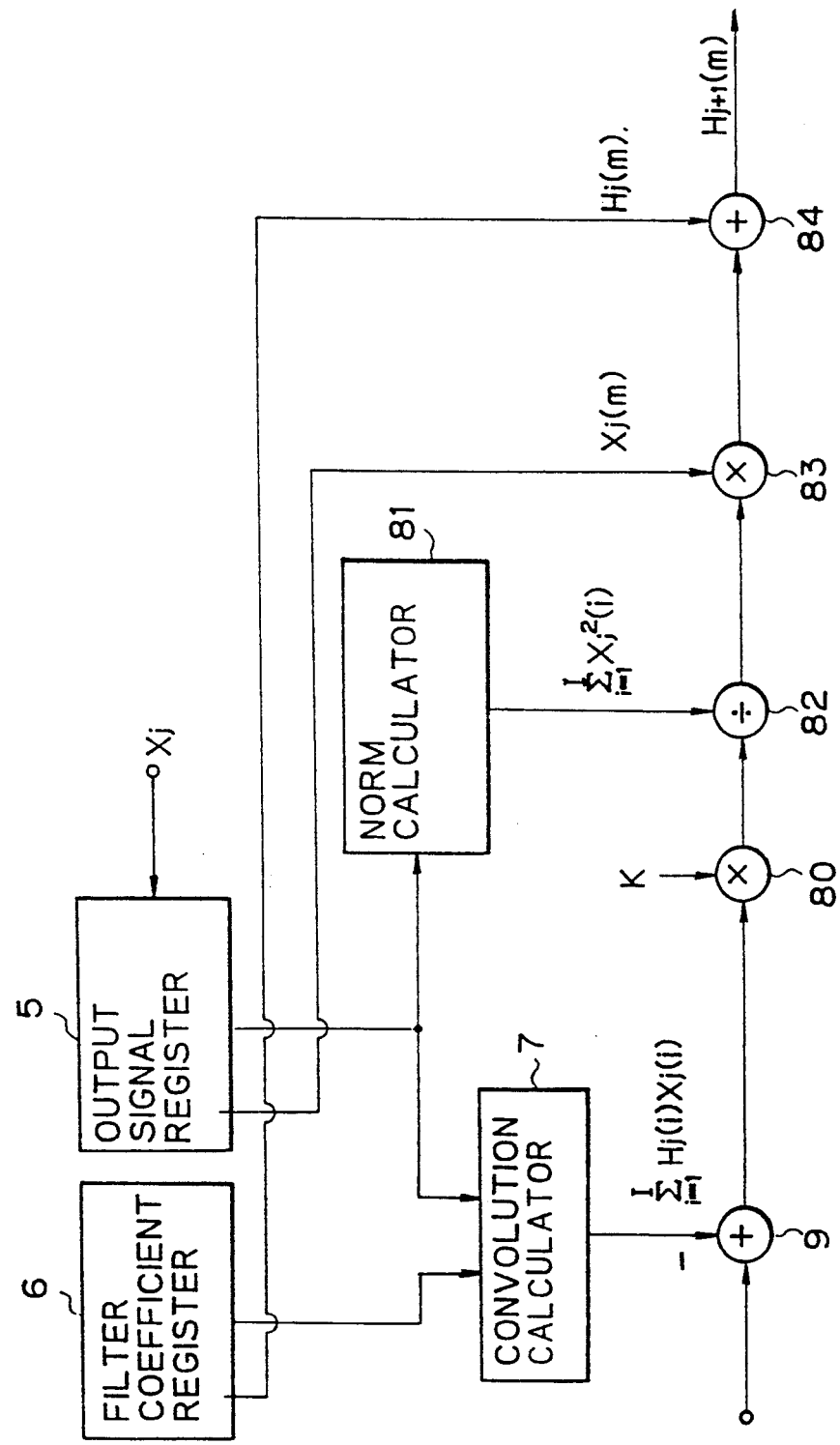
FIG. 3 is a block diagram showing the operation for obtaining a (estimated) filter coefficient $H_{j+1}(m)$ corresponding to an m-th tap for the next sample time $j+1$ in the echo canceler in accordance with the normalized least mean square (NLMS) algorithm.
Figure 4:
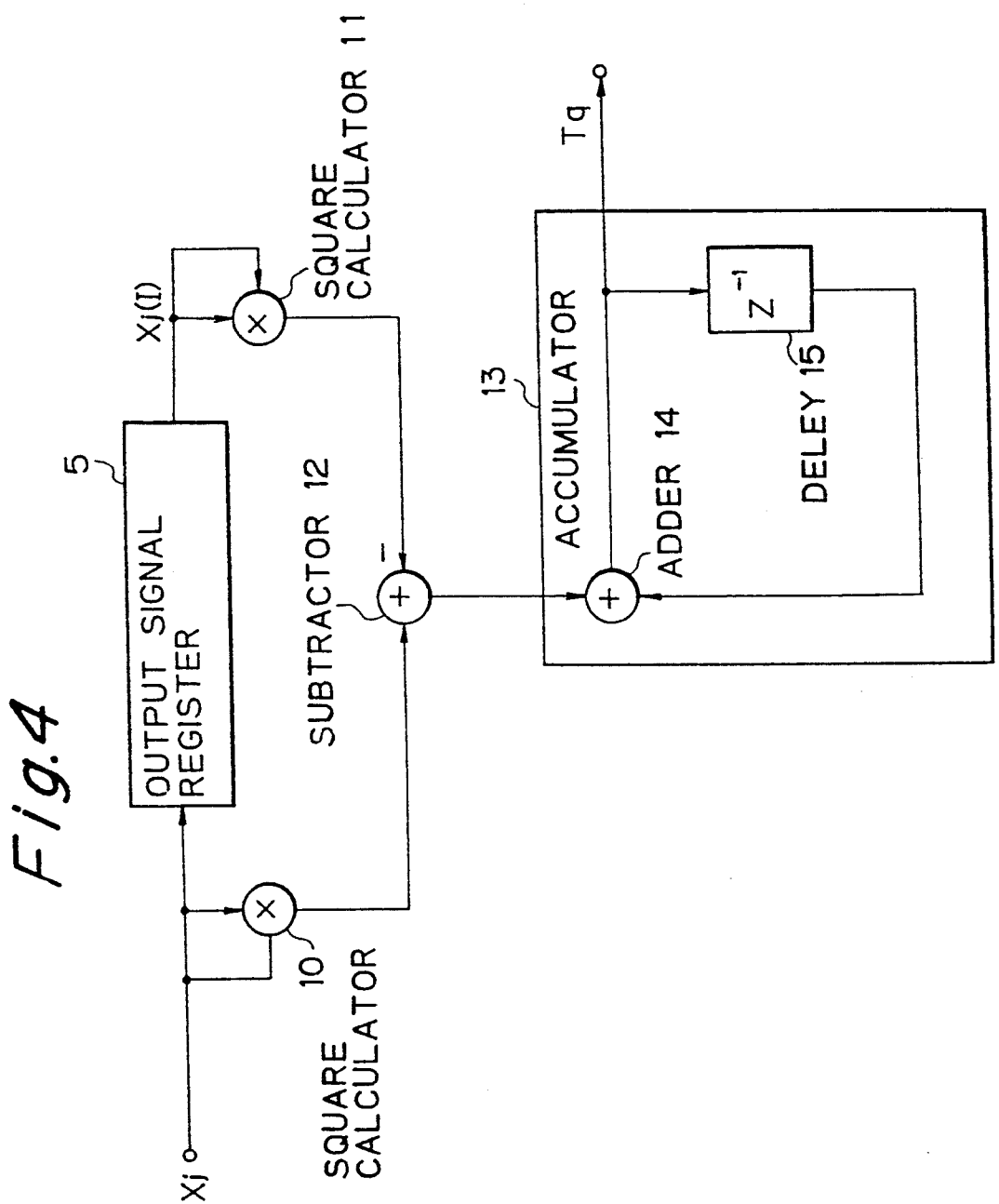
FIG. 4 shows the construction of the norm calculation circuit 81 in FIG. 3.

As shown in FIGS. 1 and 3, the residual echo $E_j$ is shown as $$E_j = Y_j - \Sigma H_j(i) X_j(i) \qquad (2)$$

where the total input signal $Y_j(i)$ is expressed using the $(i-1)$-cycle-delayed sampled output signal $X_j(i)$, the audio input signal $S_j$ from the subscriber, the noise signal $N_j$, and the true filter coefficient $h_j(i)$ corresponding to an actual impulse response (echo path gain) which is to be estimated by the adaptive digital filter, as $$Y_j = (S_j + N_j) + \Sigma h_j(i) X_j \qquad (3)$$

Namely, the filter coefficient renewing circuit 8 of FIG. 1 operates to make the estimated filter coefficient $H_j(i)$ approach the true filter coefficient $h_j(i)$ corresponding to an actual impulse response (echo path gain) based on the residual echo $E_j$.

By substituting the equations (2) and (3) into (1), $$\begin{aligned}
H_{j+1}(m) &= H_j(m) + K \cdot [Y_j - \Sigma H_j(i) X_j(i)] \cdot X_j(m)/\Sigma X_j(i)^2 \\
&= H_j(m) + K \cdot [S_j + N_j] \cdot X_j(m)/\Sigma X_j(i)^2 + \\
&\quad K \cdot [\Sigma h_j(i) X_j(i)] \cdot X_j(m)/\Sigma X_j(i)^2 - \\
&\quad K \cdot [\Sigma H_j(i) X_j(i)] \cdot X_j(m)/\Sigma X_j(i)^2 \\
&= H_j(m) + K \cdot [(S_j + N_j) + \Sigma \Delta_j(i) X_j(i)] \cdot
\end{aligned} \qquad (4)$$

-continued
$$X_j(m)/\Sigma X_j(i)^2$$

where $\Delta_j(i)$ is an estimation error, and $\Delta_j(i)=h_j(i)H_j(i)$. By separating a term wherein $i=m$, $$H_{j+1}(m) = H_j(m) + K \cdot [S_j + N_j] \cdot X_j(m)/\Sigma X_j(i)^2 + \\ K \cdot [\Sigma_m h_j(i)X_j(i) - \Sigma_m H_j(i)X_j(i)] - K_j(m)/\Sigma X_j(i)^2 + \\ K \cdot [h_j(m)X_j(m) - H_j(m)X_j(m)] \cdot X_j(m)/\Sigma X_j(i)^2 \quad (5)$$

where $\Sigma_m$ is a summation of all the taps of the adaptive digital filter except $i=m$. By defining an amount $Em_j$ as $$Em_j = (S_j + N_j) + \Sigma_m h_j(i)X_j(i) - \Sigma_m H_j(i)X_j(i)$$
$$= (S_j + N_j) + \Sigma_m \Delta_j(i)X_j(i),$$

the equation (5) is expressed as $$\begin{aligned}H_{j+1}(m) &= H_j(m) + K \cdot Em_j \cdot X_j(m)/\Sigma X_j(i)^2 + \\ &\quad K \cdot h_j(m)X_j(m)^2/\Sigma X_j(i)^2 - \\ &\quad K \cdot H_j(m)X_j(m)^2/\Sigma X_j(i)^2. \\ &= H_j(m) \cdot [1 - K \cdot X_j(m)^2/\Sigma X_j(i)^2] + \\ &\quad K \cdot Em_j \cdot X_j(m)/\Sigma X_j(i)^2 + \\ &\quad K \cdot h_j(m)X_j(m)^2/\Sigma X_j(i)^2 \\ &= H_j(m) \cdot [1 - K \cdot X_j(m)^2/\Sigma X_j(i)^2] + \\ &\quad K \cdot [h_j(m) + Em_j/X_j(m)]X_j(m)^2/\Sigma X_j(i)^2 \\ &= H_j(m) \cdot [1 - K \cdot X_j(m)^2/\Sigma X_j(i)^2] + \\ &\quad K \cdot [h_j(m) + Q_j(m)]X_j(m)^2/\Sigma X_j(i)^2\end{aligned} \quad (6)$$

where $Q_j(m)$ is defined as $Q_j(m)=Em_j/X_j(m)$.

Figure 5:
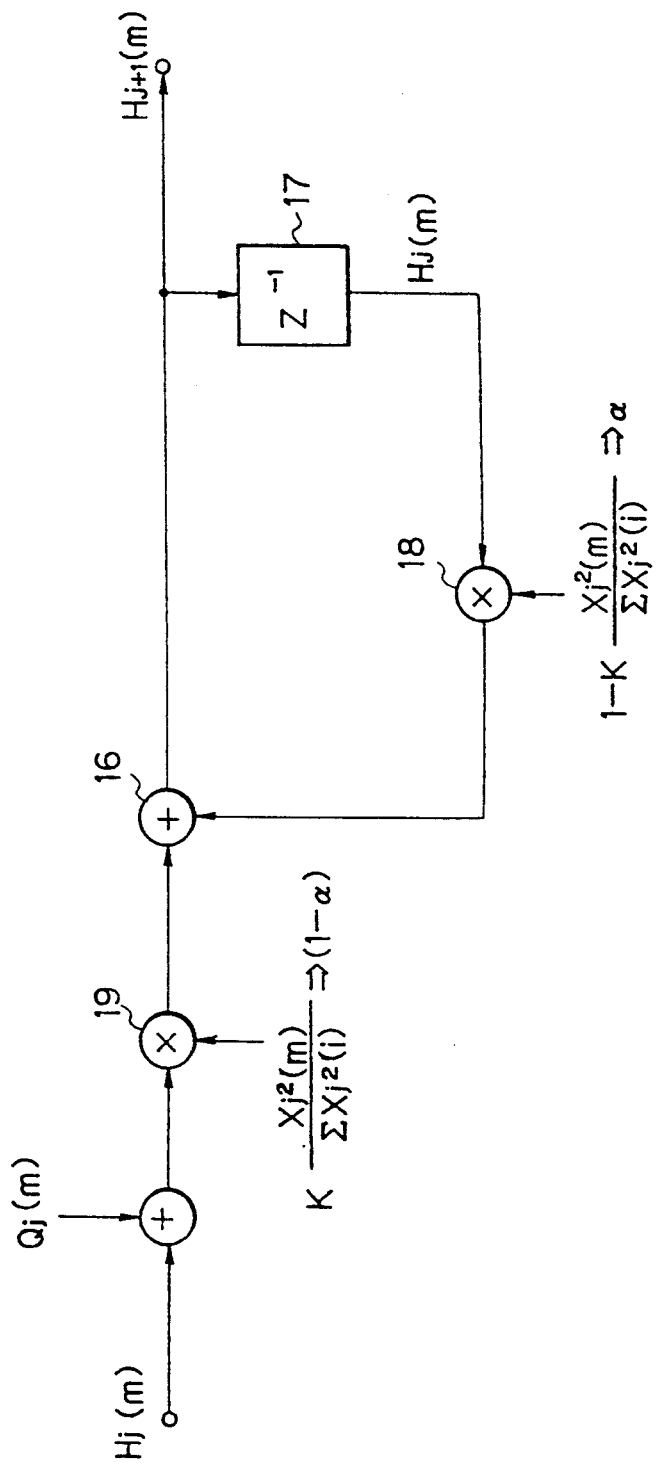
FIG. 5 is a block diagram showing the operation of the conventional normalized least mean square (NLMS) algorithm in form comprising a low-pass filter.

FIG. 5 shows the calculation of the equation (6) as a block diagram. In FIG. 5, an amount $\alpha$ is defined by $$\alpha=[1-K\cdot X_j(m)^2/\Sigma X_j(i)^2], \quad (7)$$

and therefore, $$1-\alpha=K\cdot X_j(m)^2/\Sigma X_j(i)^2.$$

As shown in FIG. 5 it is understood that the conventional normalized least mean square (NLMS) algorithm includes a low-pass filter comprising an adder 16, multipliers 19 and 18, and a delay element 17, where the multiplier 19 multiplies an input signal $h_j(i)+Q_j(i)$ by a gain compensating factor $(1-\alpha)$, the adder 16 adds the output of the multiplier 18 to the output of the multiplier 19, the delay element 17 delays the output of the adder 16 for one sample clock cycle, and the multiplier 18 multiplies the output of the delay element 17 by the above factor a. Namely, from the above point of view, the disturbance $Q_j(i)$ which is included in the input signal $[h_j(i)+Q_j(i)]$ is suppressed by the low-pass filter having a low-pass filter coefficient a, and the filter coefficient $H_j(m)$ in the adaptive digital filter is converged to the echo path gain $h_j(m)$, and thus, the echo path gain $h_j(m)$ is extracted as a direct current component.

Figure 6:
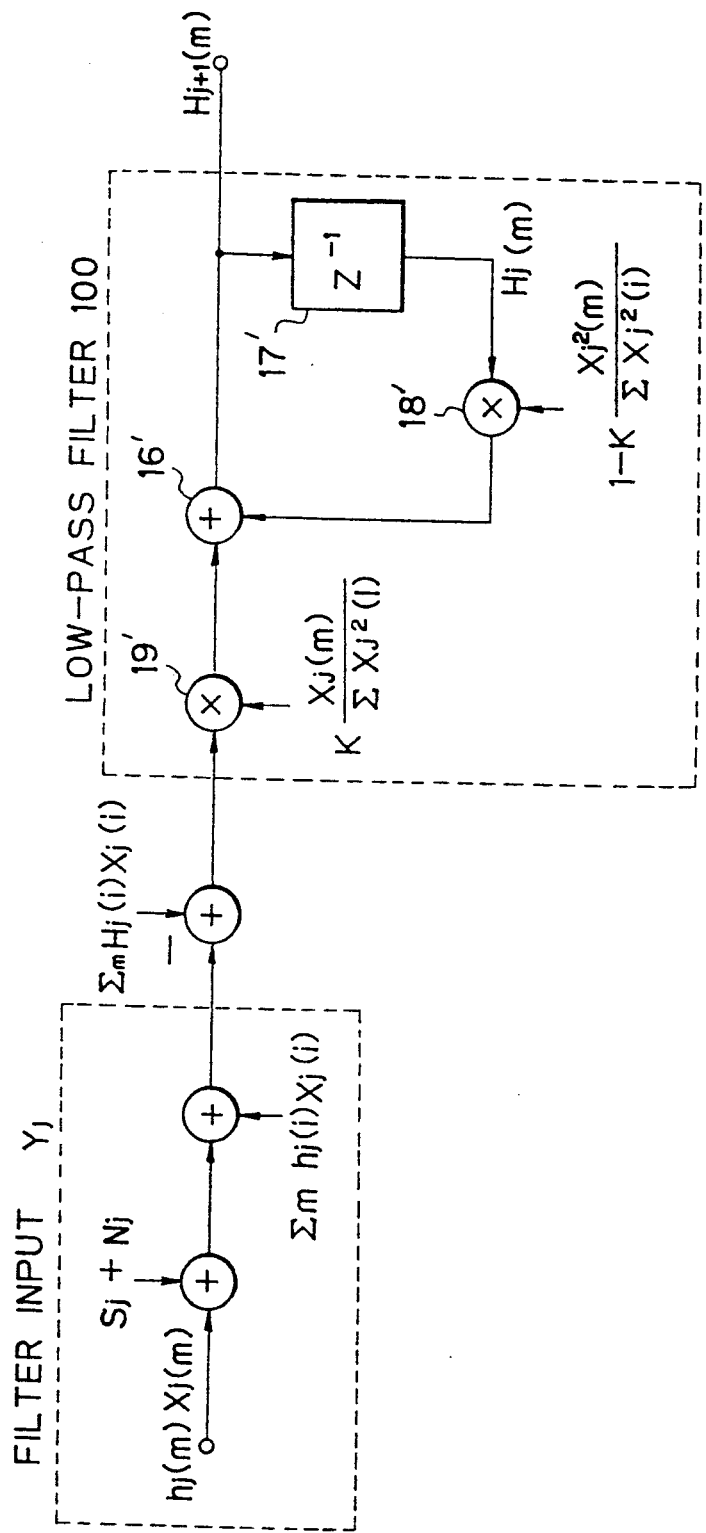
FIG. 6 is a block diagram corresponding to the operation of the normalized least mean square (NLMS) algorithm in the form of a low-pass filter.

In the diagram of FIG. 5, the disturbance $Q_j(m)$ includes a factor $1/X_j(m)$. To avoid a division by $X_j(m)=$zero, the diagram of FIG. 5 is rewritten by the following transformation, $$h_j(m) \rightarrow h_j(m)X_j(m), \text{ and}$$

$$K\cdot X_j(m)^2/\Sigma X_j(i)^2 \rightarrow K\cdot X_j(m)/\Sigma_j(i)^2$$

to obtain a diagram of FIG. 6, where the above quantity $h_j(m) X_j(m)$ corresponds to a component of the echo signal.

To keep the operation of the low-pass filter stable, the low-pass filter coefficient $\alpha$ must satisfy the following condition $$-1<\alpha<1.$$

The stability condition of the low-pass filter is expressed as $$-1<1-K\cdot X_j(m)^2/\Sigma X_j(i)^2<1 \quad (8)$$

The equation (8) leads to $$0<K\cdot X_j(m)^2/\Sigma X_j(i)^2<2.$$

Since $X_j(m)^2/\Sigma X_j(i)^2 \leq 1$, the following condition for the coefficient correction constant K is obtained. The above condition is the same as the conventional stability condition for the normalized least mean square (NLMS) algorithm. The adaptive digital filter is stable even when $X_j(m)=0$ and therefore the low-pass filter coefficient $\alpha$ becomes equal to one, because the input into the low-pass filter becomes zero.

From the above consideration, the cause of the aforementioned drawback in the conventional normalized least mean square (NLMS) algorithm, is understood. that is, the low-pass filter coefficient $\alpha$ in the low-pass filter varies with the amplitude of the $(m-1)$-cycle-delayed sampled output signal $X_j(m)$ as shown in the equation (7).

To analyze the problem in more detail, the case $K=1$ is considered. In the case, the equation (7) becomes $$\alpha_j(m)=[1-X_j(m)^2/\Sigma X_j(i)^2]. \quad (9)$$

Since $0\leq X_j(m)^2/\Sigma X_j(i)^2 \leq 1$, the low-pass filter coefficient $\alpha$ varies according to the variation of the amplitude of the $(m-1)$-cycle-delayed sampled output signal $X_j(m)$ as $$0\leq \alpha_j(m) \leq 1.$$

When the low-pass filter coefficient $\alpha$ is large in the above range, the low-pass filter becomes more stable and the disturbance included in the input signal is suppressed more effectively, but the convergence becomes more slow. When the low-pass filter coefficient $\alpha$ is small in the above range, the convergence in the low-pass filter becomes faster, but the low-pass filter becomes more unstable and the suppression of the disturbance included in the input signal is less effective. Therefore, the performance of the low-pass filter varies with the variation of the low-pass filter coefficient $\alpha$, i.e., with the amplitude of the $(m-1)$-cycle-delayed sampled output signal $X_j(m)$. Namely, the residual echo varies with the amplitude of the $(m-1)$-cycle-delayed sampled output signal $X_j(m)$.

For example, when an impulse-like signal is input as the sampled output signal, $X_j(m)^2$ becomes nearly equal to $\Sigma X_j(i)^2$, and therefore, the low-pass filter coefficient $\alpha$ becomes nearly equal to zero. Thus, the low-pass filter becomes very unstable with regard to the disturbance, and the estimated filter coefficients in the adaptive digital filter vary greatly.

In addition, the equation (7) shows that the low-pass filter coefficient $\alpha$ increases when the coefficient correction constant K is decreased, and decreases when the coefficient correction constant K is increased.

Figure 7:
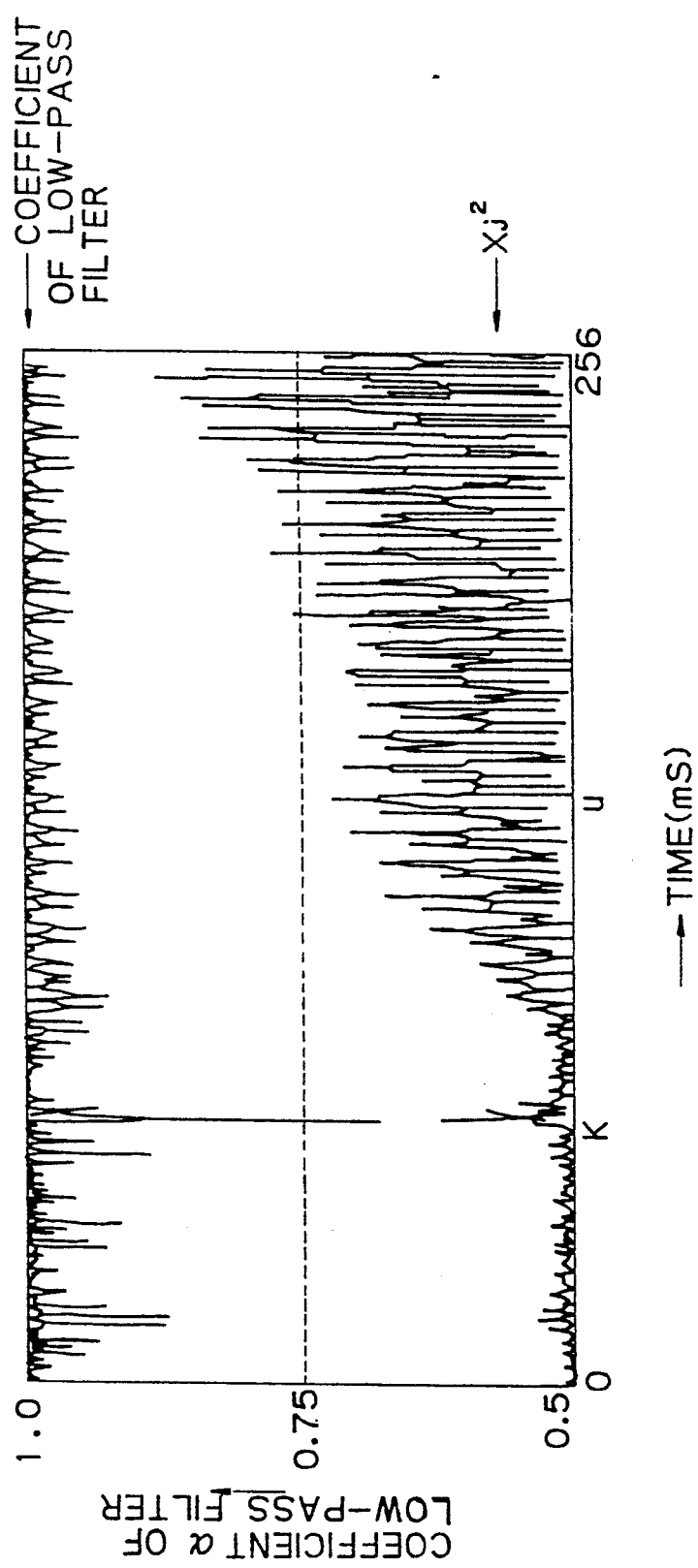
FIG. 7 shows a result of a simulation wherein the variation of the low-pass filter coefficient $\alpha$ is obtained when a voice signal "ku" is supplied as the $(m-1)$-cycle-delayed sampled output signal $X_j(m)$ to the conventional echo canceler in accordance with the normalized least mean square (NLMS) algorithm, and the number I of the taps is set to $I = 80$.

FIG. 7 shows a result of a simulation wherein the variation of the low-pass filter coefficient $\alpha$ is obtained when a voice signal "ku" is supplied as the $(m-1)$-cycle-delayed sampled output signal $X_j(m)$ to the conventional echo canceler in accordance with the normalized least mean square (NLMS) algorithm, and the number I of the taps is set to I=80. As shown in FIG. 7, the filter coefficient $\alpha$ becomes unstable at the beginning of the voice signal and when the consonant "k" is input.

Conventionally, as mentioned before, the factor $1/\Sigma X_j(i)^2$ in the second term on the right side of the equation (1) is considered to be provided for suppressing the influence of the variation of the amplitude of the $(m-1)$-cycle-delayed sampled output signal $X_j(m)$ on the filter coefficients $H_j(m)$. However, as understood from the above consideration, the effect of the suppression by the factor $1/\Sigma X_j(i)^2$ in the equation (1) is insufficient. The factor $1/\Sigma X_j(i)^2$ in the second term on the right side of the equation (1) provides only normalization within successive $(i-1)$-cycle-delayed sampled output signals held in the output signal register 5, but does not provide normalization on the time axis. The normalization factor $1/\Sigma X_j(i)^2$ suppresses the influence of the variation of the amplitude of the $(m-1)$-cycle-delayed sampled output signal $X_j(m)$ only partially.

Therefore, it is not necessary to limit the range of the summation in the norm $\Sigma X_j(i)^2$ within the taps in the adaptive digital filter, and the range of the summation can be varied.

Further, the normalization need not be carried out in the low-pass filter, the operation corresponding to the normalization can be carried out outside of the low-pass filter, for example, in either the input side or the output side of the low-pass filter. When the normalization factor is excluded from the low-pass filter, and the factors which vary with the $(m-1)$-cycle-delayed sampled output signal $X_j(m)$ is excluded from the low-pass filter, the low-pass filter coefficient $\alpha$ in the low-pass filter can be set to a constant $\alpha'$. For example, the factors which vary with the $(m-1)$-cycle-delayed sampled output signal $X_j(m)$, can be excluded from the low-pass filter 100 in FIG. 6 by multiplying the input of the low-pass filter 100 by a factor $1/X_j(m)$.

Figure 8:
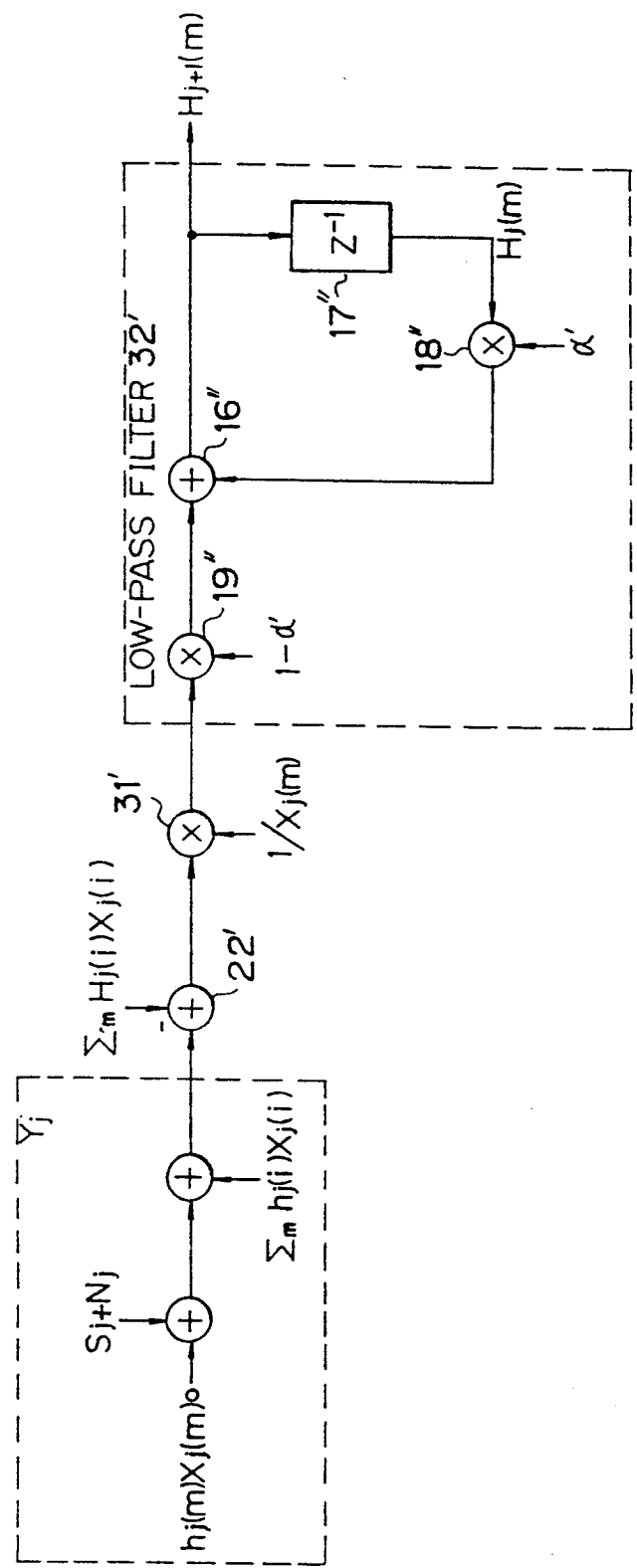
FIG. 8 is a block diagram of a calculation system for estimating the echo path gain $h_j(m)$, comprising a low-pass filter which obtains the estimated filter coefficient $H_j(m)$, and wherein the filter coefficient is a constant.

FIG. 8 is a block diagram of a calculation system for estimating the echo path gain $h_j(m)$, comprising a low-pass filter which obtains the estimated filter coefficient $H_j(m)$, and wherein the filter coefficient is a constant. The differences from the construction of FIG. 6 are that the filter coefficient in the low-pass filter is made constant, and that the input of the low-pass filter is multiplied by $1/X_j(m)$. According to the construction of FIG. 8, the accuracy of the estimated filter coefficient $H_{j+1}(m)$ is not varied by the variation of the amplitude of the $(m-1)$-cycle-delayed sampled output signal $X_j(m)$.

In the construction of FIG. 8, the provision of the subtracter 22' is not essential to obtain a converged filter coefficient $H_{j+1}(m)$. When the subtraction in the subtracter 22' is not carried out, the lack of the value $-\Sigma_m H_j(i) X_j(i)$ causes only an increase in noise level in the output of the echo canceler because the amount $-\Sigma_m H_j(i) X_j(i)$ does not include the factor relating the number m.

Generally, the amount $-\Sigma_m H_j(i) X_j(i)$ is added to the input $Y_j(i)$ for canceling the component $\Sigma_m h_j(i) X_j(i)$ in the echo signal to accelerate the convergence of the filter coefficient $H_j(m)$. The acceleration of the convergence is realized only when the following relationship exists.

$$|\Sigma_m h_j(i) X_j(i)| > |\Sigma_m \Delta_j(i) X_j(i)| \qquad (10)$$

Since $$[Y_j - \Sigma_m H_j(i) X_j(i)] \cdot X_j(m) = [h_j(m) X_j(m) + (S_j + N_j) + \Sigma_m h_j(i) X_j(i) - \Sigma_m H_j(i) X_j(i)] \cdot X_j(m)$$
$$= [h_j(m) X_j(m) + (S_j + N_j) + \Sigma_m \Delta_j(i) X_j(i)] \cdot X_j(m)$$
$$= h_j(m) X_j(m)^2 + [(S_j + N_j) + \Sigma_m \Delta_j(i) X_j(i)] \cdot X_j(m),$$

when the above relationship (10) does not exist, the substraction of the amount $\Sigma_m H_j(i) X_j(i)$ in the subtracter 22' increases an error in the filter coefficient $H_{j+1}(m)$ which is obtained from the construction of FIG. 8. The relationship (10) does not exist when the filter coefficient $H_j(m)$ does not closely approximate the true echo path gain $h_j(m)$, for example, in the beginning of the operation of the echo canceler, and therefore, the convergence of the filter coefficient $H_j(m)$ is accelerated by substantially reducing the subtraction of the amount $\Sigma_m H_j(i) X_j(i)$ in the subtracter 22' until the filter coefficient $H_j(m)$ comes close to the true echo path gain $h_j(m)$, for example, in the beginning of the operation of the echo canceler.

Further, the low-pass filter coefficient $\alpha'$ in the low-pass filter may be set to a small value in the beginning of the operation of the echo canceler, and then be increased with the progress in the convergence of the output of the low-pass filter. As explained before, when the low-pass filter coefficient $\alpha'$ is small (near to zero), the convergence rate becomes high and the accuracy of the convergence becomes low, and when the low-pass filter coefficient $\alpha'$ is large (near one), the convergence rate becomes low and the accuracy of the convergence becomes high. Therefore, by the above setting and increasing of the low-pass filter coefficient $\alpha'$, the progress in the convergence is accelerated in the beginning of the operation of the echo canceler, and accurate convergence is obtained after the convergence is achieved to a predetermined degree.

The operation shown in FIG. 8, however, includes the possibility of a division by zero when $X_j(m) = 0$. To avoid the division by zero, two methods are considered.

The first method to avoid the division by zero is to detect that $X_j(m) = 0$, and halt the operation of the construction of FIG. 8.

The second method to avoid the division by zero is to replace the operation of $1/X_j(m)$ by an operation of a normalization outside the low-pass filter.

In the second method, by multiplying the output of the subtracter 22' in FIG. 8 by $X_j(m)$, $$[Y_j - \Sigma_m H_j(i) X_j(i)] \cdot X_j(m) = h_j(m) X_j(m)^2 + [(S_j + N_j) + \Sigma_m \Delta_j(i) X_j(i)] \cdot X_j(m).$$

By accumulating the above quantity over $j = k$ to $K$, and dividing the quantity by a norm $\Sigma' X_j(i)^2$ for the normalization, $$\Sigma'[h_j(m) X_j(m)^2 + X_j(m) \cdot \{(S_j + N_j) + \Sigma_m \Delta_j(i) X_j(i)\}]/\Sigma' X_j(i)^2, = \Sigma' h_j(m) X_j(m)^2 + \Sigma' X_j(m) \cdot [(S_j + N_j) + \Sigma_m \Delta_j(i) X_j(i)]/\Sigma' X_j(i)^2,$$

where $\Sigma'$ is a summation of j=k to K. When $h_j(m)$ can be approximated to be a constant h (m) during the above summation, the above normalized quantity becomes $$h(m)+\Sigma'X_j(m)\cdot[(S_j+N_j)+\Sigma_m\Delta_j(i)X_j(i)]/\Sigma'X_j(i)^2.$$

When the above normalization is carried out in the input side of the low-pass filter 32' of FIG. 8, the filtering operation of the low-pass filter is carried out on the second term of the above normalized quantity, and when the above normalization is carried out in the output side of the low-pass filter 32' of FIG. 8, the filtering operation of the low-pass filter is carried out on the numerator of the second term of the above normalized quantity.

First Embodiment of the Present Invention

Basic Construction

Figure 2:
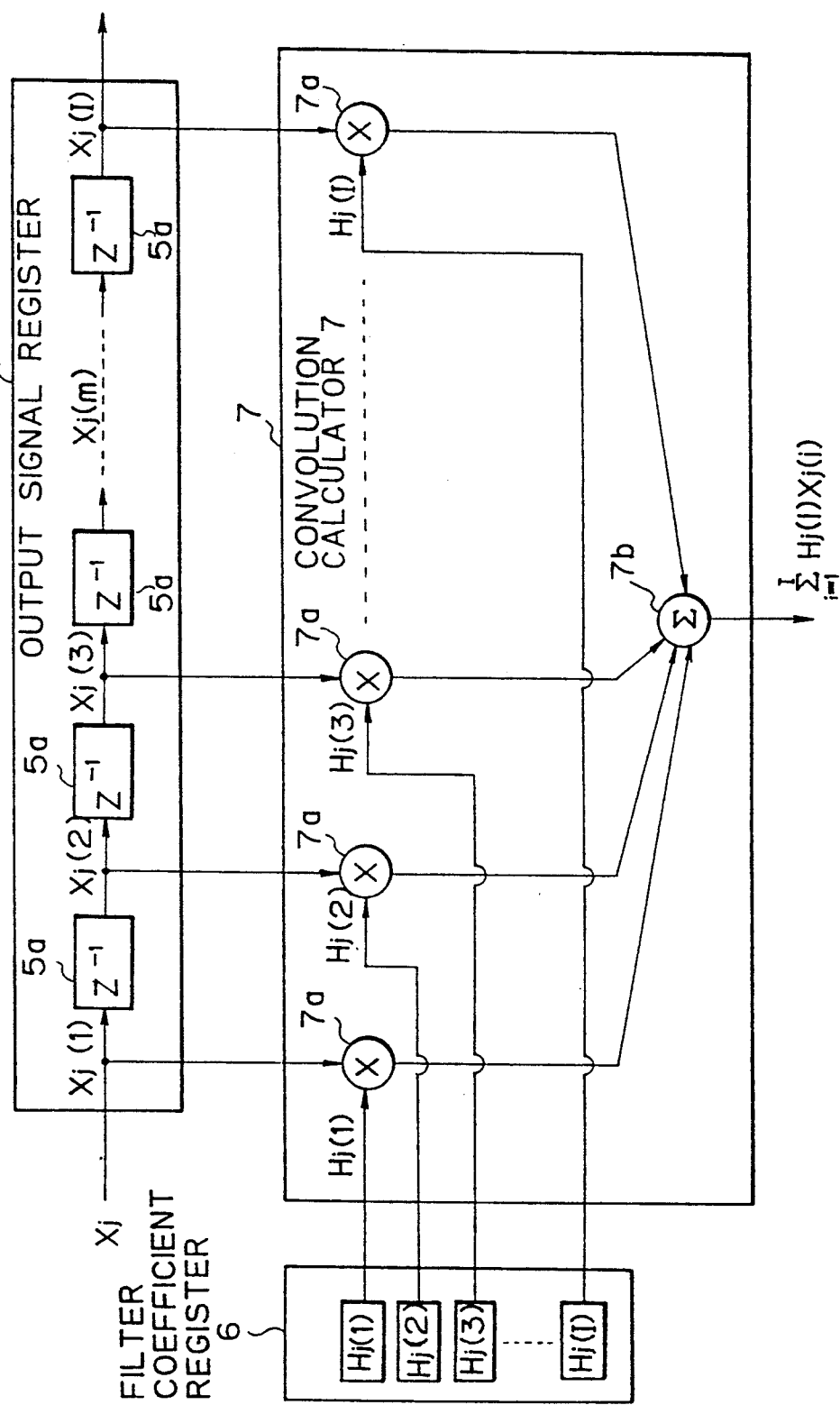
FIG. 2 shows a detailed construction of the output signal register 5, the filter coefficient register 6, and the convolution calculator 7.
Figure 9:
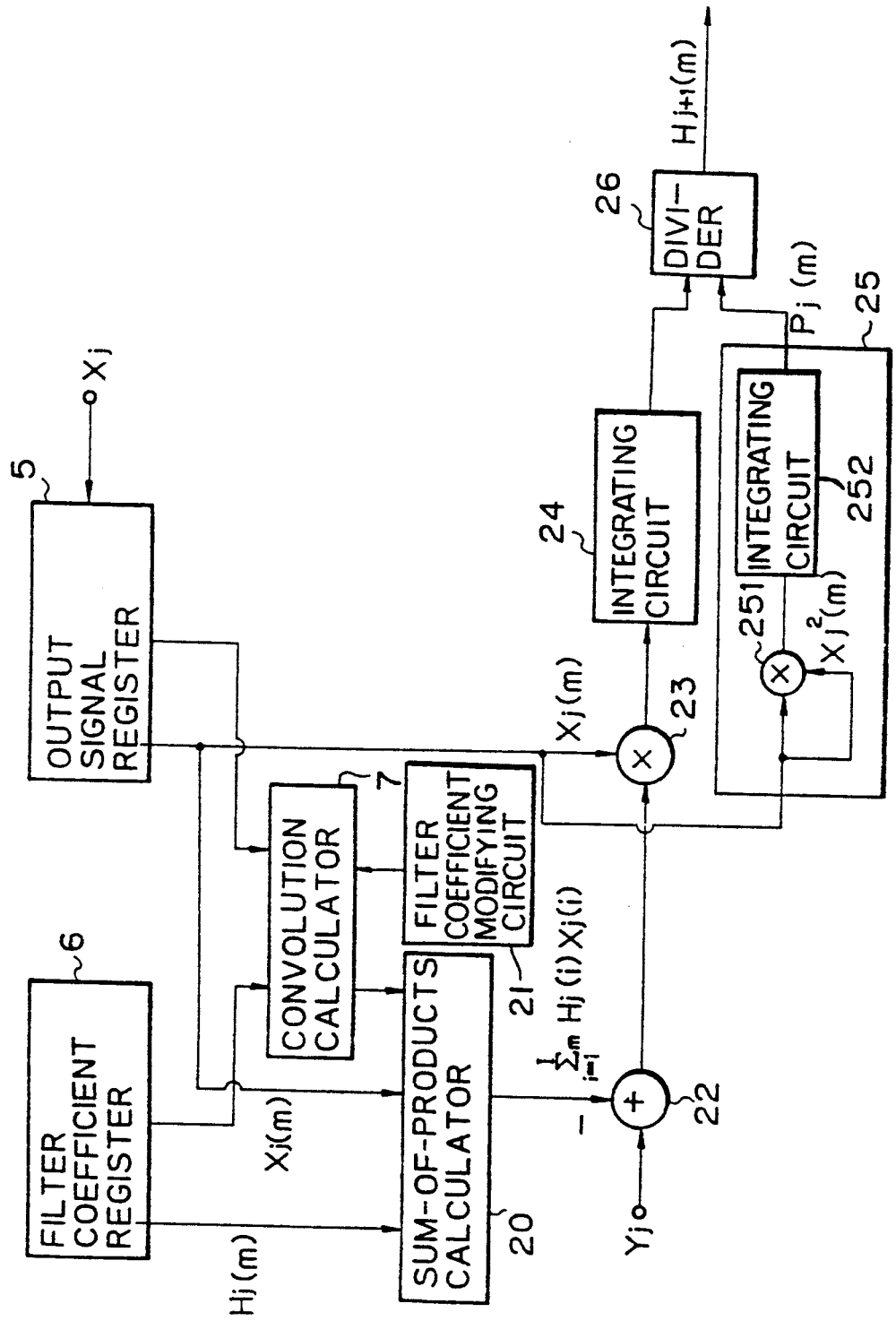
FIG. 9 shows a basic construction of the first embodiment of the present invention.

FIG. 9 shows a basic construction of the first embodiment of the present invention, for obtaining an estimated filter coefficient $H_{j+1}(m)$ corresponding to an m-th tap for the next sample time j+1 in the echo canceler. The construction of FIG. 9 realizes the above case wherein the normalization is carried out in the output side of the low-pass filter 32' of FIG. 8. In FIG. 9, the filter coefficient register 6, the output signal register 5, the convolution calculator 7, and the subtracter 22 are the same as the output signal register 5, the convolution calculator 7, and the subtracter 9 in FIGS. 1 and 2, and reference numeral 20 denotes a sum-of-products calculator, 21 denotes a filter coefficient modifying circuit, 23 denotes a multiplier, 24 denotes an integrating circuit, 25 denotes a power calculator, and 26 denotes a divider.

The sum-of-products calculator 20 receives the value $\Sigma H_j(i)X_j(i)$ from the convolution calculator 7, and the m-th filter coefficient $H_j(m)$ from the filter coefficient register 6, and the (m−1)-cycle-delayed sampled output signal $X_j(m)$ from the output signal register 5, and obtains the value $\Sigma_m H_j(i)X_j(i)$. The filter coefficient modifying circuit 21 modifies the filter coefficients $H_j(i)$ in the calculation of the value $\Sigma_m H_j(i)X_j(i)$ in the convolution calculator 7 or in the sum-of-products calculator 20 so that the calculated value $\Sigma_m H_j(i)X_j(i)$ is substantially reduced during a predetermined time from the beginning of the operation of the echo canceler to prevent the input to the following stage of the circuit of FIG. 9 from being damaged by inaccurate values $\Sigma_m H_j(i)X_j(i)$ which are calculated using the filter coefficients $H_j(i)$ which have not been converged yet. For example, the filter coefficient modifying circuit 21 modifies the filter coefficients $H_j(i)$ by making filter coefficients of predetermined taps zero, as explained later.

The subtracter 22 calculates the difference between the total input signal $Y_j(i)$ and the above value $\Sigma_m H_j(i)X_j(i)$, and the multiplier 23 multiplies the output $[Y_j(i)-\Sigma_m H_j(i)X_j(i)]$ of the subtracter 22 by the (m−1)-delayed sampled output signal $X_j(m)$ which is supplied from the output signal register 5. The integrating circuit 24 integrates the output of the multiplier 23 so that a component corresponding to the true echo path gain $h_j(m)$ is extracted from the output $[Y_j(i)-\Sigma_m H_j(i)X_j(i)]X_j(m)$ of the multiplier 23 by filtering out noise components, and comprises a low-pass filter wherein its low-pass filter coefficient $\alpha$ is a constant $\alpha'$, and the low-pass filter realizes the low-pass filter 32' in FIG. 8.

The power calculator 25 comprises a square calculator 251 and an integrating circuit 252 to calculate an integrated power $P_j(m)$ of the (m−1)-cycle-delayed sampled output signal $X_j(m)$. The divider 26 divides the output of the integrating circuit 24 by the power $P_j(m)$ of the (m−1)-cycle-delayed sampled output signal $X_j(m)$ to obtain the renewal value of the filter coefficient $H_{j+1}(m)$.

Sum-of-Products Calculator 20

Figure 10:
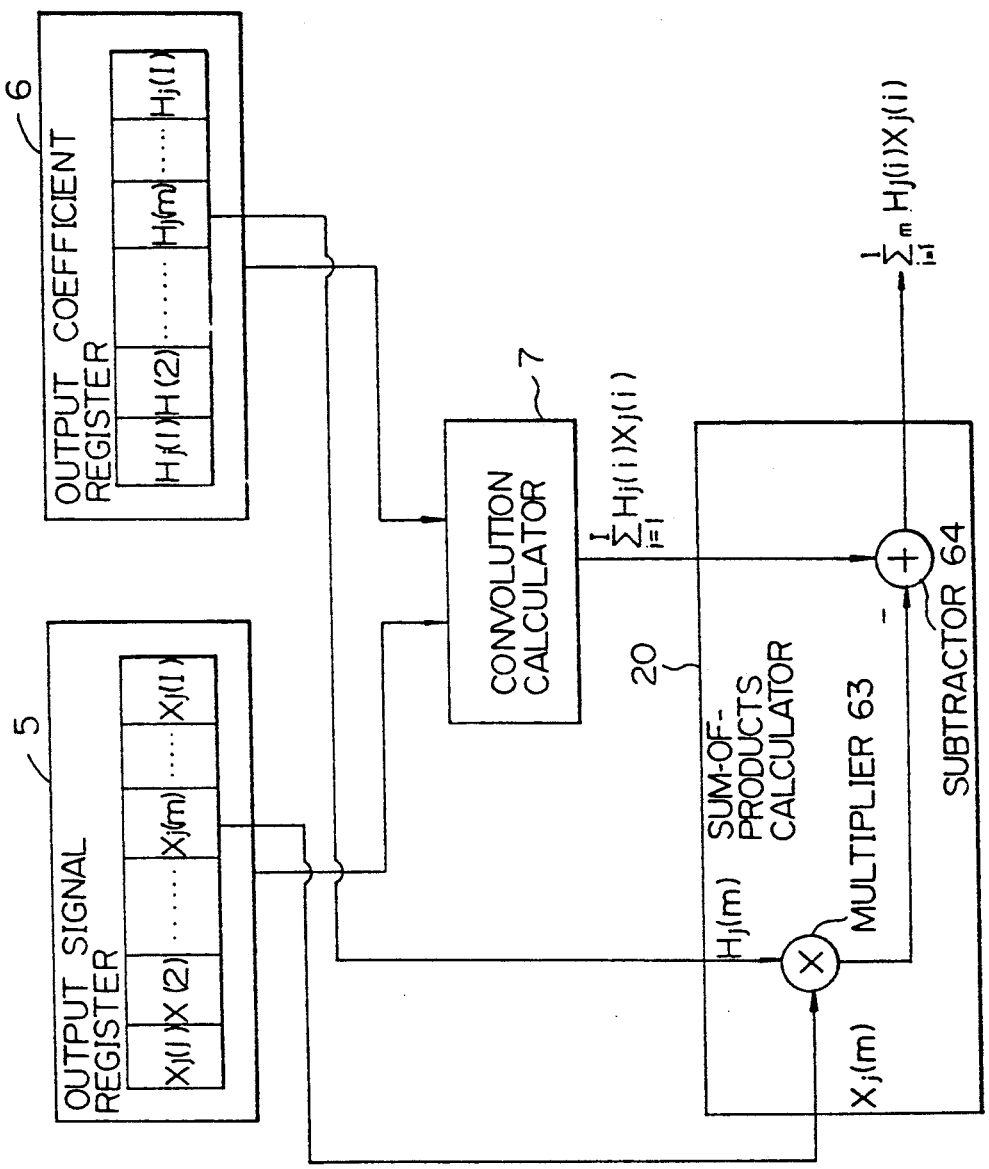
FIG. 10 shows an example of the construction of the sum-of-products calculator 20 in FIG. 9.

FIG. 10 shows an example of the construction of the sum-of-products calculator 20 in FIG. 9. The sum-of-products calculator 20 shown in FIG. 10 comprises a multiplier 63 and a subtracter 64. The multiplier 63 calculates the product of the (m−1)-cycle-delayed sampled output signal $X_j(m)$ which is supplied from the output signal register 5 and the estimated filter coefficient $H_j(m)$ which is supplied from the filter coefficient register 6. The subtracter 64 subtracts the product $H_j(m)X_j(m)$ from the convolution $\Sigma H_j(i)X_j(i)$ which is supplied from the convolution calculator 7 to obtain the value $\Sigma_m H_j(i)X_j(i)$.

Filter Coefficient Modifying Circuit 21

Figure 11:
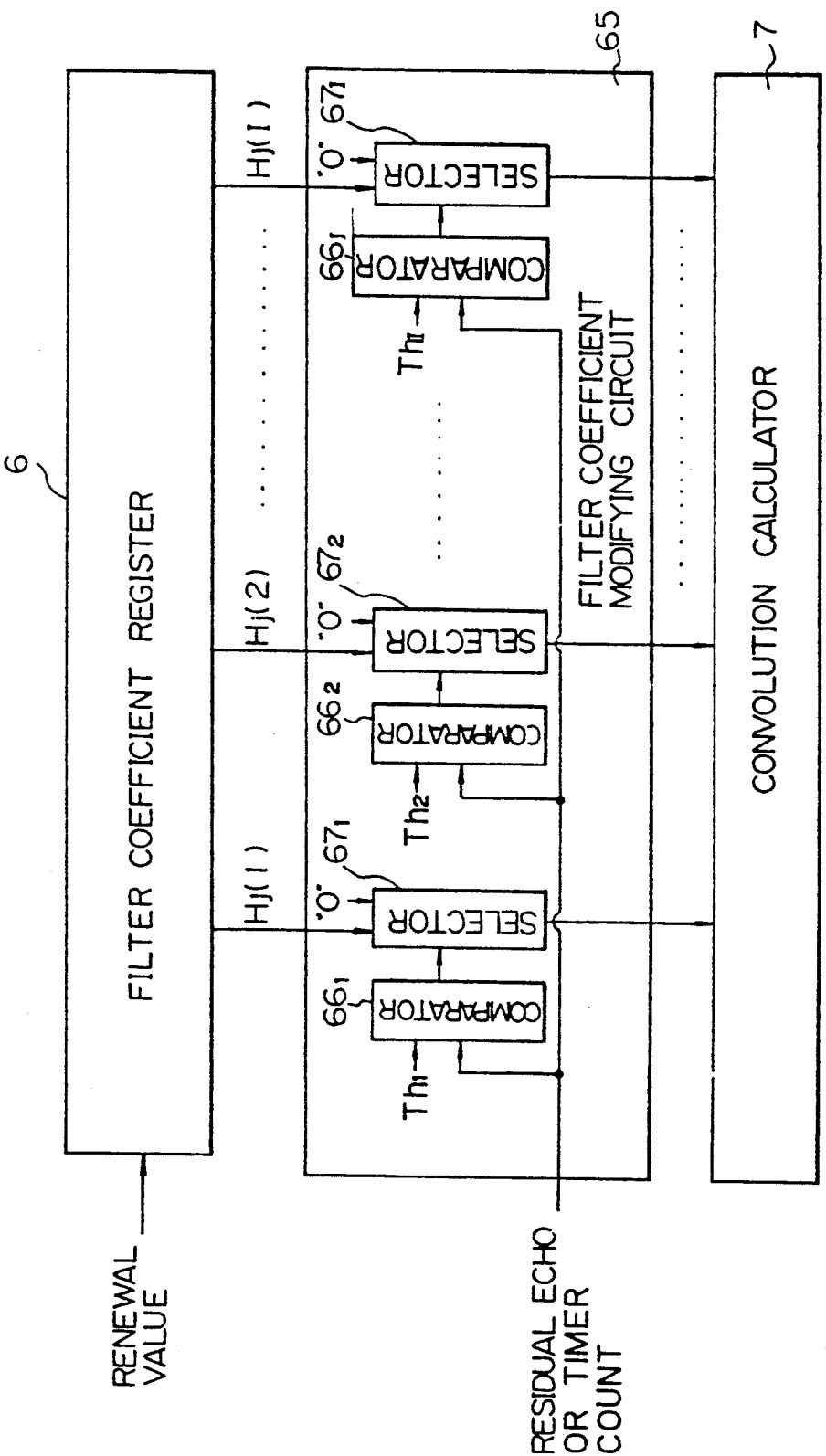
FIG. 11 shows a first example of the construction of the filter coefficient modifying circuit 21 in FIG. 9.

FIG. 11 shows a first example of the construction of the filter coefficient modifying circuit 21 in FIG. 9. In FIG. 11, reference numeral 65 denotes the first example of the filter coefficient modifying circuit 21 in FIG. 9, $66_1$, $66_2$, to $66I$ each denote a comparator, and $67_1$, $67_2$, to $67I$ each denote a selector. A pair comprised of a comparator $66i$ and a selector $67i$ (i =1 to I, i≠m) is provided for each tap of the adaptive digital filter except the tap i=m. The selector $67i$ receives the filter coefficient $H_j(i)$ and "0" value, and selects one of the received values as its output to the convolution calculator 7 under the control of the output of the corresponding comparator $66i$. The filter coefficient modifying circuit 65 receives the residual echo $E_j$ or a timer count. The comparator $66i$ compares the received residual echo $E_j$ or timer count with a respective threshold value Thi, and controls the corresponding selector $67i$ to select the "0" value as its output when the received residual echo $E_j$ or timer count is below the threshold value Thi, or to select the "0" value as its output when the received residual echo $E_j$ or timer count exceeds the threshold value Thi. Thus, the "0" value is supplied to the convolution calculator 7 instead of the estimated filter coefficient $H_j(i)$ during a predetermined time from the beginning of the operation of the echo canceler, or until the residual echo $E_j$ falls below a predetermined level, and therefore, the sum-of-products output from the sum-of-products calculator 20 is substantially reduced during a predetermined time from the beginning of the operation of the echo canceler, or until the residual echo $E_j$ falls below a predetermined level, to prevent the input to the following stage of the circuit of FIG. 9 from being damaged by inaccurate values $\Sigma_m H_j(i) X_j(i)$ which are calculated using the filter coefficients $H_j(i)$ which have not been converged yet.

Figure 12:
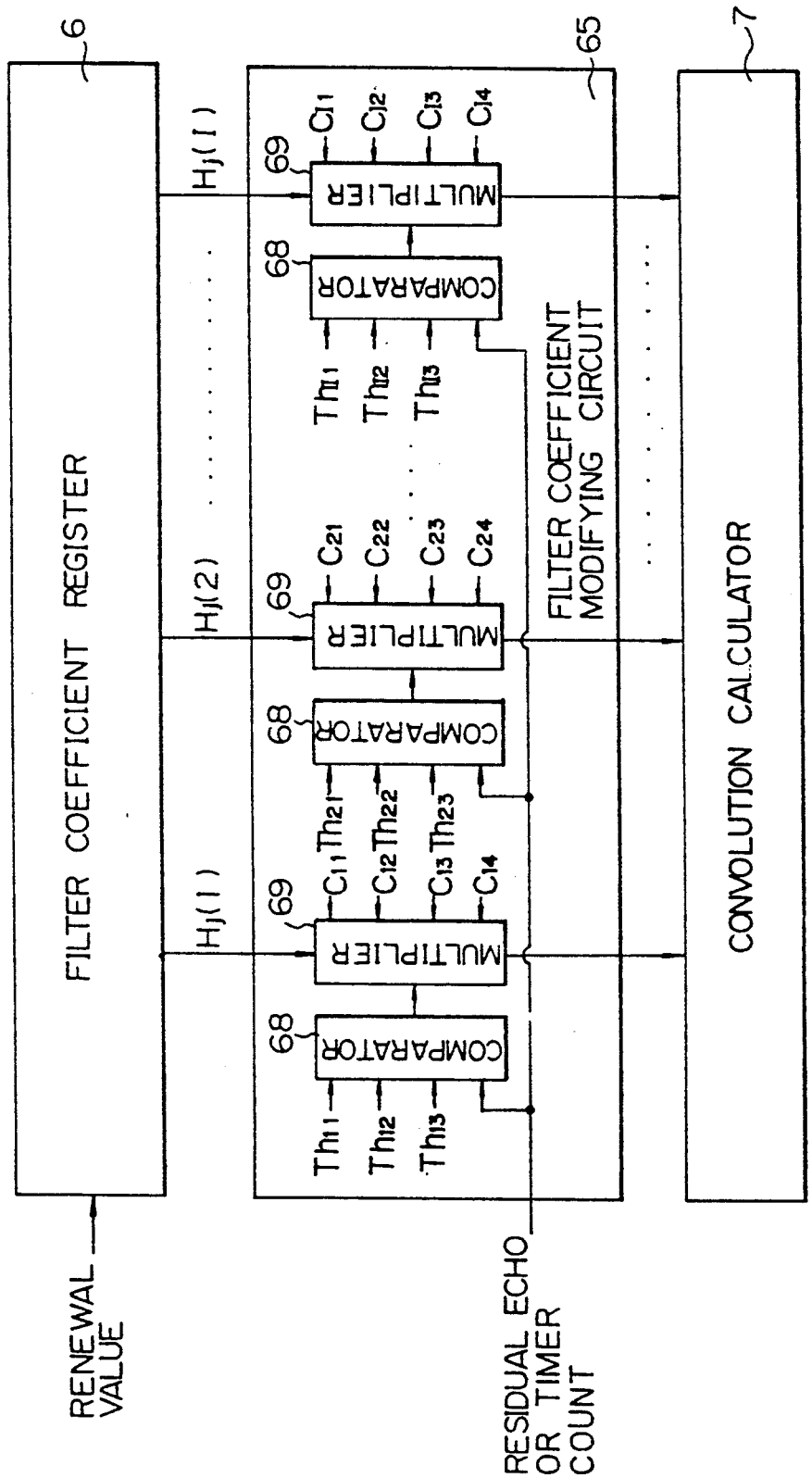
FIG. 12 shows a second example of the construction of the filter coefficient modifying circuit 21 in FIG. 9.

FIG. 12 shows a second example of the construction of the filter coefficient modifying circuit 21 in FIG. 9. In FIG. 12, reference numeral 65' denotes the second example of the filter coefficient modifying circuit 21 in FIG. 9, $68_1$, $68_2$, to $68I$ each denote a comparator, and $69_1$, $69_2$, to $69I$ each denote a multiplier. A pair comprised of a comparator $68i$ and a multiplier $69i$ (i=1 to I, i≠m) are provided for each tap of the adaptive digital filter except the tap i=m. The multiplier $69i$ receives the filter coefficient $H_j(i)$, multiplies the filter coefficient $H_j(i)$ by one of predetermined factors $C_{i1}$ to $C_{i4}$ which are non-negative values not more than one, under the control of the output of the corresponding comparator $68i$, and supplies the multiplied value to the convolution calculator 7 instead of the estimated filter coefficient $H_f(i)$ for the taps $i=1$ to I, $i \neq m$. The filter coefficient modifying circuit 65' receives the residual echo $E_j$ or a timer count. The comparator $68i$ compares the received residual echo $E_j$ or timer count with one or more threshold values $Th_{i1}$ to $Th_{i3}$ which are set therein in advance, and controls the corresponding multiplier $69i$ to use one of the predetermined factors $C_{i1}$ to $C_{i4}$ corresponding to the result of the comparison. The above threshold values $Th_{i1}$ to $Th_{i3}$ and the factors $C_{i1}$ to $C_{i4}$ are predetermined so that the output of the multipliers $68_1$, $68_2$, to $68I$ are substantially reduced during a predetermined time corresponding to the threshold $Th_{i1}$ from the beginning of the operation of the echo canceler, or until the residual echo $E_j$ falls below a predetermined level corresponding to the threshold $Th_{i1}$, and then the outputs of the multipliers $68_1$, $68_1$, to $68I$ are increased step by step, with an elapse of time or with a progress of convergence of the filter coefficient $H_f(m)$, by the multiplication by the factors $C_{i1}$ to $C_{i4}$ which are non-negative values not more than one. Thus, the sum-of-products output from the sum-of-products calculator 20 is substantially reduced during a predetermined time from the beginning of the operation of the echo canceler, or until the residual echo $E_j$ falls below a predetermined level, and then the sum-of-products output from the sum-of-products calculator 20 is increased step by step to the value $\Sigma_m H_f(i) X_f(i)$, with an elapse of time or with a progress of convergence of the filter coefficient $H_f(m)$, to prevent the input to the following stage of the circuit of FIG. 9 from being damaged by inaccurate values $\Sigma_m H_f(i) X_f(i)$ which are calculated using the filter coefficients $H_f(i)$ which have not been converged yet.

In the above examples of FIGS. 11 and 12, in the case where the filter coefficients $H_f(i)$ ($i=1$ to I) are initially set equal to zero, the comparators may compare the corresponding estimated filter coefficients $H_f(i)$ ($i=1$ to I, $i \neq m$) with the respective threshold values. In the above case, the filter coefficients $H_f(i)$ are changed from zero to the echo path gain $h_f(i)$ step by step by being renewed in each sample clock cycle.

In the construction of FIG. 11, the comparator $66i$ compares the filter coefficient $H_f(m)$ with a respective threshold value Thi, and controls the corresponding selector $67i$ to select the "0" value as its output when the filter coefficient $H_f(i)$ is below the threshold value Thi, or to select the "0" value as its output when the filter coefficient $H_f(m)$ exceeds the threshold value Thi. Thus, the "0" value is supplied to the convolution calculator 7 instead of the estimated filter coefficient $H_f(i)$ until the filter coefficient $H_f(i)$ exceeds a predetermined level, and therefore, a sum-of-products output from the sum-of-products calculator 20 is substantially reduced until the filter coefficient $H_f(i)$ exceeds a predetermined level, to prevent the input to the following stage of the circuit of FIG. 9 from being damaged by inaccurate values $\Sigma_m H_f(i) X_f(i)$ which are calculated using the filter coefficients $H_f(i)$ which have not been converged yet.

In the construction of FIG. 12, the comparator $68i$ compares the filter coefficient $H_f(i)$ with one or more threshold values $Th_{i1}$ to $Th_{i3}$ which are set therein in advance, and controls the corresponding multiplier $69i$ to use one of the predetermined factors $C_{i1}$ to $C_{i4}$ corresponding to the result of the comparison. The above threshold values $Th_{i1}$ to $Th_{i3}$ and the factors $C_{i1}$ to $C_{i4}$ are predetermined so that the outputs of the multipliers $68_1$, $68_2$, to $68I$ are substantially reduced until the filter coefficient $H_f(i)$ exceeds a predetermined level corresponding to the threshold $Th_{i1}$, and then the outputs of the multipliers $68_1$, $68_2$, to $68I$ are increased step by step, with a progress of convergence of the filter coefficient $H_f(m)$, by the multiplication by the factors $C_{i1}$ to $C_{i4}$ which are non-negative values not more than one. Thus, the sum-of-products output from the sum-of-products calculator 20 is substantially reduced until the filter coefficient $H_f(i)$ exceeds a predetermined level, and then the sum-of-products output from the sum-of-products calculator 20 is increased step by step to the value $\Sigma_m H_f(i) X_f(i)$, with a progress of convergence of the filter coefficient $H_f(m)$, to prevent the input to the following stage of the circuit of FIG. 9 from being damaged by inaccurate values $\Sigma_m H_f(i) X_f(i)$ which are calculated using the filter coefficients $H_f(i)$ which have not been converged yet.

Integrating Circuit 24

Figure 13:
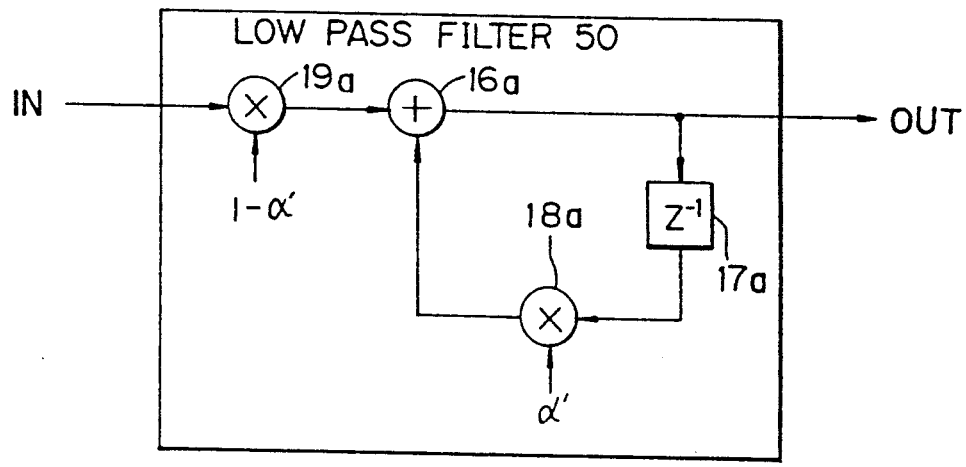
FIG. 13 shows a first example of the construction of the integrating circuit 24 in FIG. 9.

FIG. 13 shows a first example of the construction of the integrating circuit 24 in FIG. 9. In the example of FIG. 13, the integrating circuit 24 is constituted by a low-pass filter 50 wherein its low-pass filter coefficient $\alpha'$ is a constant.

Figure 14:
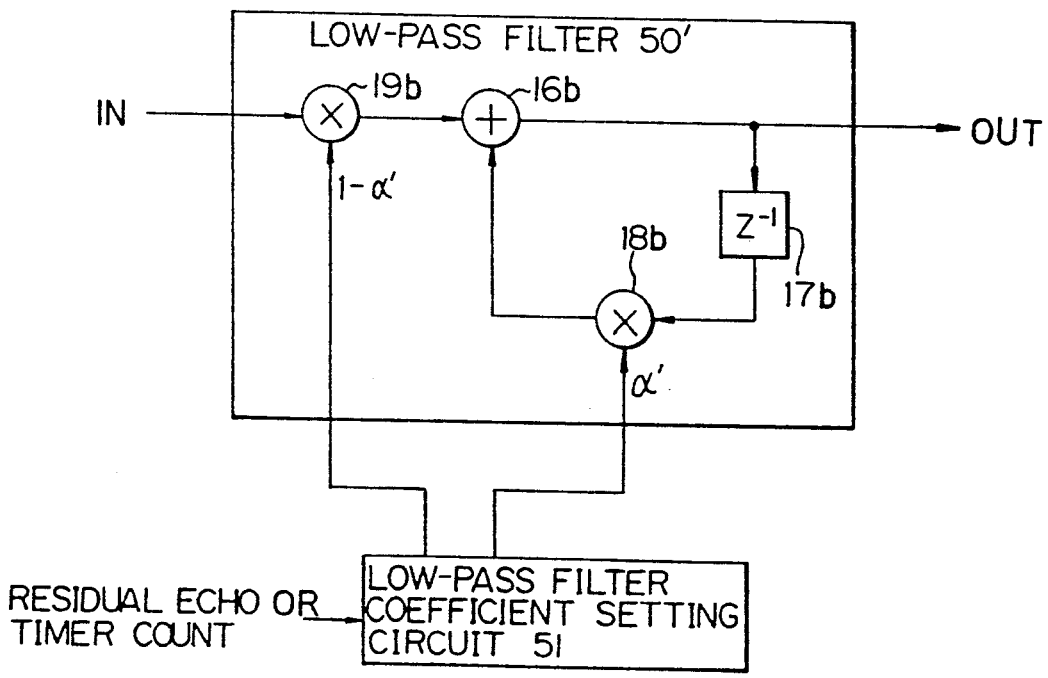
FIG. 14 shows a second example of the construction of the integrating circuit 24 in FIG. 9.

FIG. 14 shows a second example of the construction of the integrating circuit 24 in FIG. 9. In the example of FIG. 14, the integrating circuit 24 comprises a low-pass filter 50' wherein its low-pass filter coefficient $\alpha'$ is a constant. The low-pass filter coefficient setting circuit 51 sets the low-pass filter coefficient $\alpha'$ in the multipliers 19b and 18b in the low-pass filter 50' according to the amount of the residual echo $E_j$ or the elapse of time from the beginning of the operation of the echo canceler.

Although not shown in FIG. 14, the low-pass filter coefficient setting circuit 51 comprises a comparator wherein one or a plurality of threshold levels for a timer count each of which corresponds to a value of the low-pass filter coefficient $\alpha'$, and a memory storing the values of the low-pass filter coefficients $\alpha'$. The low-pass filter coefficient setting circuit 51 sets a small value near zero at the beginning of the operation of the echo canceler, receives the timer count, and then renews the low-pass filter coefficient $\alpha'$ in the multipliers 18b and 19b to one of the above values when the received timer count exceeds the corresponding predetermined threshold level with the elapse of time. The above values of the low-pass filter coefficient $\alpha'$ which are memorized in the memory, correspond to the respective threshold levels so that the low-pass filter coefficient $\alpha'$ increases from the above small value near zero to a value near one with the increase in the timer count.

The low-pass filter coefficient setting circuit 51 may alternately comprise a comparator wherein one or a plurality of threshold levels for an amount of the residual echo $E_j$ each of which corresponds to a value of the low-pass filter coefficient $\alpha'$, and a memory storing the values of the low-pass filter coefficients $\alpha'$. The low-pass filter coefficient setting circuit 51 sets a small value near zero at the beginning of the operation of the echo canceler, receives the residual echo $E_j$, and then renews the low-pass filter coefficient $\alpha'$ in the multipliers 18b and 19b to one of the above values when the received residual echo $E_j$ exceeds the corresponding predetermined threshold level. The above values of the low-pass filter coefficient $\alpha'$ which are memorized in the memory, correspond to the respective threshold levels so that the low-pass filter coefficient $\alpha'$ increases from the above small value near zero to a value near one with the increase in the residual echo $E_j$.

By the above setting (increasing) of the low-pass filter coefficient $\alpha'$, the progress in the convergence is accelerated in the beginning of the operation of the echo canceler, and accurate convergence is obtained after the convergence is achieved to a predetermined degree.

Figure 15:
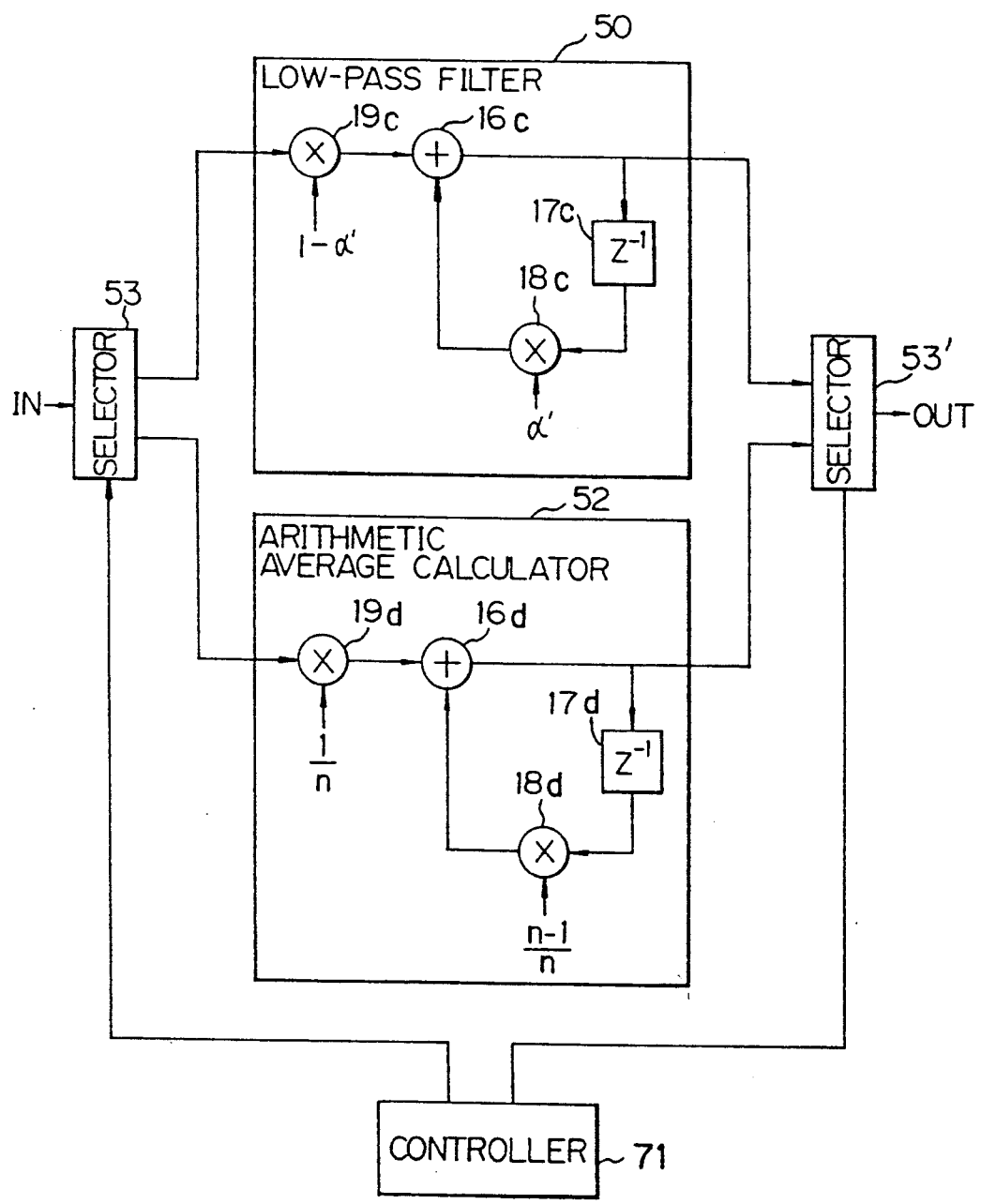
FIG. 15 shows a third example of the construction of the integrating circuit 24 in FIG. 9.

FIG. 15 shows a third example of the construction of the integrating circuit 24 in FIG. 9. In the example of FIG. 15, the integrating circuit 24 comprises a low-pass filter 50' wherein its low-pass filter coefficient $\alpha'$ is a constant, an arithmetic average calculator 52 wherein its low-pass filter coefficient is equal to $(n-1)/n$, selectors 53 and 53' and a controller 71. In the construction of FIG. 15, the low-pass filter 50'' and the arithmetic average calculator 52 are alternatively used. The selectors 53 and 53' are provided in the input and output sides of the construction of FIG. 15. The selector 53 supplies the output of the multiplier 23 of FIG. 9 to one of the low-pass filter 50'' and the arithmetic average calculator 52, and the selector 53' selects as its output one of the outputs of the low-pass filter 50'' and the arithmetic average calculator 52. The output of the selector 53' is supplied to the divider 26 in FIG. 9.

The controller 71 controls the above selections in the selectors 53 and 53' according to the level of the residual echo Ej or elapse of time, i.e., the controller 71 controls the above selections in the selectors 53 and 53' so that both the selectors 53 and 53' select the arithmetic average calculator 52 until the predetermined time elapses from the beginning of the operation of the echo canceler, or until the residual echo $E_j$ falls below a predetermined level, and both the selectors 53 and 53' select the low-pass filter 50'' after the predetermined time elapses from the beginning of the operation of the echo canceler, or after the residual echo $E_j$ falls below a predetermined level. For example, the arithmetic average calculator 52 is used when all the filter coefficients $H_f(i)$ are made zero in the calculation of convolution in the convolution calculator 7 under the control of the filter coefficient modifying circuit 21 in FIG. 9 as mentioned before.

The low-pass filter 50'' in FIG. 15 may be the same as the low-pass filters shown in FIGS. 13 and 14. The arithmetic average calculator 52 is explained below. The arithmetic average calculator 52 has a construction similar to the low-pass filter 50'', but the multiplication factor in the multiplier 19d is equal to $1/n$, and the multiplication factor in the multiplier 18d is equal to $(n-1)/n$, where n is the number of the samples which is counted from the beginning of the operation of the echo canceler.

When the input of the arithmetic average calculator 52 is denoted by $A(j)$, and the output of the arithmetic average calculator 52 corresponding to the input $A(j)$ is denoted by $B(j)$, the operations of the arithmetic average calculator 52 from the first sample are as follows.

$$\begin{aligned}
B(1) &= A(1) \\
B(2) &= A(1)/2 + A(2)/2 = [A(1) + A(2)]/2 \\
B(3) &= B(2) \times 2/3 + A(3)/3 \\
&= [A(1) + A(2)]/2 \times 2/3 + A(3)/3 \\
&= [A(1) + A(2) + A(3)]/3 \\
B(4) &= B(3) \times 3/4 + A(4)/4 \\
&= [A(1) + A(2) + A(3)]/3 \times 3/4 + A(4)/4 \\
&= [A(1) + A(2) + A(3) + A(4)]/4
\end{aligned}$$

-continued

...

Namely, the arithmetic average of the samples which are successively input into the arithmetic average calculator 52 is obtained as the output thereof. The multiplying factors $1/n$ and $(n-1)/n$ in the multipliers 19d and 18d are controlled by the controller 71 in the construction of FIG. 15.

The convergence rate in the integrating operation by the arithmetic average calculator and the low-pass filter are compared below. When the number of the samples is denoted by q, and the dispersion of the input is denoted by $\sigma^2$, the dispersion of the output of the low-pass filter is equal to $\sigma^2 \cdot (1-\alpha)$ where $\alpha$ is the low-pass filter coefficient and the dispersion of the output of the arithmetic average calculator is $\sigma^2/q$. Therefore, to obtain the same dispersion as the arithmetic average calculator by the low-pass filter, $$(1-\alpha) = 1/q$$

must be satisfied. For example, when $q=256$, $\alpha$ must be $\alpha = 255/256$. The dispersion of the output of the q-times integration through a low-pass filter is equal to $\sigma^2 \cdot (1-\alpha q)$. Therefore, at the convergence time is equal to 90% of the converged value, $$1\alpha^q = 0.9.$$

Therefore, $\alpha^q = 0.1$, and the convergence time q to 90% is $q=588$ when $\alpha=255/256$. On the other hand, the convergence time q to 90% is $q=256$ in the arithmetic average calculator. As understood from the above example, the integrating operation by the arithmetic average calculator is faster than the operation by the low-pass filter.

However, an error which is generated in the process of the estimation of the echo path gain (filter coefficient $H_f(i)$) decreases with $\alpha^q$ in the low-pass filter, but decreases with $1/q$ in the arithmetic average calculator. Namely, in the integrating operation by the arithmetic average calculator, the influence of the error remains for a long time. Therefore, it is advantageous to use the arithmetic average calculator only when all the filter coefficients $H_f(i)$ are made zero in the calculation of convolution in the convolution calculator 7 under the control of the filter coefficient modifying circuit 21 in FIG. 9. Thus, in the construction of FIG. 15, the fast convergence rate is realized in the arithmetic average calculator 52 in the beginning of the operation of the echo canceler without suffering from the filter coefficients $H_f(i)$ which are not converged yet. Then, after the filter coefficients $H_f(i)$ are made non-zero values in the calculation of convolution in the convolution calculator 7, the operation is switched to the low-pass filter 50'' to make the converging operation stable.

Figure 16:
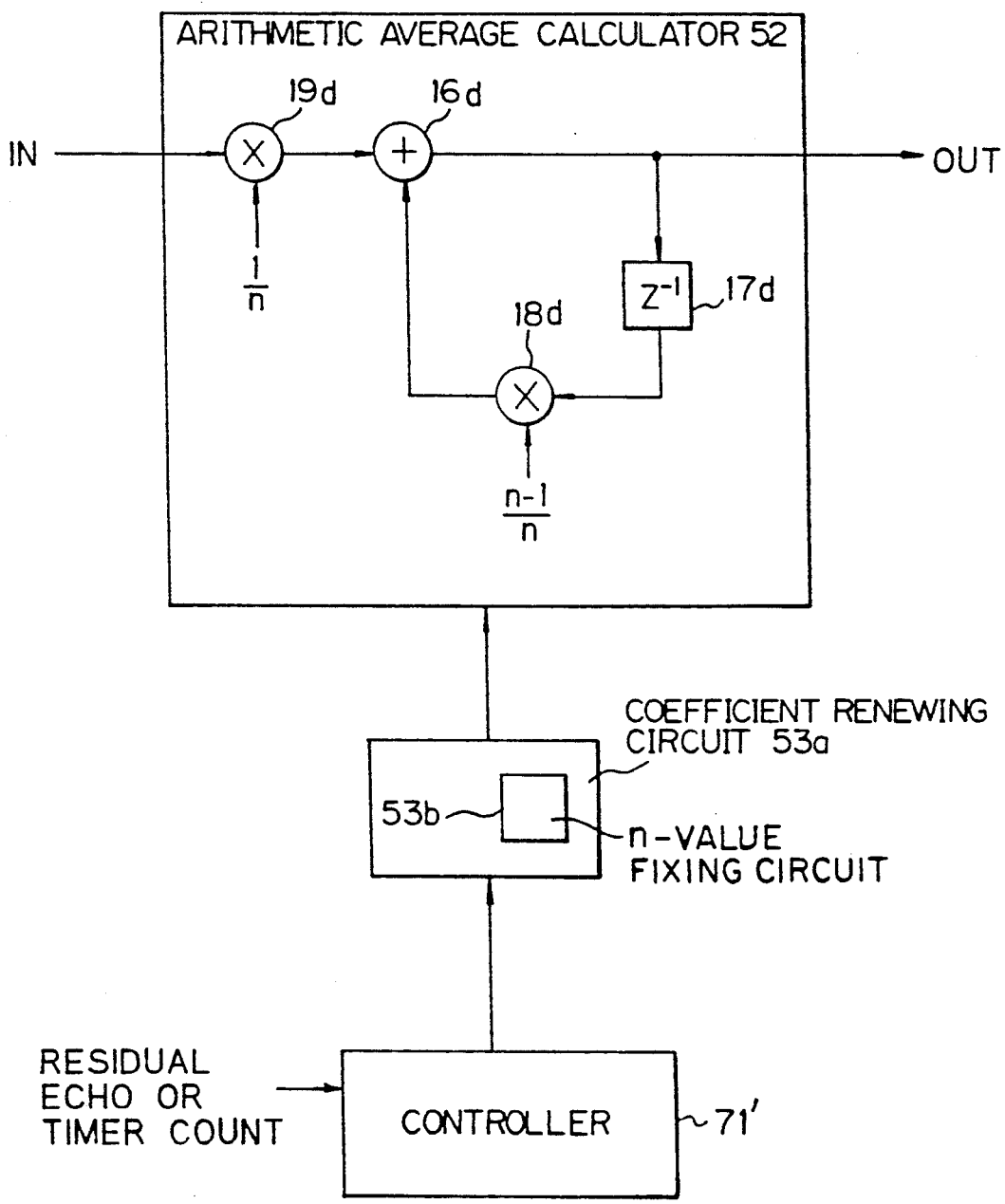
FIG. 16 shows a fourth example of the construction of the integrating circuit 24 in FIG. 9.

FIG. 16 shows a fourth example of the construction of the integrating circuit 24 in FIG. 9. In the example of FIG. 16, the arithmetic average calculator 52 is the same as the arithmetic average calculator shown in FIG. 15. In the construction of FIG. 16, the same function as the construction of FIG. 15 is realized by a renewing and fixing operation of the multiplying factors $1/n$ and $(n-1)$ in the multipliers 19d and 18d under the control of the controller 71' through the coefficient renewing circuit 53a which contains an n-value fixing circuit 53b.

Similar to the construction of FIG. 15, the circuit of FIG. 16 operates as an arithmetic average calculator until a predetermined time elapses from the beginning of the operation of the echo canceler when all the filter coefficients $H_j(i)$ are made zero in the calculation of convolution in the convolution calculator 7 under the control of the filter coefficient modifying circuit 21 in FIG. 9, or until the residual echo $E_j$ falls below a predetermined level. The controller 71' controls the coefficient renewing circuit 53a to set a value equal to $1/n$ and $(n-1)/n$ as the multiplying factors in the multipliers 19d and 18d at each sampling cycle, where n is equal to the number of the samples which are input into the construction of FIG. 16 from the beginning of the operation of the echo canceler.

Then, after the filter coefficients $H_j(i)$ are made nonzero values in the calculation of convolution in the convolution calculator 7, or after the residual echo $E_j$ falls below a predetermined level, the controller 71' controls the coefficient renewing circuit 53a to stop the above operation of setting the multiplying factors at each sampling cycle, and controls the n-value fixing circuit 53b to operate. The n-value fixing circuit 53b fixes the multiplying factors in the multipliers 19d and 18d to a predetermined value to make the converging operation stable.

POWER CALCULATOR 25

Figure 17:
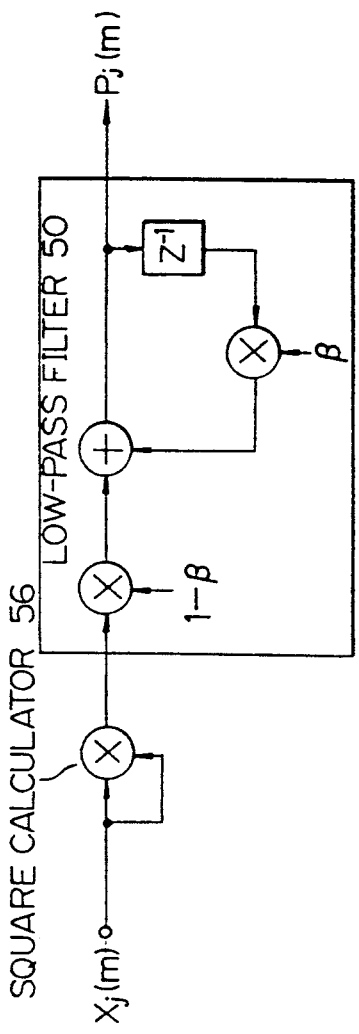
FIG. 17 shows a first example of the construction of the power calculator 25 in FIG. 9.

FIG. 17 shows a first example of the construction of the power calculator 25 in FIG. 9. The power calculator shown in FIG. 17 comprises a square calculator 56 and a low-pass filter 50. The square calculator 56 calculates the square of the (m−1)-cycle-delayed sampled output signal $X_j(m)$ which is supplied from the output signal register 5, and the low-pass filter 50 obtains an integrated value of the square of the (m−1)-cycle-delayed sampled output signal $X_j(m)$ as the integrated power $P_j(m)$ of the (m−1)-cycle-delayed sampled output signal $X_j(m)$.

Figure 18:
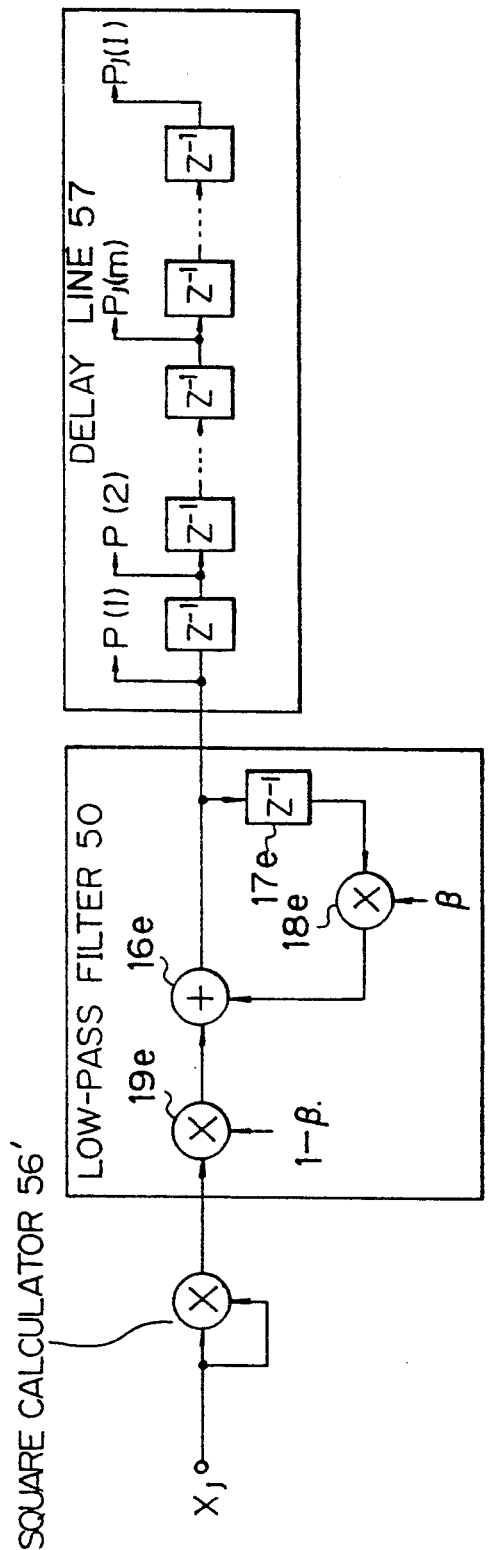
FIG. 18 shows a second example of the construction of the power calculator 25 in FIG. 9.

FIG. 18 shows a second example of the construction of the power calculator 25 in FIG. 9. The power calculator shown in FIG. 18 is commonly provided for all the filter coefficients $H_j(i)$ where i=1 to I. The power calculator shown in FIG. 18 comprises a square calculator 56' and a low-pass filter 50' and a delay line 57, which are the same as FIG. 16. The power calculator 56' calculates the square of the sampled output signal $X_j$. The low-pass filter 50' obtains an integrated value of the square of the sampled output signal $X_j$. The integrated square of the sampled output signal $X_j$ which is output from the low-pass filter 50, is serially input into the delay line 57. The delay line 57 comprises I−1 delay circuits which are connected in series, and each of the delay circuits delays its input signal by one sampling clock cycle. The delay line 57 outputs i-cycle-delayed integrated squares of sampled output signals $X_j$ in parallel from the I−1 delay circuits, where i=1 to I−1. In FIG. 18, the output of the low-pass filter 50 is denoted by $P_j(1)$, and the i-cycle-delayed integrated square of the sampled output signal $X_j$ from the delay line 57, is denoted by $P_j(i+1)$, where i=1 to I−1. The outputs $P_j(i)$ are respectively the same as the power output from the low-pass filter 50 in FIG. 17.

Figure 19:
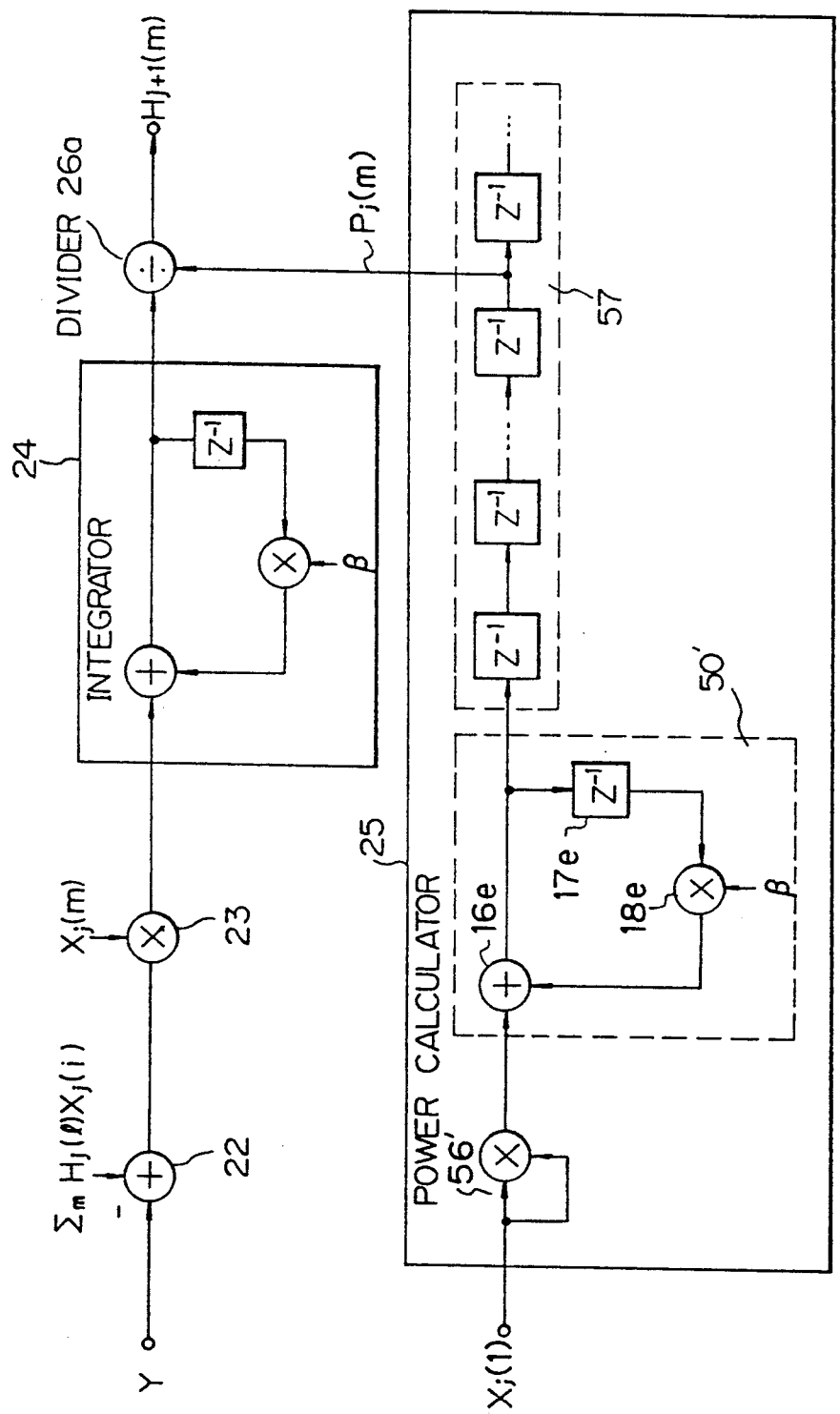
FIG. 19 shows the construction of FIG. 9 when the integrating circuit of FIG. 13 and the power calculator of FIG. 18 are applied thereto.
Figure 20:
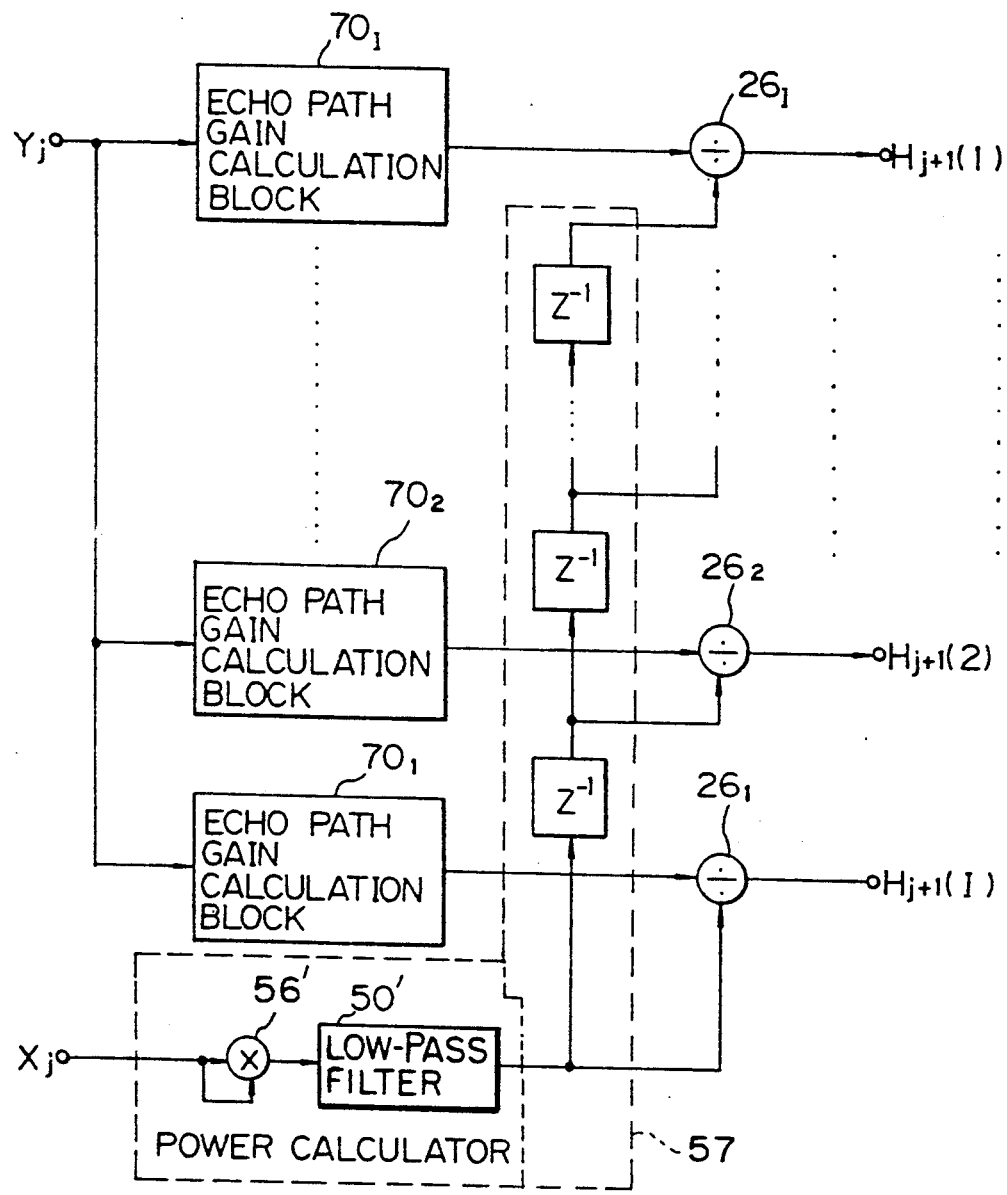
FIG. 20 shows the construction of FIG. 19 for all the filter coefficients $H_j(i)$ where $i=1$ to I.

FIG. 19 shows the construction of FIG. 9 when the integrating circuit of FIG. 13 and the power calculator of FIG. 18 are applied thereto. As shown in FIG. 19, the multiplier 19a of FIG. 13 and the multiplier 19e of FIG. 18 are not provided in the construction of FIG. 19 because the operations of the multiplier 19a of FIG. 13 and the multiplier 19e of FIG. 18 are canceled by the division in the divider 26 when the low-pass filter coefficient $\alpha'$ in the multiplier 19a of FIG. 13 and the low-pass filter coefficient $\beta'$ in the multiplier 19e of FIG. 18 is set the same. Generally, the low-pass filter coefficient $\alpha'$ in the multiplier 19a of FIG. 13 and the low-pass filter coefficient $\beta'$ in the multiplier 19e of FIG. 18 need not be set to the same when the integrating circuit 24 of FIG. 9 operates as an arithmetic average calculator, however, the low-pass filter coefficient $\alpha'$ in the multiplier 19a of FIG. 13 and the low-pass filter coefficient $\beta'$ in the multiplier 19e of FIG. 18 must be set the same when the integrating circuit 24 of FIG. 9 operates as a low-pass filter for realizing the normalization in the output side of the low-pass filter which is explained before with reference to FIG. 8. FIG. 20 shows the construction of FIG. 19 for all the filter coefficients $H_j(i)$ where i=1 to I. In FIG. 20, the construction containing the subtracter 22, the multiplier 23, and integrating circuit 24, is denoted by the echo path gain calculation block 70i where i=1 to I.

Alternatively, in the construction of FIG. 9, if a reciprocal circuit is provided in the output side of the power calculator 25, the divider 26 may be replaced with a multiplier. Since, generally, a dividing operation requires more steps than a multiplying operation in processing in a digital signal processor, the processing time can be reduced by the above alternative.

Figure 21:
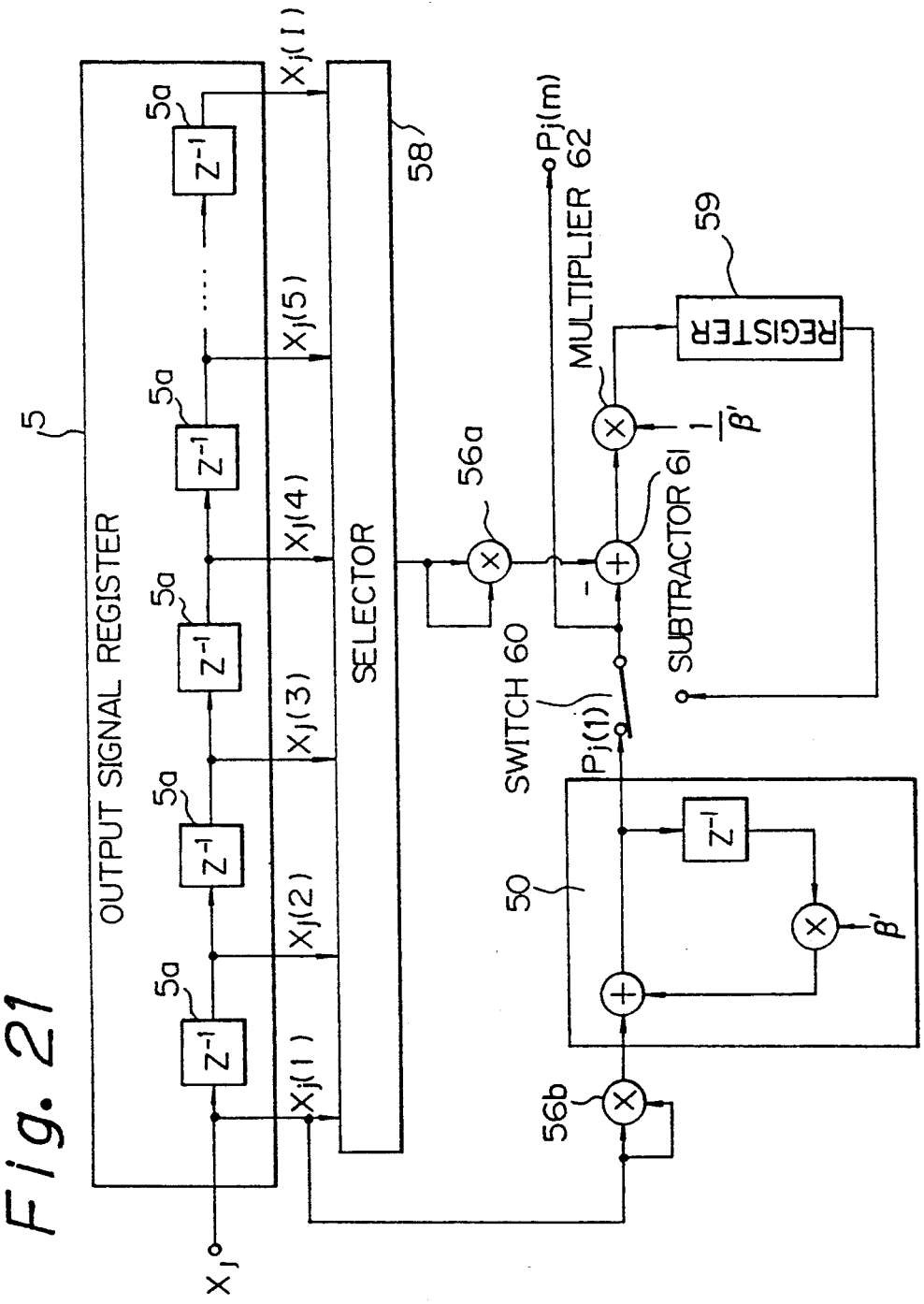
FIG. 21 shows a third example of the construction of the power calculator 25 in FIG. 9.

FIG. 21 shows a third example of the construction of the power calculator 25 in FIG. 9. The third example of the construction of the power calculator shown in FIG. 21, comprises a selector 58, two square calculators 56a and 56b, a low-pass filter 50'', a register 59, a switch 60, a subtracter 61, and a multiplier 62. The selector 58 selects one of the (i−1)-cycle-delayed sampled output signals $X_j(i)=X_{j+i-1}$ from the output signal register 5 where i=1 to I. The square calculator 56a calculates the square $X_{j+i-1}^2$ of the selected output of the selector 58, and the square $X_{j+i-1}^2$ is supplied to the subtracter 61 as a subtrahend, where i=1 to I.

On the other hand, the square of the sampled output signal $X_j$ is calculated in the square calculator 56b, and is integrated through the low-pass filter 50'' to obtain the integrated power $P_j(1)=P_j$. The integrated power $P_j(1)$ is expressed as $$P_j(1) = X_j^2 + \beta' \cdot X_{j-1}^2 + \beta'^2 \cdot X_{j-2}^2 + \beta'^3 \cdot X_{j-3}^2 + \beta'^4 \cdot X_{j-4}^2 + \ldots.$$

First, the above integrated power $P_j(1)$ from the low-pass filter 50'' is output through the switch 60 to the output terminal of the construction of FIG. 21. In parallel with the above, the integrated power $P_j(1)$ is supplied to the multiplier 62 through the subtractor 61, where the above subtrahend is controlled to be zero. The integrated power $P_j(1)$ is then multiplied by $1/\beta'$ in the multiplier 62, and the multiplied value $P_j(1)/\beta'$ is held in the register 59.

Next, the switch 60 is disconnected from the output terminal of the low-pass filter 50'', and is connected to the output terminal of the register 59. Therefore, the content of the register 59 is supplied to the subtracter 61 as a minuend. At this time, the delayed sampled output signal $X_j(1)=X_j$ is supplied to the subtracter 61 as a subtrahend, since the delayed sampled output signal $X_j(1)$ is selected in the selector 58. Thus, in the subtracter 61, the amount $(P_j(1)-X_j^2)$ is obtained, and the amount is multiplied by $1/\beta'$ in the multiplier 62, and the multiplied value $(P_j(1)-X_j^2)/\beta'$ is held in the register 59. The value $(P_j(1)-X_j^2)/\beta'$ is expressed as $$(P_j(1) - X_j^2)/\beta' = X_{j-1}^2 + \beta' \cdot X_{j-2}^2 + \beta'^2 \cdot X_{j-3}^2 +$$
$$\beta'^3 \cdot X_{j-4}^2 + \beta'^4 \cdot X_{j-5}^2 + \ldots$$

Namely, $(P_j(1)-X_j^2)/\beta'=P_j(2)=P_{j-1}$ is obtained.

The value $P_j(2)=P_{j-1}$ is held in the register 59. Then, the content of the register 59 is supplied to the subtractor 61 as a minuend. At this time, the delayed sampled output signal $X_j(2)=X_{j-1}$ is supplied to the subtracter 61 as a subtrahend, since the delayed sampled output signal $X_j(2)$ is selected in the selector 58. Thus, in the subtracter 61, the amount $(P_j(2)-X_{j-1}^2)$ is obtained, and the amount is multiplied by $1/\beta'$ in the multiplier 62, and the multiplied value $(P_j(2)-X_{j-1}^2)/\beta'$ is held in the register 59. The value $(P_j(2)-X_{j-1}^2)/\beta'$ is expressed as $$(P_j(2) - X_{j-1}^2)/\beta' = X_{j-2}^2 + \beta' \cdot X_{j-3}^2 + \beta'^2 \cdot X_{j-4}^2 +$$
$$\beta'^3 \cdot X_{j-5}^2 + \beta'^4 \cdot X_{j-6}^2 + \ldots$$

Namely, $(P_j(2)-X_j^2)/\beta'=P_j(3)=P_{j-2}$ is obtained. Similarly, the integrated powers $P_j(i)$ are obtained for $i=1$ to I.

Alternatively, the above result of the integrated powers $P_j(i)$ for $i=1$ to I are obtained when the input $X_j(1)$ of the square calculator 56b is replaced with $X_j(I)$, the multiplying factor $1/\beta'$ is replaced with $\beta'$ in the multiplier 62, and the order of the selection of the $(i-1)$-cycle-delayed sampled output signals $X_j(i)$ the selector 58 is made opposite to the order in the operation explained above.

Setting of the Low-Pass Filter Coefficients in the Low-Pass Filter in the Integrating Circuit 24

The convergence rate in the above operation for estimating the true echo path gain $h_j(m)$ and the accuracy in the estimated echo path gain (filter coefficient) $H_j(m)$ depend greatly on the value of the low-pass filter coefficient $\alpha'$ in the low-pass filter in the integrating circuit 24. As explained later, it is found as a result of a computer simulation that there is a value of the low-pass filter coefficient $\alpha'$ which gives the optimum setting for the estimation of the echo path gain $h_j(m)$. The value is determined as $$\alpha'=(\Gamma-1)/\Gamma, \qquad (11)$$

where $\Gamma$ is the number of taps corresponding to a reverberation time in the system.

Since an additional noise $N_j$ exists, in practice, it is desirable to use a value of $\alpha'$ which is a little larger than the above optimum value.

Initial Setting of the Registers 5 and 6

Further, when starting the operation of the echo canceler, it is advantageous to clear (set to zero) the output signal register 5 and the filter coefficient register 6 so that the operation of the echo canceler is not damaged by the past data. At least, the content of the filter coefficient register 6 corresponding to a minimum time from the beginning of the operation of the echo canceler which is necessary for an output signal to generate an echo signal in the echo path, must be cleared in the initial condition. The above initial setting makes the convergence of the filter coefficients fast.

Second Embodiment of the Present Invention

Figure 22:
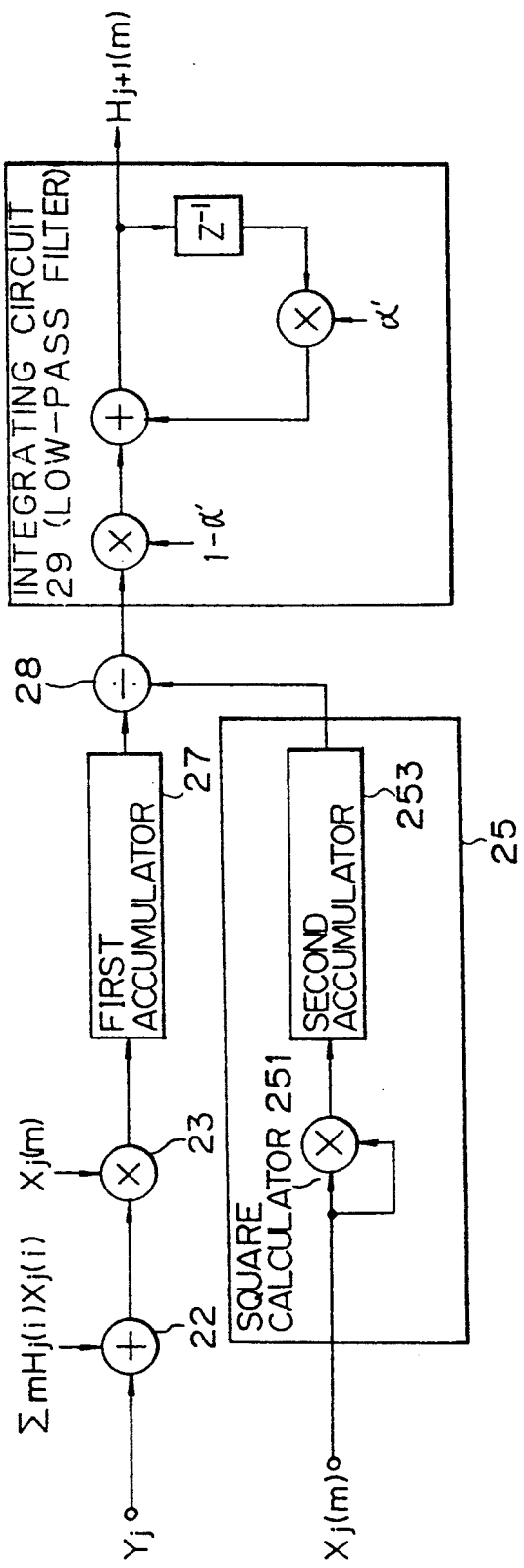
FIG. 22 shows a construction of the second embodiment of the present invention, for obtaining an estimated filter coefficient $H_{j+1}(m)$ corresponding to an m-th tap for the next sample time $j+1$ in the echo canceler.

FIG. 22 shows a construction of the second embodiment of the present invention, for obtaining an estimated filter coefficient $H_{j+1}(m)$ corresponding to mth tap for the next sample time $j+1$ in the echo canceler. The construction of FIG. 22 realizes the case wherein the normalization is carried out in the input side of the low-pass filter 32' of FIG. 8. In FIG. 22, the subtracter 22, the multiplier 23, and the square calculator 251 are the same as the corresponding constructions in the first embodiment as shown in FIG. 9, and reference numeral 25 denotes a power calculator, 27 denotes a first accumulator, 253 denotes a second accumulator, 28 denotes a divider, and 29 denotes an integrating circuit. Since the construction for generating the sum-of-products $\Sigma_m H_j(i)X_j(i)$ which is to be supplied to the subtracter 22, is the same as the corresponding construction shown in FIG. 9 for the first embodiment of the present invention, the construction is not shown in FIG. 22. The integrating circuit 29 comprises a low-pass filter that corresponds to the low-pass filter 32' in FIG. 8.

Each of the first and second accumulators 27 and 253 accumulates a predetermined number of successive inputs thereof, and the accumulated result of the first accumulator 27 is supplied to the divider 28 as a dividend, and the accumulated result of the second accumulator 253 is supplied to the divider 28 as a divisor. Since the output of the multiplier 23 is $$[Y_j - \Sigma_m H_j(i)X_j(i)] \cdot X_j(m) = [h_j(m)X_j(m) + Q_j(m)X_j(m)] \cdot$$
$$X_j(m) = h_j(m)X_j(m)^2 + Q_j(m)X_j(m)^2,$$

when the accumulation is carried out from $j=k+1$ to $k+N$, the accumulated value of the first accumulator 27 is $$[h_j(m) + Q_j(m)] \cdot \sum_{n=1}^{N} X_{j+k}(m)^2.$$

The accumulated value of the second accumulator 253 is $$\sum_{n=1}^{N} X_{j+k}(m)^2.$$

Therefore, the output of the divider 28 is $$[h_j(m)+Q_j(m)].$$

Namely, the normalization is realized in the input side of the low-pass filter. When the normalization is carried out in the input side of the low-pass filter as above, the sampling frequency is converted to a lower value in the first accumulator 27, and therefore, the construction in the following stages can be easily realized. The integrating circuit 29 integrates the output of the divider 28 so that a component corresponding to the true echo path gain $h_j(m)$ is extracted from the output of the divider 28 by filtering out noise components.

Although, in the construction of FIG. 22, the integrating circuit 29 is shown as a low-pass filter, the integrating circuit 29 may be realized by any of the constructions of the integrating circuits of FIGS. 14, 15, and 16, the power calculator 25 may be realized by any of the constructions of FIGS. 17, 18, and 19, and any of the realizations and the modifications which have been explained in the first embodiment for the integrating circuit, the power calculator, the sum-of-products calculator, and the filter coefficient modifying circuit, may be applied in the second embodiment. In addition, the optimum value of the lowpass filter coefficient $\alpha'$ in the low-pass filter in the construction of the second embodiment is obtained in the same manner as the first embodiment. Further, the same initial setting of the output signal register 5 and the filter coefficient register 6 as explained for the first embodiment, can be applied to the second embodiment.

Third Embodiment of the Present Invention

Figure 23:
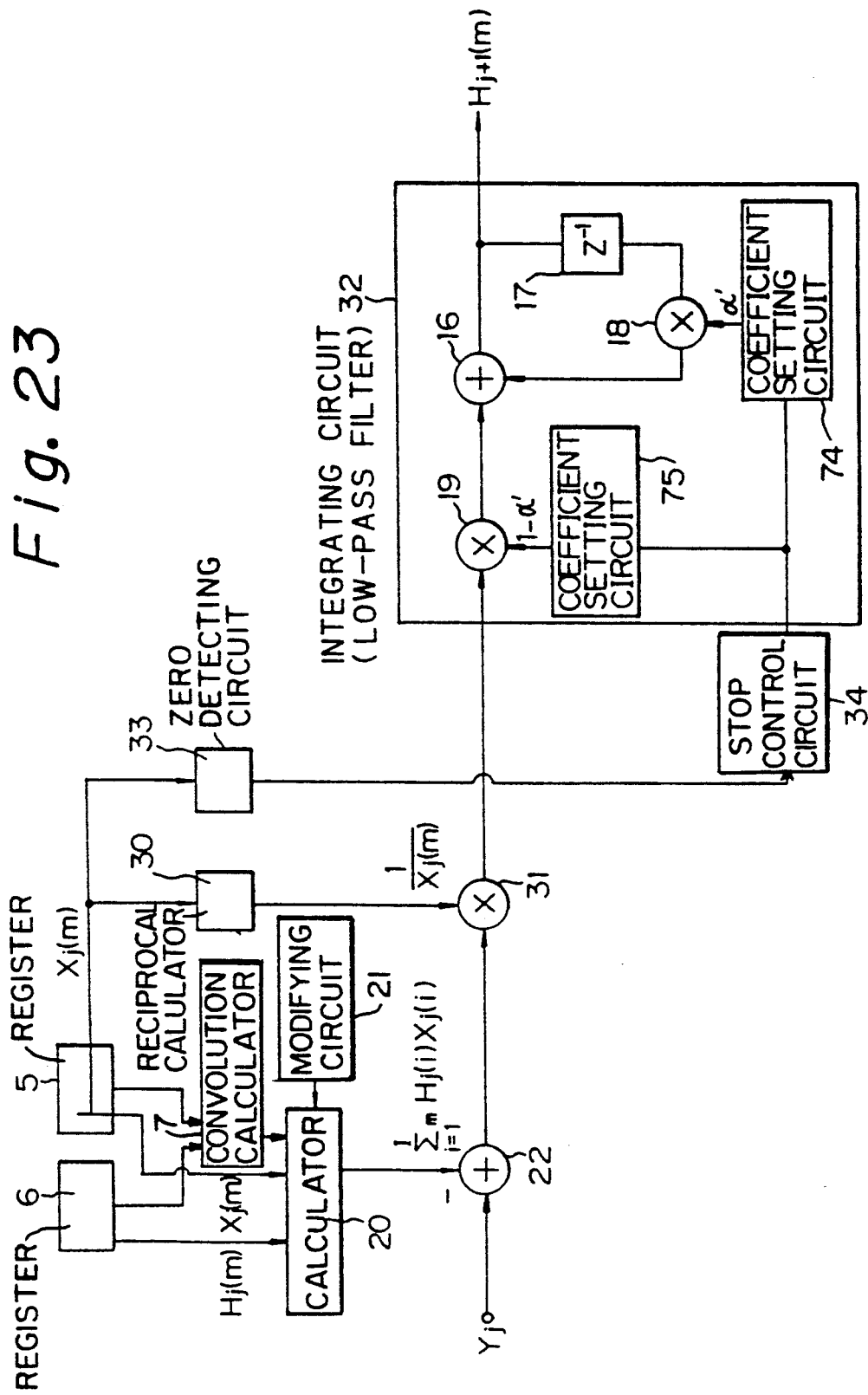
FIG. 23 shows a basic construction of the third embodiment of the present invention, for obtaining an estimated filter coefficient $H_{j+1}(m)$ corresponding to an m-th tap for the next sample time $j+1$ in the echo canceler.

FIG. 23 shows a basic construction of the third embodiment of the present invention, for obtaining an estimated filter coefficient $H_{j+1}(m)$ corresponding to an m-th tap for the next sample time j+1 in the echo canceler. The construction of FIG. 23 realizes the case wherein the first method to avoid the division by zero which was explained with reference to FIG. 8. In FIG. 23, the output signal register 5, the filter coefficient register 6, the convolution calculator 7, the sum-of-products calculator 20, the filter coefficient modifying circuit 21, and the subtracter 22, are the same as the corresponding constructions in the first and second embodiments as shown in FIGS. 9 and 22. In addition, in FIG. 23, reference numeral 30 denotes a reciprocal calculator, 31 denotes a multiplier, 32 denotes an integrating circuit, 33 denotes a zero detecting circuit, and 34 denotes a stop control circuit.

The reciprocal calculator 30 obtains a reciprocal of the (m−1)-cycle-delayed sampled output signal $X_j(m)$. The zero detecting circuit 33 determines whether or not the amplitude of the (m−1)-cycle-delayed sampled output signal $X_j(m)$ is less than a predetermined amount, where the predetermined amount is such that an amount which is larger than the reciprocal of the predetermined amount may cause an overflow in calculation of the filter coefficients. The multiplier 31 multiplies the output of the subtracter 22 by the above reciprocal $1/X_j(m)$. The integrating circuit 32 integrates the output of the multiplier 31 so that a component corresponding to the true echo path gain $h_j(m)$ is extracted from the output of the multiplier 31 by filtering out noise components. The stop control circuit 34 stops the operations of the multiplier 31 and the integrating circuit 32 when the zero detecting circuit 33 determines that the amplitude of the (m−1)-cycle-delayed sampled output signal $X_j(m)$ is less than a predetermined amount.

In the example shown in FIG. 23, the integrating circuit 32 is realized by a low-pass filter. The low-pass filter comprises multipliers 18 and 19, an adder 16, and a delay circuit 17 as the low-pass filters explained above. In addition, the low-pass filter in FIG. 23 comprises coefficient setting circuits 74 and 75 for setting multiplying factors $\alpha'$ and $(1-\alpha')$ in the multipliers in 18 and 19, respectively. The above stop control circuit 34 makes the coefficent setting circuits 74 and 75 set the above multiplying factors $\alpha'$ and $(1-\alpha')$ by making $\alpha'=1$ when the zero detecting circuit 33 determines that the amplitude of the (m−1)-cycle-delayed sampled output signal $X_j(m)$ is less than a predetermined amount. By the above setting, the multiplying factor $(1-\alpha')$ in the multiplier 19 is made zero, and the multiplying factor $\alpha'$ in the multiplier 18 is made equal to one, and therefore, the output of the multiplier 19 is made zero, and the output of the delay circuit 17 is supplied to the adder 16 through the multiplier 18 as is. Namely, the integrating operation in the low-pass filter is halted for the moment to avoid the division by zero.

The integrating circuit 32 may be realized by either of the constructions of the integrating circuits of FIGS. 14, 15, and 16, the power calculator 25 may be realized by either of the constructions of FIGS. 17, 18, and 19, and any of the realizations and the modifications which have been explained in the first embodiment for the integrating circuit, the power calculator, the sum-of-products calculator, and the filter coefficient modifying circuit, may be applied in the third embodiment. When the integrating circuit 32 is replaced with one of the above constructions of FIGS. 14, 15, and 16, the above setting of the multiplying factors $\alpha'$ and $(1-\alpha')$ making $\alpha'=1$ is carried out by the low-pass filter coefficient setting circuit 51 in FIG. 14, the the controller 71 in FIG. 15, or the controller 71' through the coefficient renewing circuit 53a in FIG. 16, respectively.

In addition, the optimum value of the low-pass filter coefficient $\alpha'$ in the low-pass filter in the construction of the third embodiment is obtained in the same manner as the first embodiment. Further, the same initial setting of the output signal register 5 and the filter coefficient register 6 as explained for the first and second embodiments, can be applied to the third embodiment.

Fourth Embodiment of the Present Invention

Figure 24:
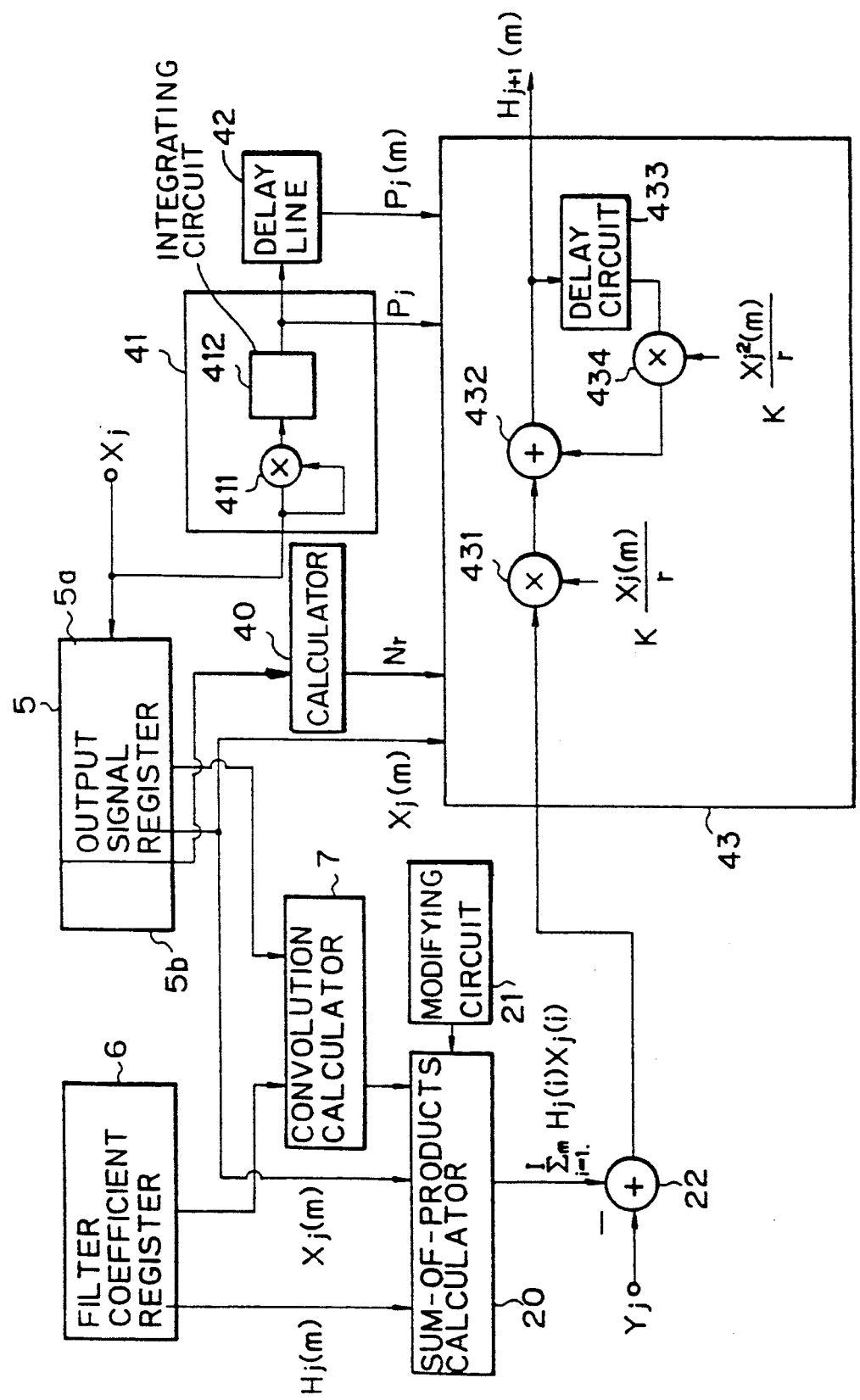
FIG. 24 shows a basic construction of the fourth embodiment of the present invention, for obtaining an estimated filter coefficient $H_{j+1}(m)$ corresponding to m-th tap for the next sample time $j+1$ in the echo canceler.

FIG. 24 shows a basic construction of the fourth embodiment of the present invention, for obtaining an estimated filter coefficient $H_{j+1}(m)$ corresponding to an m-th tap for the next sample time j+1 in the echo canceler. The fourth embodiment of the present invention is provided based on the consideration with reference to FIG. 6 that it is not necessary to limit the range of the summation in the norm $\Sigma X_j(i)^2$ within the taps in the adaptive digital filter, and the range of the summation can be varied. In addition, means for suppressing the variation in the low-pass filter coefficient due to the variation of the sampled output signal $X_j$ is provided in the fourth embodiment.

In FIG. 24, the filter coefficient register 6, the convolution calculator 7, the sum-of-products calculator 20, the filter coefficient modifying circuit 21, and the subtracter 22, are the same as the corresponding constructions in the first, second, and third embodiments as shown in FIGS. 9, 22, and 23. In addition, in FIG. 24, reference numeral 5' denotes an output signal register, 40 denotes a norm calculator, 41 denotes a power calculator, 42 denotes a delay line, and 43 denotes an integrating circuit.

The output signal register 5' comprises a output signal register 5a which is the same as the output signal register 5 in the first, second, and third embodiments, and holds a plurality of successive sampled output signals $X_j(i)$ (i=1 to I) where I is equal to the number of taps in the convolution calculator 7. The output signal register 5' in the fourth embodiment further comprises an additional output signal register 5b which receives the serial output of the above output signal register 5a, and holds an additional plurality of successive sampled output signals $X_j(i)$ (i=I+1 to to I+L). The norm calculator 41 calculates the norm $$N_r = \sum_{k=1}^{n} X_k(m)^2$$

using the sampled output signals $X_k(m)$ (k=1 to n) which are supplied from the output signal register 5', where n is the number of sampled output signals $X_k(m)$ which are input into the norm calculator 41, and the maximum of n is equal to I+L. The power calculator 41 receives the sampled output signal $X_j$, and calculates an integrated power $P_j$ of the sampled output signal $X_j$.

The power calculator 41 comprises a square calculator 411 which calculates a square of the sampled output signal $X_j$, and an integrating circuit 412 obtains an integrated value of the square of the sampled output signal $X_j$ as the integrated power $P_j$. The gain in the integrating circuit 412 is set to be equal to I+L. The integrated square of the sampled output signal $X_j$ which is output from the low-pass filter 412, is serially input into the delay line 42. The delay line 42 comprises I−1 delay circuits which are connected in series, and each of the delay circuits delays its input signal by one sampling clock cycle. The delay line 42 outputs (m−1)-cycle-delayed integrated power $P_j(m)$ in parallel from the m−1 delay circuit. The power calculator 41 and the delay line 42 can be realized by any of the constructions of FIGS. 17, 18, and 21, except that the gain in the integrating circuit is set to above. Namely, the power calculator 41 and the delay line 42 may be realized by the construction of FIG. 18 or 21 which is commonly provided for all the circuits for all the filter coefficients $H_j(i)$ where i=1 to I.

The integrating circuit 43 is constructed in the form of a low-pass filter, and the low-pass filter 43 comprises multipliers 431 and 434, the adder 432, and a delay circuit 433. The multiplying factor in the multiplier 431 is set to be equal to $K \cdot X_j(m)/r$, and the multiplying factor in the multiplier 434 is set to be equal to $1 - K \cdot X_j(m)^2/r$, where r is equal to one of the above norm $N_r$, the above integrated power $P_j$, and the above (m−1)-cycle-delayed integrated power $P_j(m)$.

Although not shown, a controller is provided for providing one of the above norm $N_r$, the integrated power $P_j$, and the (m−1)-cycle-delayed integrated power $P_j(m)$, to the the integrating circuit 43 as the above r value. The controller selects the above norm Nr as the r value until the predetermined time elapses from the beginning of the operation of the echo canceler, or until the residual echo $E_j$ falls below a predetermined level. When the norm $N_r$ is supplied as the r value, the integrating circuit 43 operates as an arithmetic average calculator. For example, the arithmetic average calculator 52 is used when all the filter coefficients $H_j(i)$ are made zero in the calculation of convolution in the convolution calculator 7 under the control of the filter coefficient modifying circuit 21 as mentioned before.

The function of the above integrating circuit 43 as an arithmetic average calculator is explained below.

When the first output signal $[h_1(m)X_1(m)+Z_1]$ from the subtracter 22 is supplied to the integrating circuit 43, where a term including a noise component is indicated as $Z_j$ for j=1 to I, the output $H_2(m)$ of the integrating circuit 43 is $$\begin{aligned} H_2(m) &= [h_1(m)X_1(m) + Z_1] \cdot X_1(m)/X_1(m)^2 \\ &= h_1(m) + Z_1 \cdot X_1(m)/X_1(m)^2. \end{aligned}$$

because $$N_r(m) = \sum_{k=1}^{n} X_k(m)^2 = X_1(m)^2$$

as n=1. Next, the second output signal $[h_2(m)X_2(m)+Z_2]$ from the subtracter 22 is supplied to the integrating circuit 43, the output $H_3(m)$ of the integrating circuit 43 is $$\begin{aligned} H_3(m) &= [h_2(m)X_2(m) + Z_2] \times X_2(m)/[X_1(m)^2 + X_2(m)^2] + [h_1(m) + Z_1X_1(m)/X_1(m)^2] \times X_1(m)^2/[X_1(m)^2 + X_2(m)^2] \\ &= [h_2(m)X_2(m)^2 + Z_2X_2(m)] \times X_2(m)/[X_1(m)^2 + X_2(m)^2] + [h_1(m)X_1(m)^2 + Z_1X_1(m)] \times 1/[X_1(m)^2 + X_2(m)^2] \\ &= [h_2(m)X_2(m)^2 + h_1(m)X_1(m)^2] \times X_2(m)/[X_1(m)^2 + X_2(m)^2] + [Z_2X_2(m) + Z_1X_1(m)] \times 1/[X_1(m)^2 + X_2(m)^2] \end{aligned}$$

because $$N_r(m) = \sum_{k=1}^{n} X_k(m)^2 = X_1(m)^2 + X_2(m)^2$$

as n=2. When it can be assumed that the echo path is stable, i.e., $h_1(m) = h_2(m) = h(m)$, $H_3(m)$ is expressed as
$$H_3(m) = h(m) + [Z_2X_2(m) + Z_1X_1(m)] \times 1/[X_1(m)^2 + X_2(m)^2].$$

Namely, an arithmetic average is obtained when the norm $N_r(m)$ is used in the integrating circuit 43 as the r value. As indicated above, the filter coefficient $H_j(m)$ which is obtained from the construction of FIG. 24, consists of the objective echo path gain h(m) and a noise term which is desirably suppressed through the filtering operation. Since the length of the output signal register 5' is elongated to I+L, the norm $N_r$ which is in the divisor in the above second term of the expression of the filter coefficient $H_{j+1}(m)$, increases with the lapse of time. Thus, the noise term is effectively suppressed due to the above elongation of the output signal register 5'.

After the predetermined time elapses from the beginning of the operation of the echo canceler, or after the residual echo $E_j$ falls below the above predetermined level, the controller first selects the above integrated power $P_j$ as the above r value. Since the integrated power $P_j$ must be delayed by (m−1) cycles, it takes time to obtain the above (m−1)-cycle-delayed integrated power $P_j(m)$ from the integrated power $P_j$. The power $P_j$ is selected until the above (m−1)-cycle-delayed integrated power $P_j(m)$ can be obtained from the delay line 42. When the above (m−1)-cycle-delayed integrated power $P_j(m)$ can be obtained from the delay line 42, the (m−1)-cycle-delayed integrated power $P_j(m)$ is selected as the above r value. By using the integrated power $P_j$ or $P_j(m)$ in the divisor of the low-pass filter coefficient $\alpha = [1 - K \cdot X_j(m)/r]$, the variation of the low-pass filter coefficient due to the variation of the amplitude of the sampled output signal $X_j$ is effectively suppressed after the convergence is obtained to a predetermined degree.

Figure 25:
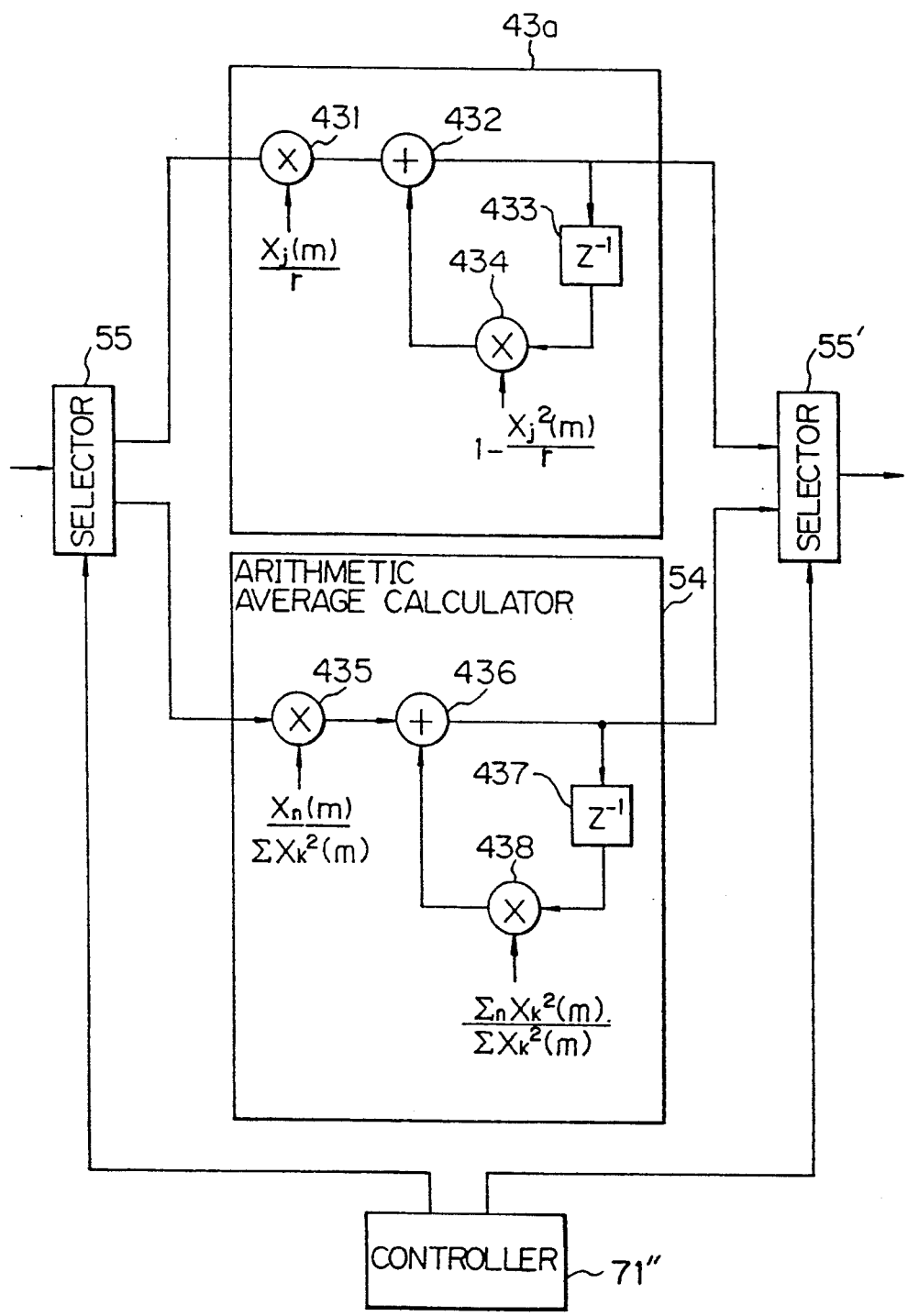
FIG. 25 shows an example of the construction of the integrating circuit 43 in the fourth embodiment of the present invention.

The integrating circuit 43 may be realized by the construction of FIG. 25. In the construction of FIG. 25, the above integrating circuit which functions as an arithmetic average calculator and the integrating circuit which functions as a low-pass filter wherein the low-pass filter coefficient $\alpha$ is equal to $[1-K\cdot X_j(m)/r]$ where r is equal to the integrated power $P_j$ or $P_j(m)$, are respectively provided as denoted by 54 and 43a, and one of the constructions is selected by the selectors 55 and 55' under the control of the controller 71''.

Any of the realizations and the modifications which have been explained in the first embodiment for the sum-of-products calculator 20 and the filter coefficient modifying circuit 21 may be applied in the fourth embodiment.

In addition, the same initial setting of the output signal register 5 and the filter coefficient register 6 as explained for the first to third embodiments, can be applied to the initial setting of the output signal register 5' and the filter coefficient register 6 in the fourth embodiment.

As explained later, it is found as a result of a computer simulation that there is a value of the coefficient correction constant K which gives the optimum setting for the estimation of the echo path gain $h_j(m)$. The value is determined from the aforementioned optimum value of the low-pass filter coefficient $\alpha'$ as $$\alpha' = (I'-1)/I', \quad (11)$$

where I' is the number of taps which corresponds to the reverberation time in the system. The relationship between the low-pass filter coefficient $\alpha'$ and the coefficient correction constant K is $$\alpha = [1 - K \cdot X_j(m)^2/r]. \quad (12)$$

Since, the integrated power r is normalized to $(I+L)$, the average value $\alpha_a$ of the low-pass filter coefficient $\alpha$ is obtained from the above relationship between the low-pass filter coefficient $\alpha$ and the coefficient correction constant K, as $$\alpha_a = 1 - K/(I+L). \quad (13)$$

Thus, the optimum value of K is obtained as $$K = (I+L)/I'. \quad (14)$$

Since an additional noise Nj exists, in practice, it is desirable to use a value of K which is a little smaller than the above optimum value.

Fifth Embodiment of the Present Invention

Figure 26:
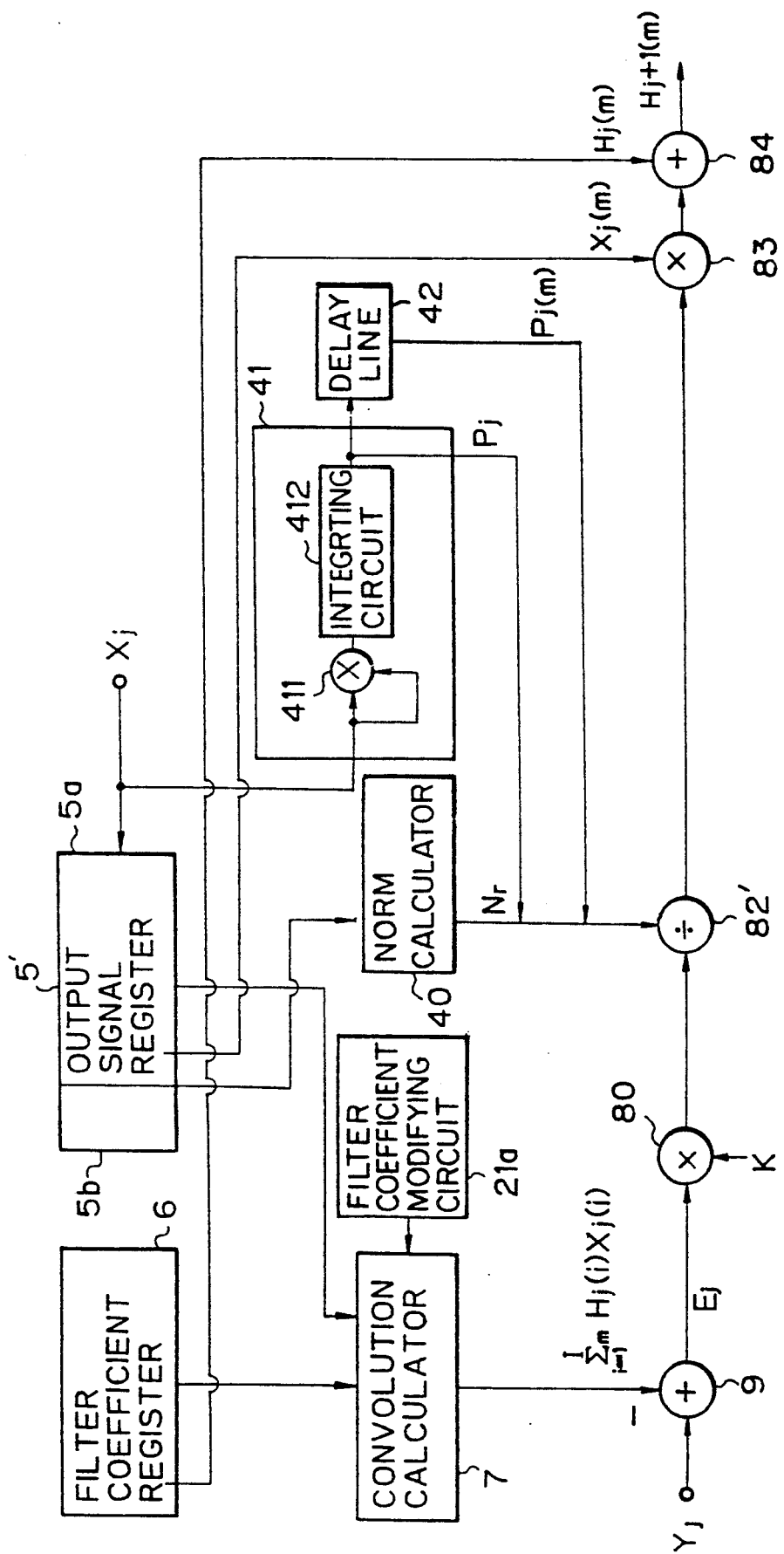
FIG. 26 shows a basic construction of the fifth embodiment of the present invention, for obtaining an estimated filter coefficient $H_{j+1}(m)$ corresponding to m-th tap for the next sample time $j+1$ in the echo canceler.

FIG. 26 shows a basic construction of the fifth embodiment of the present invention, for obtaining an estimated filter coefficient $H_{j+1}(m)$ corresponding to an m-th tap for the next sample time j+1 in the echo canceler. In the fifth embodiment of the present invention, an improvement is provided on the construction of FIG. 3. The improvement is made based on the consideration that it is not necessary to limit the range of the summation in the norm $\Sigma X_j(i)^2$ within the taps in the adaptive digital filter, and the range of the summation can be varied. In addition, means for suppressing the variation in the low-pass filter coefficient due to the variation of the sampled output signal $X_j$ is provided in the fifth embodiment.

In FIG. 26, the filter coefficient register 6, the convolution calculator 7, the output signal register 5', the norm calculator 40, the power calculator 41, and the delay line 42 are the same as the corresponding constructions in the fourth embodiment as shown in FIG. 24. In addition, in FIG. 26, the subtracter 9, the multipliers 80 and 83, and the divider 84 are the same as the corresponding constructions in FIG. 3. Further, in FIG. 26, reference numeral 82' denotes a divider which corresponds to the divider 82 in FIG. 3, however, the divisor in the dividing operation in the divider 82' is denoted by r, which is different from the divider 82 in FIG. 3. Reference numeral 21a denotes a filter coefficient modifying circuit, which is similar to the filter coefficient modifying circuit 21 as in the first to fourth embodiments, that is, the filter coefficient modifying circuit 21a can be realized by the construction similar to the construction of FIGS. 11 and 12. However, the filter coefficient modifying circuit 21a further carries out the suppression of the filter coefficient $H_j(m)$, although the suppression of the filter coefficient $H_j(m)$ is excluded from the constructions of FIGS. 11 and 12.

One of either the norm $N_r$ which is generated in the norm calculator 40, the integrated power $P_j$ which is generated in the power calculator 41, and the (m−1)-cycle-delayed integrated power $P_j(m)$ which is generated in the delay line 42, is selected as the divisor r in the divider 82' and is supplied to the divider 82'. Namely, in the fifth embodiment, the estimation of the echo path gain $h_j(m)$ is obtained in accordance with the following equation, $$H_{j+1}(m) = H_j(m) + K \cdot E_j X_j(m)/r \quad (15)$$

where $E_j$ is the residual echo. The control of the selection of the value r is carried out in a manner similar to the fourth embodiment. Therefore, the noise term is effectively suppressed in the stage before convergence is obtained, and by using the integrated power $P_j$ or $P_j(m)$ in the divisor in the divider 82', the influence of the variation of the amplitude of the sampled output signal $X_j$ on the estimation of the echo path gain $h_j(m)$ is effectively suppressed after the convergence is obtained to a predetermined degree.

In addition, the same initial setting of the output signal register 5 and the filter coefficient register 6 as explained for the first to fourth embodiments, can be applied to the initial setting of the output signal register 5' and the filter coefficient register 6 in the fifth embodiment.

Further, the same optimum value of K as the fourth embodiment is obtained for the fifth embodiment.

Control of Application of Disturbance

As shown in FIG. 6, the disturbances in the adaptive digital filter in the echo canceler are
(a) $S_j + N_j$,
(b) $\Sigma_m h_j(i) X_j(i)$, and
(c) $\Sigma_m H_j(i) X_j(i)$.

Among the above disturbances, the voice signal $S_j$ can be ignored because the estimation of the echo path gain $H_j(m)$ is stopped to avoid "double talk" when the voice signal $S_j$ is detected, which is a well-known technique in the echo canceler. In addition, the disturbance (3) is applied to cancel or suppress the disturbance (b).

However, the suppression is effective only when the aforementioned relationship (10)

$$|\Sigma_m h_j(i)X_j(i)| > |\Sigma_m \Delta_j(i)X_j(i)| \quad (10)$$

exists.

Therefore, the control of the filter coefficients $H_j(m)$ in the above disturbance (c) is carried out by the filter coefficient modifying circuit 21, as follows:

(i) stop the application of the disturbance (3) until the relationship (10) is satisfied in the beginning of the estimation of the echo path gain;

(ii) apply each estimated filter coefficient $H_j(m)$ one after another in addition to the previously applied filter coefficient(s) as the estimation progresses, i.e., apply first $H_j(1)$ only, apply next $H_j(1)$ and $H_j(2)$ only after a predetermined time, then apply $H_j(1)$, $H_j(2)$, and $H_j(3)$ only after a predetermined time, ... ; and (iii) first apply the filter coefficients $H_j(m)$ as small values, and then increase the values of the filter coefficients as the estimation progresses.

According to the above method (i), in the beginning of the estimation of the echo path gain $h_j(m)$, the operation of the estimation can be stably carried out regardless of the amounts of the above disturbances (a) and (b). Then, the disturbance (c) can be applied when convergence has been obtained to a predetermined degree. In addition, when the application of the disturbance (3) is stopped in the above method (i), it is advantageous to apply the aforementioned arithmetic average calculator as the integrating circuits 24, 29, 32, and 43 in the first, second, third, and fourth embodiments, respectively. Then, the application of the disturbance (3) is restarted in the above method (i), and the low-pass filter is used as the integrating circuits 24, 29, 32, and 43 in the first, second, third, and fourth embodiments, respectively.

FIGS. 27A to 27F show results of simulations of the above method (ii) wherein a rate of addition of a next filter coefficient is varied. The simulations are carried out using the construction of the first embodiment as shown in FIG. 9, white noise is used as the output signal $X_j$, the reverberation time in the system is assumed to be 64 msec, the sampling rate is assumed to be 8 kHz, and the number of taps in the adaptive digital filter is assumed to be 512. In addition, in the above simulations, the above method (i) is applied in addition to the method (ii).

Figure 27A:
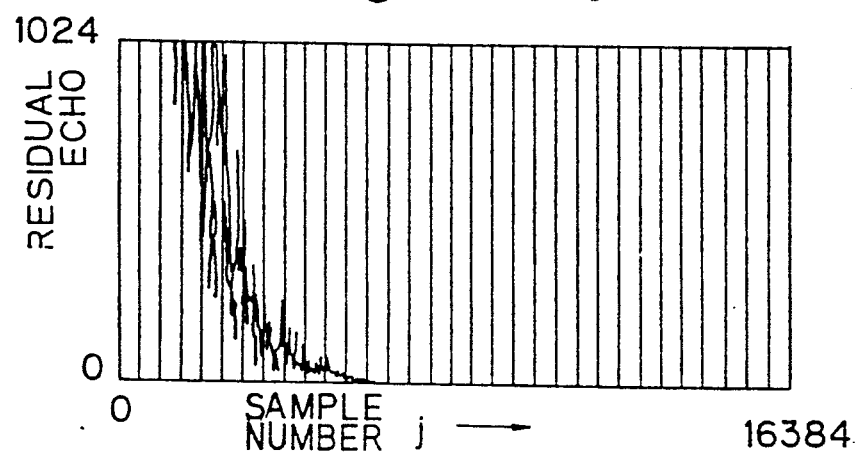
FIGS. 27A to 27F show results of simulations of the above method (ii) wherein a rate of addition of a next filter coefficient is varied.
Figure 27B:
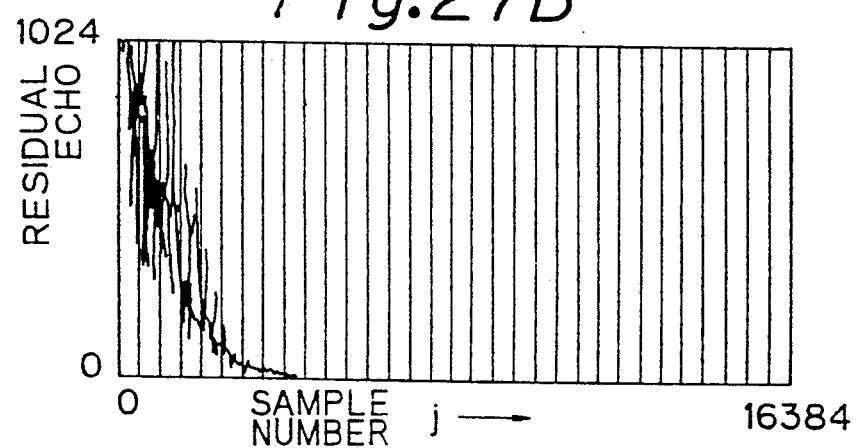
Figure 27C:
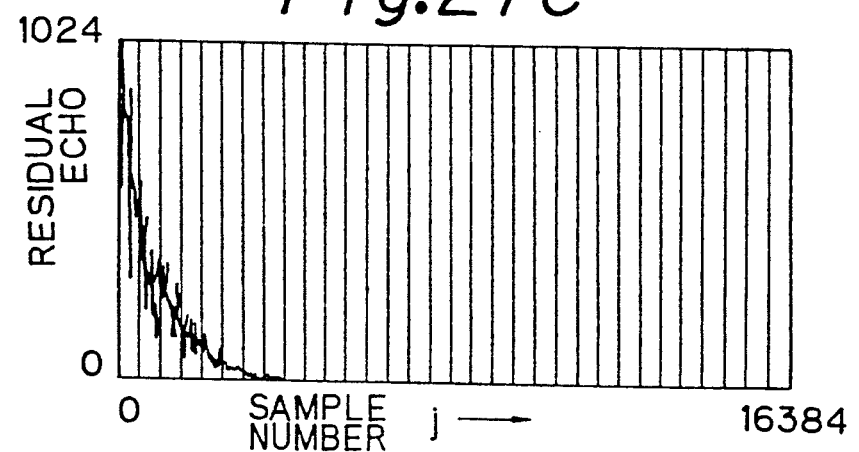
Figure 27D:
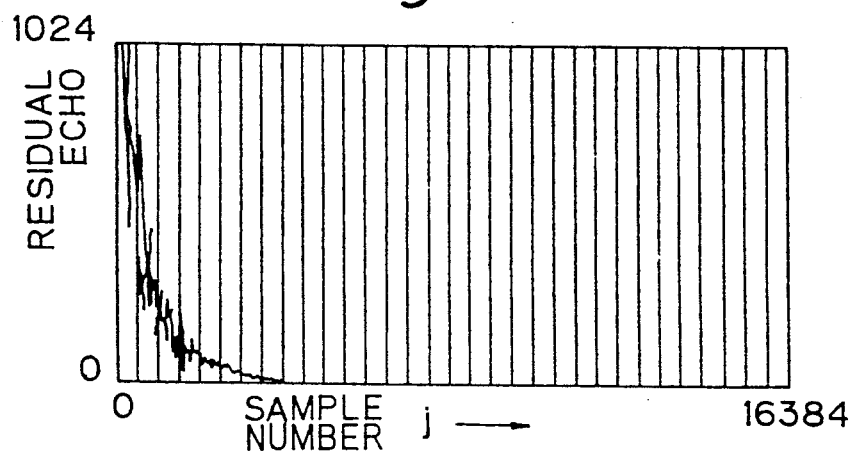
Figure 27E:
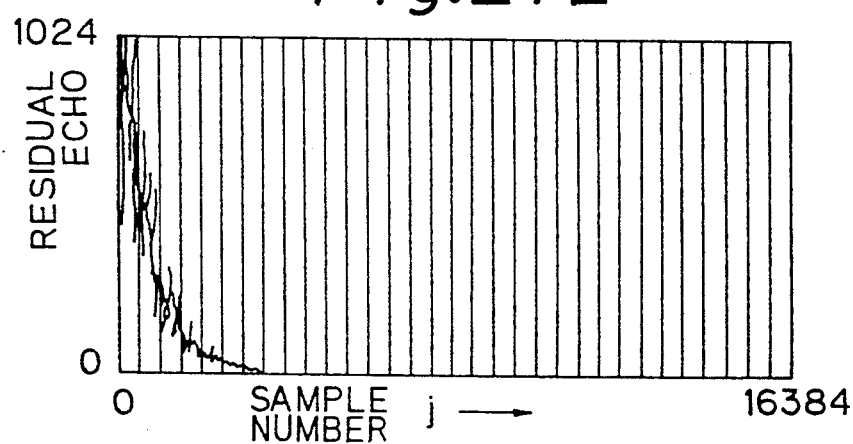
Figure 27F:
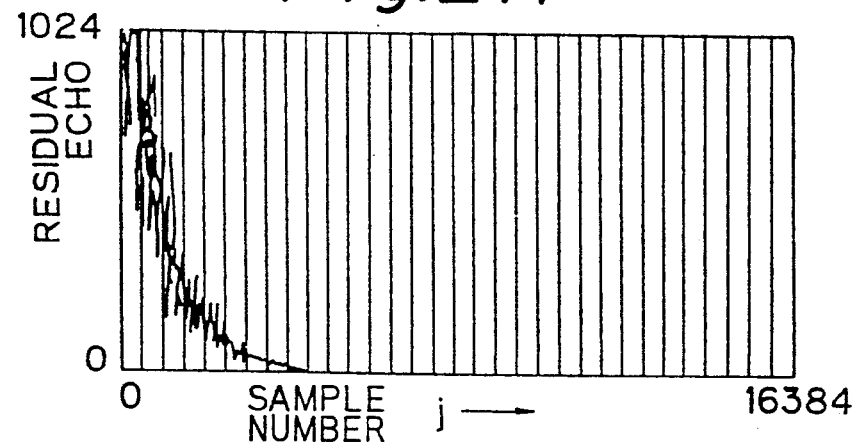

FIG. 27A shows the result of the simulation of the above method (ii) wherein one additional filter coefficient $H_j(m)$ is added for each sampling cycle. The abscissa corresponds to an elapse of time, and the ordinate corresponds to the residual echo. One additional filter coefficient $H_j(m)$ is added for each two sampling cycles in FIG. 27A; one additional filter coefficient $H_j(m)$ is added for each two sampling cycles in FIG. 27B; one additional filter coefficient $H_j(m)$ is added for each three sampling cycles in FIG. 27C; one additional filter coefficient $H_j(m)$ is added for each four sampling cycles in FIG. 27D; one additional filter coefficient $H_j(m)$ is added for each six sampling cycles in FIG. 27E; and one additional filter coefficient $H_j(m)$ is added for each ten sampling cycles in FIG. 27F. Since, generally, the S/N ratio in the component $H_j(i)X_j(i)$ is larger than the S/N ratio in the component $H_j(k)X_j(k)$ where $i<k$, it is advantageous to apply the filter coefficients in the order from $H_j(i)$ with a smaller value of i.

The effectiveness of the method (ii) is proven by the above results of the simulations of FIGS. 27A to 27F, and it is understood that the convergence is delayed when the above rate of addition of a next filter coefficient is too low. Namely, the filter coefficients $H_j(m)$ must be immediately applied to the construction for estimating the echo path gain $h_j(m)$.

Figure 28A:
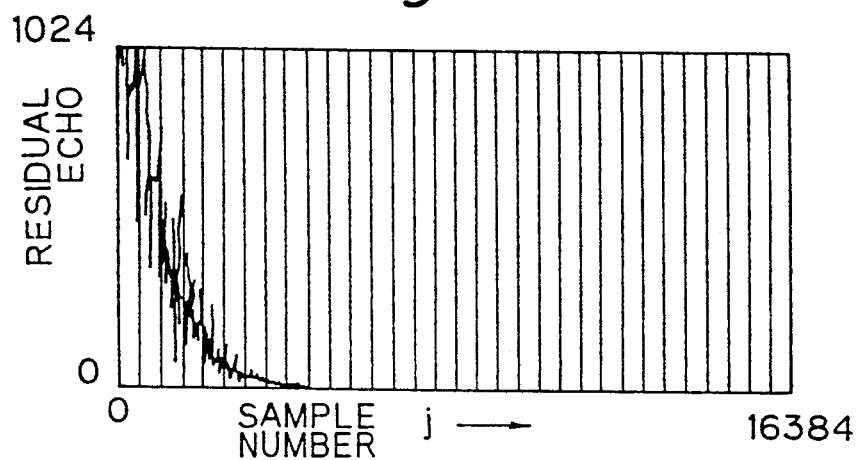
FIGS. 28A and 28B show results of simulations which are carried out for confirming the effectiveness of the above methods (i) and (ii) in the construction for the normalized least mean square (NLMS) algorithm of FIG. 6.
Figure 28B:
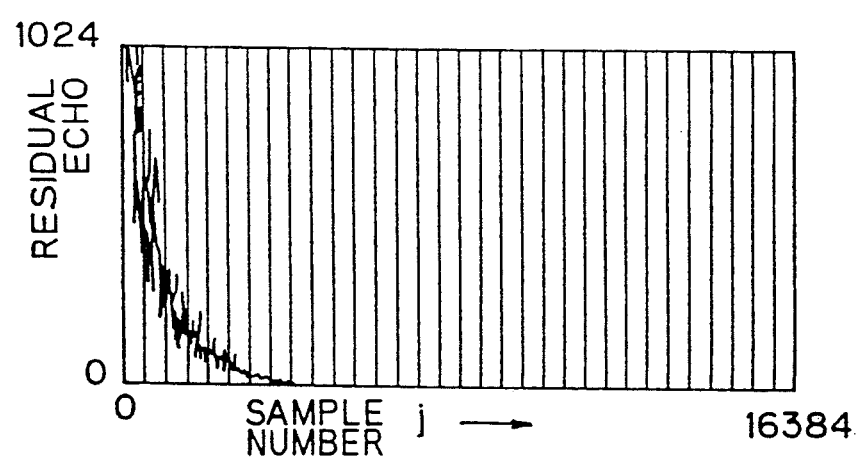

FIGS. 28A and 28B show results of simulations which are carried out for confirming the effectiveness of the above methods (i) and (ii) in the construction for the normalized least mean square (NLMS) algorithm of FIG. 6. FIG. 28A shows the result when the normalized least mean square (NLMS) algorithm is simply applied, and FIG. 28B shows the result when the above method (i) and (ii) are applied the normalized least mean square (NLMS) algorithm, where one additional filter coefficient $H_j(m)$ is added for each four sampling cycles as in FIG. 27D. The effectiveness of the methods (i) and (ii) is proven by the above results of the simulations of FIGS. 28A and 28B. Since the aforementioned fourth and fifth embodiments are provided based on the construction of FIG. 6, it is considered that the methods (i) and (ii) are effective in the fourth and fifth embodiments.

Figure 29A:
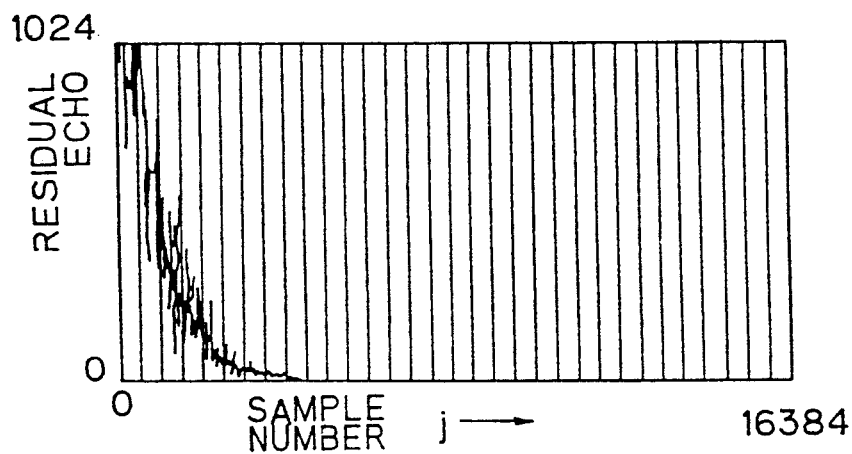
FIGS. 29A to 29C show results of simulations which are carried out for confirming the effectiveness of the above method (iii) in the construction for the normalized least mean square (NLMS) algorithm of FIG. 6.
Figure 29B:
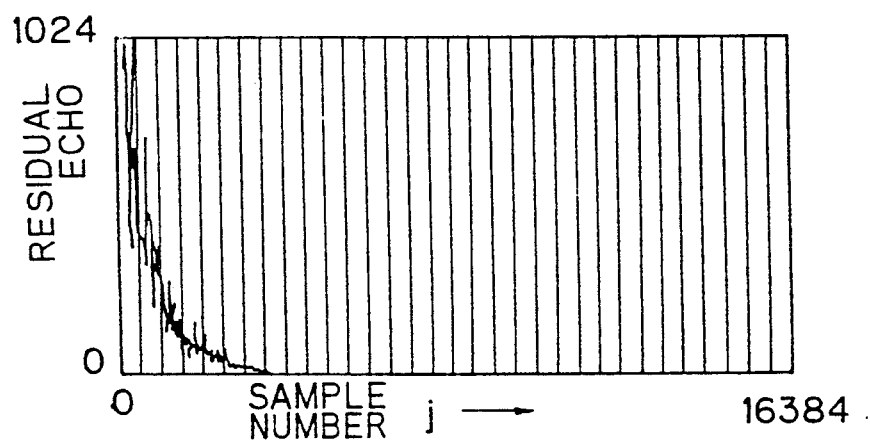
Figure 29C:
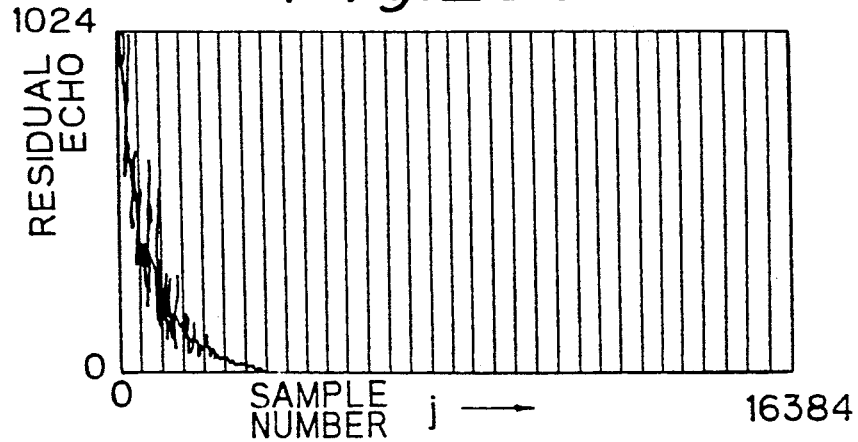

FIGS. 29A to 29C show results of simulations which are carried out for confirming the effectiveness of the above method (iii) in the construction for the normalized least mean square (NLMS) algorithm of FIG. 6. FIG. 29A shows the result when the normalized least mean square (NLMS) algorithm is simply applied. FIG. 29B shows the result when the above method (iii) is applied the normalized least mean square (NLMS) algorithm, where the modifying coefficient C is multiplied to the filter coefficient $H_j(m)$ in the aforementioned filter coefficient modifying circuit 21 in the following manner.

$$C=0 \text{ when } j-m+1\leq 0;$$

$$C=(j-m+1)/j \text{ when } 0<j-m+1<2J; \text{ and}$$

$$C=1 \text{ when } j-m+1\geq 2J,$$

where J is a number which is predetermined based on the number of taps in the adaptive digital filter. In the simulation of FIG. 29B, the estimation for the filter coefficients $H_j(m)$ is not carried out regarding the filter coefficients $H_j(m)$ to which C=0 is multiplied. FIG. 29C shows the result when the above method (iii) is applied the normalized least mean square (NLMS) algorithm, where the modifying coefficients C is multiplied to the filter coefficient $H_j(m)$ in the aforementioned filter coefficient modifying circuit 21 in the same manner as FIG. 29B. In the simulation of FIG. 29C, the estimation for the filter coefficients $H_j(m)$ is carried out for all the filter coefficients $H_j(m)$. The effectiveness of the methods (iii) is proven by the above results of the simulations of FIGS. 29A to 29C.

The modifying coefficient C in the filter coefficient modifying circuit 21 may be set in the various manners as follows:

Example 1, $$C=0 \text{ when } j-m+1\leq 0;$$

$$C=(j-m+1)/m \text{ when } 0<j-m+1<m; \text{ and}$$

$$C=1 \text{ when } j-m+1\geq m;$$

Example 2, $C=(j-m+1)/j$ when $j<J$;

$C=(j-m+1)/j$ when $J\leq j$; and $C=1$ when $j-m+1\geq J$; or

Example 3, $C=0$ when $j-m+1\leq 0$;

$C=(j-m+1)/j$ when $0<j-m+1<J$; and $C=1$ when $j-m+1\geq J$.

Another method (iv) to accelerate the convergence of the estimated filter coefficients $H_j(m)$ is to make the output signal $X_j$ equal to zero before the estimation begins, i.e., the sampled output signal $X_j(i)$ is made equal to zero for all $i<j$. This method (iv) is realized by clearing the output signal register before beginning the estimation, or by sending zero signals as the sampled output signals $X_j$ before beginning the estimation.

Figure 30A:
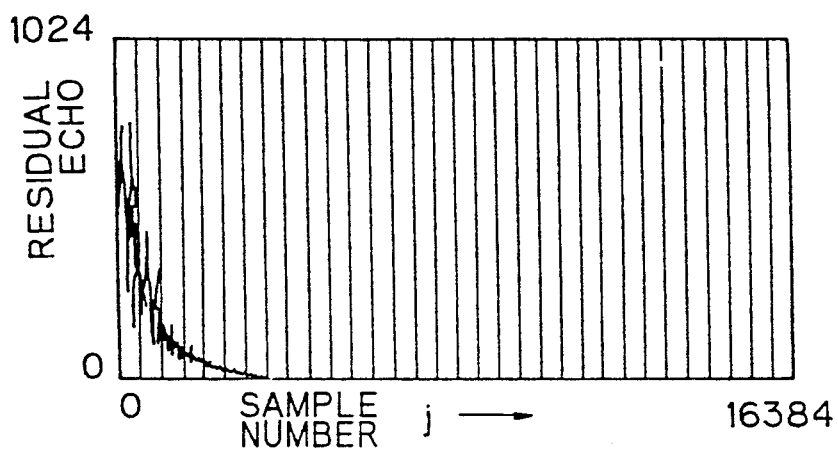
FIGS. 30A and 30B show results of simulations which are carried out for confirming the effectiveness of the above other method (iv) in the construction for the normalized least mean square (NLMS) algorithm of FIG. 6.
Figure 30B:
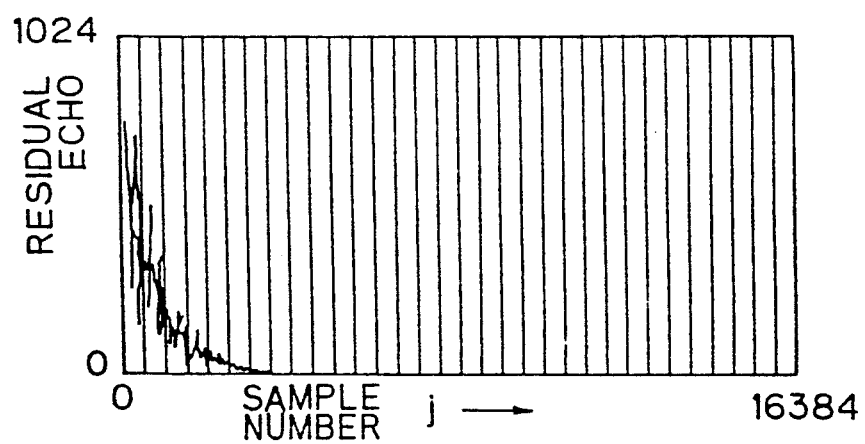

FIGS. 30A and 30B show results of simulations which are carried out for confirming the effectiveness of the above another method (iv) in the construction for the normalized least mean square (NLMS) algorithm of FIG. 6. FIG. 30A shows the result when the above other method is applied the normalized least mean square (NLMS) algorithm. FIG. 30B shows the result when the normalized least mean square (NLMS) algorithm is simply applied. The effectiveness of the above other method (iv) is proven by the above results of the simulations of FIGS. 30A and 30B.

Yet another method (v) to accelerate the convergence of the estimated filter coefficients $H_j(m)$ is to make the filter coefficients $H_j(m)$ corresponding to a minimum time from the beginning of the operation of the echo canceler which is necessary for an output signal to generate an echo signal in the echo path, equal to zero before the estimation begins. The above initial setting in the filter coefficient register makes the convergence of the filter coefficients fast.

Optimum Values of the Low-Pass Filter Coefficient $\alpha'$

As mentioned before, the convergence rate in the above operation for estimating the true echo path gain $h_j(m)$ and the accuracy in the estimated echo path gain (filter coefficient) $H_j(m)$ greatly depend on the value of the low-pass filter coefficient $\alpha'$ in the low-pass filter in the integrating circuit 24 in the constructions of the first, second, and third embodiments. The optimum value of the low-pass filter coefficient $\alpha'$ which gives the optimum setting for the estimation of the echo path gain $h_j(m)$, is obtained by computer simulations.

Figure 31A:
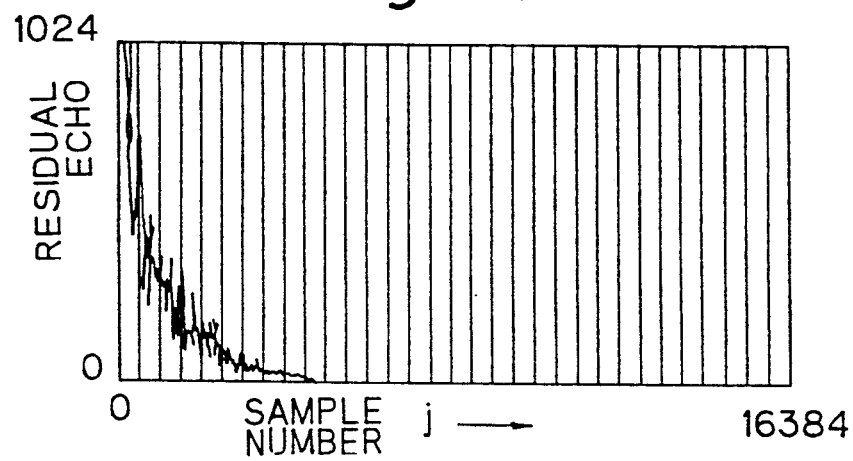
FIGS. 31A to 31C, and 32A to 32C show results of simulations which are carried out for various values of the low-pass filter coefficient $\alpha'$ for obtaining the optimum value of the low-pass filter coefficient $\alpha'$ in the constructions of the first, second, and third embodiments.
Figure 31B:
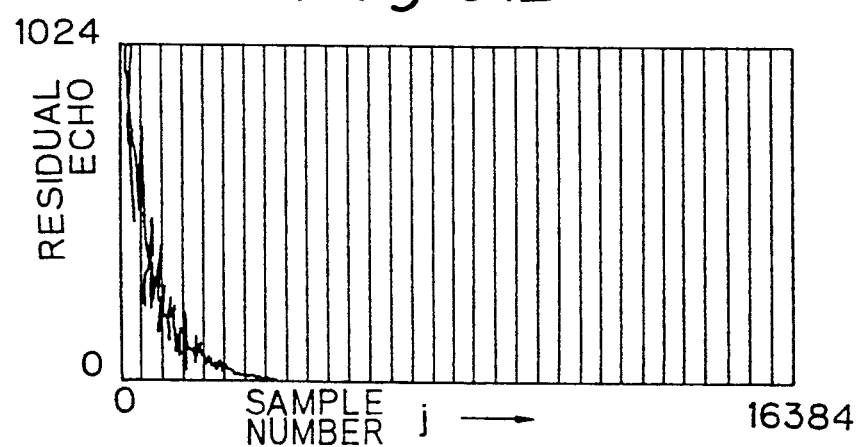
Figure 31C:
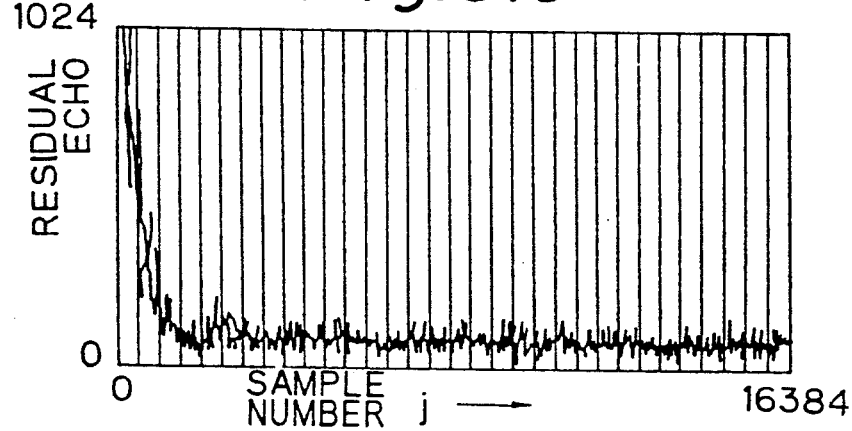

FIGS. 31A to 31C show results of simulations which are carried out for various values of the low-pass filter coefficient $\alpha'$ for obtaining the optimum value of the low-pass filter coefficient $\alpha'$ in the constructions of the first, second, and third embodiments. The simulations are carried out using the construction of the first embodiment as shown in FIG. 9, a white noise is used as the output signal $X_j$, the reverberation time in the system is assumed to be 64 msec, the sampling rate is assumed to be 8 kHz, and the number of taps in the adaptive digital filter is assumed to be 512, which corresponds to the above reverberation time. In addition, in the above simulations, the above-mentioned method (ii) is applied wherein one additional filter coefficient $H_j(m)$ is added for each four sampling cycles.

FIG. 31A shows the result when the low-pass filter coefficient $\alpha'$ in the integrating circuit 24 in FIG. 9 is set to $\alpha'=1023/1024(=0.9990)$. FIG. 31B shows the result when the low-pass filter coefficient $\alpha'$ in the integrating circuit 24 in FIG. 9 is set to $\alpha'=511/512(=0.9980)$. FIG. 31C shows the result when the low-pass filter coefficient $\alpha'$ in the integrating circuit 24 in FIG. 9 is set to $\alpha'=255/256(=0.9961)$. As understood from the above results of the simulations of FIGS. 31A and 31B, the convergence rate is high, but the residual echo is large when the low-pass filter coefficient $\alpha'$ is small, and the convergence rate is low, but the residual echo is small when the low-pass filter coefficient $\alpha'$ is large. When the low-pass filter coefficient $\alpha'$ is larger than a particular value, the residual echo level is not decreased any more, i.e., the residual echo level is saturated at the value of the low-pass filter coefficient $\alpha'$. The optimum value of the low-pass filter coefficient $\alpha'$ is determined as the value of the low-pass filter coefficient $\alpha'$ which gives a saturation value of the residual echo. The saturation value is a minimum value of the low-pass filter coefficient $\alpha'$ which gives a minimum value of the residual echo. As the result of the above simulations, the optimum value of the low-pass filter coefficient $\alpha'$ is determined as $\alpha'=(I-1)/I$, where I is the number of taps corresponding to a reverberation time in the system.

Figure 32A:
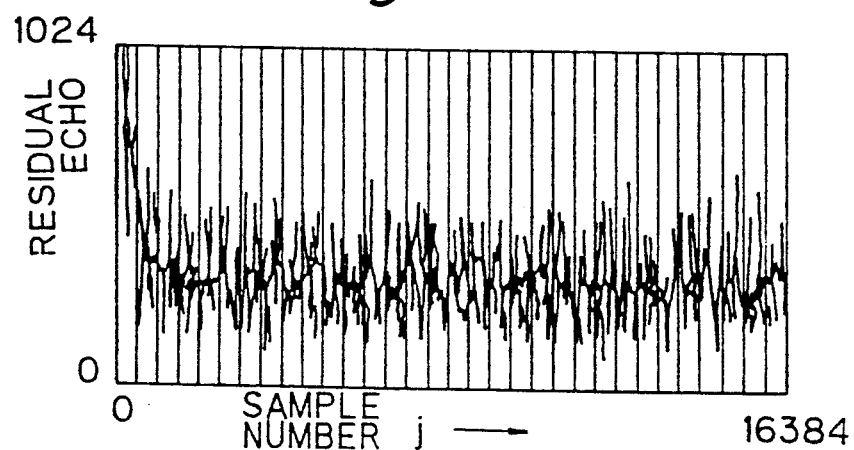
Figure 32B:
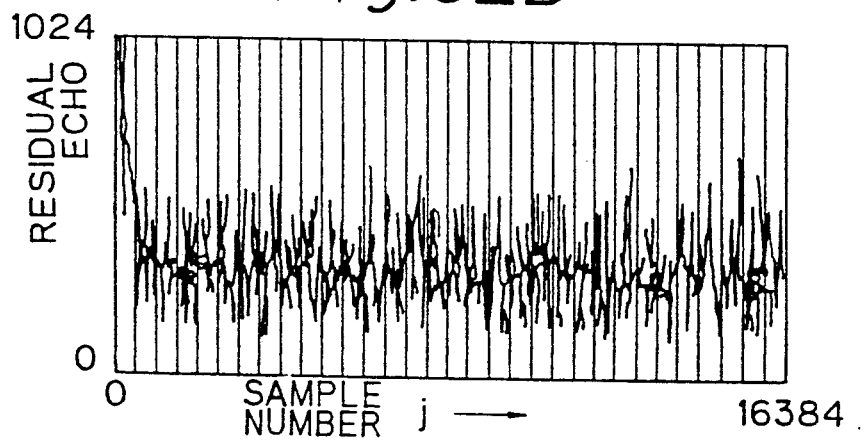
Figure 32C:
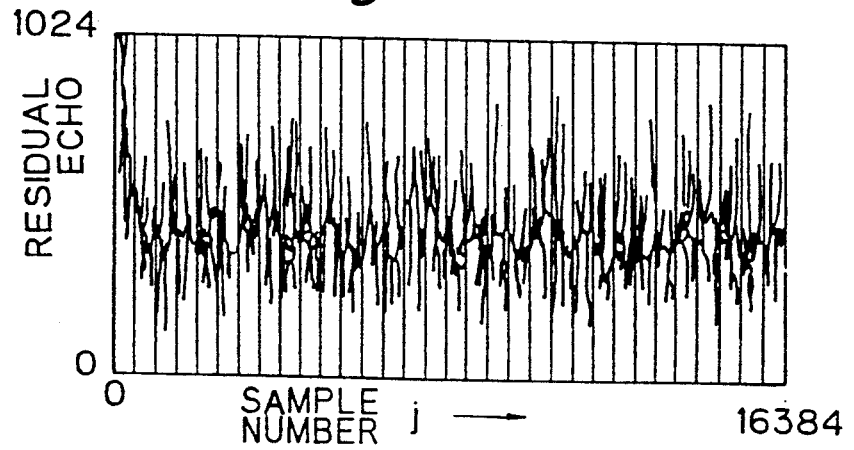

To confirm the above optimum value for a higher residual echo level, further simulations are carried out for a different number of taps, in this case 128, of the adaptive digital filter. FIG. 32A shows the result when the low-pass filter coefficient $\alpha'$ in the integrating circuit 24 in FIG. 9 is set to $\alpha'=1023/1024(=0.9990)$. FIG. 32B shows the result when the low-pass filter coefficient $\alpha'$ in the integrating circuit 24 in FIG. 9 is set to $\alpha'=511/512(=0.9980)$. FIG. 32C shows the result when the low-pass filter coefficient $\alpha'$ in the integrating circuit 24 in FIG. 9 is set to $\alpha'=127/128(=0.9922)$. As understood from the results of FIGS. 32A to 32C, the low-pass filter coefficient $\alpha'$ giving the saturation value of the residual echo is the same as the result of the simulations of FIGS. 31A to 31C. Namely, the optimum value of the low-pass filter coefficient $\alpha'$ is obtained regardless of the number of taps.

As mentioned before, since an additional noise $N_j$ exists, in practice, it is desirable to use a value of $\alpha'$ which is a little larger than the above optimum value.

Optimum Values of the Coefficient Correction Constant K

As mentioned before, the convergence rate in the above operation for estimating the true echo path gain $h_j(m)$ and the accuracy in the estimated echo path gain (filter coefficient) $H_j(m)$ greatly depend on the value of the coefficient correction constant K in the constructions of the fourth and fifth embodiments. The optimum value of the coefficient correction constant K which gives the optimum setting for the estimation of the echo path gain $h_j(m)$, is obtained by computer simulations.

Figure 33A:
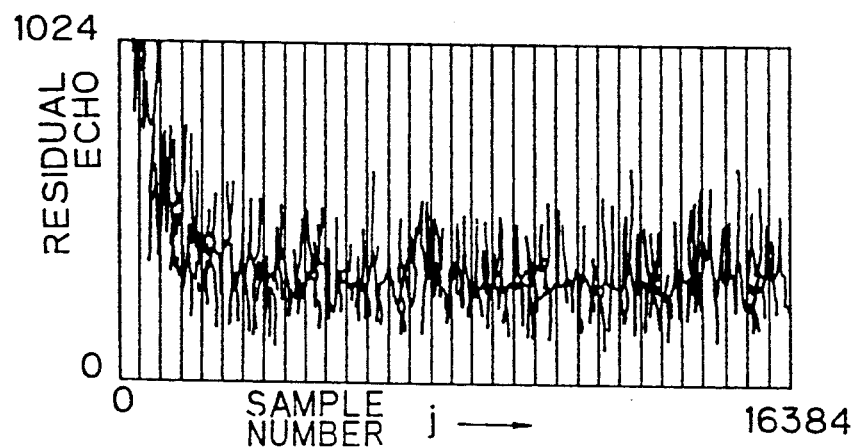
FIGS. 33A to 33C show results of simulations which are carried out for various values of the coefficient correction constant K for obtaining the optimum value of the coefficient correction constant K in the constructions of FIG. 6.
Figure 33B:
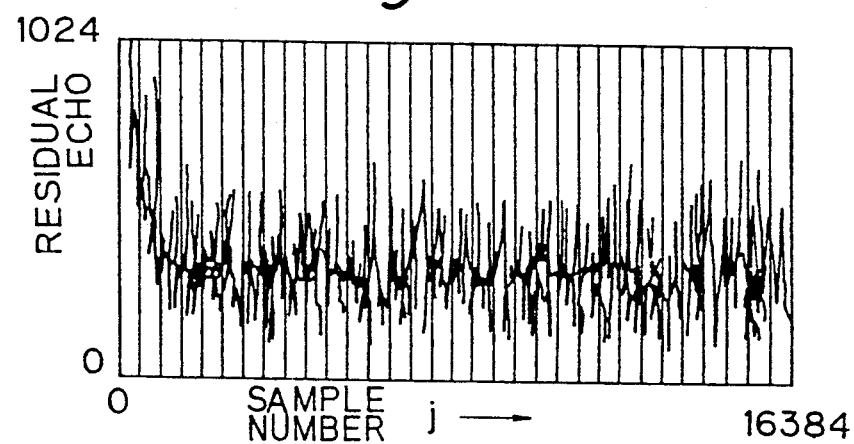
Figure 33C:
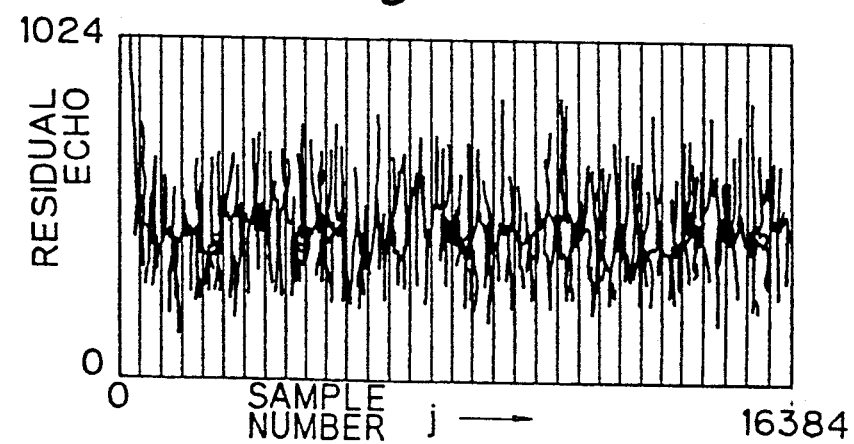

FIGS. 33A to 33C show results of simulations which are carried out for various values of the coefficient correction constant K for obtaining the optimum value of the coefficient correction constant K in the constructions of FIG. 6. The simulations are carried out using the construction of FIG. 6, the number of taps in the adaptive digital filter is set to be 128, and the above-mentioned method (ii) is applied wherein one additional filter coefficient $H_j(m)$ is added for each four sampling cycles. In addition, the reverberation time is set to the same value as the simulations of FIGS. 31A to 31C, i.e., the reverberation time corresponds to 512 taps in the adaptive digital filter.

FIG. 33A shows the result when the coefficient correction constant K in the construction of FIG. 6 is set to K=0.125. FIG. 33B shows the result when the coefficient correction constant K in the construction of FIG. 6 is set to K=0.25. FIG. 33C shows the result when the coefficient correction constant K in the construction of FIG. 6 is set to K=1.

As understood from the above results of the simulations of FIGS. 33A and 33C, the convergence rate is high, but the residual echo is large when the coefficient correction constant K is large, and the convergence rate is low, but the residual echo is small when the coefficient correction constant K is small. When the coefficient correction constant K is larger than a particular value, the residual echo level is not decreased any more, i.e., the residual echo level is saturated at the value of the coefficient correction constant K. The optimum value of the coefficient correction constant K is determined as the value of the coefficient correction constant K which gives a saturation value of the residual echo. The saturation value is a minimum value of the coefficient correction constant K which gives a minimum value of the residual echo. As a result of the above simulations, the optimum value of the coefficient correction constant K is about K=0.25.

In the normalized least mean square (NLMS) algorithm of FIG. 6, from the equation (7)

$$\alpha = [1 - K \cdot X_j(m)^2 / \Sigma X_j(i)^2],$$

the average $\alpha_a$ of the low-pass filter coefficient $\alpha$ is $$\alpha_a = 1 - K/I \qquad (16)$$

where I is equal to the number of taps in the adaptive digital filter.

From the above equation (15), when I=128, K=0.125 (FIG. 33A) corresponds to $\alpha$=1023/1024 (=0.9990), K=0.25 (FIG. 33B) corresponds to $\alpha$=511/512 (=0.9980), and K=1 (FIG. 33C) corresponds to $\alpha$=127/128 (=0.9922). Considering the equation (11), $$\alpha' = (I'-1)/I', \qquad (11)$$

the optimum value of the coefficient correction constant K(=0.25) corresponds to I'=512 which corresponds to the reverberation time. Namely, the optimum value of the coefficient correction constant K(=0.25) corresponds to the reverberation time in the system.

As mentioned before, since an additional noise $N_j$ exists, in practice, it is desirable to use a value of K which is a little smaller than the above optimum value.

Advantage of Constant Coefficient

FIGS. 34A to 34D show the results of simulations which are carried out for comparing the convergence characteristics of the estimation system for the echo path gain $h_j(m)$ wherein the low-pass filter coefficient $\alpha'$ is a constant, with the convergence characteristics of the estimation system for the echo path gain $h_j(m)$ by the normalized least mean square (NLMS) algorithm. In the simulations, the number of taps in the adaptive digital filter is set to be equal to 512 which is the number corresponding to the reverberation time in the example.

Figure 34A:
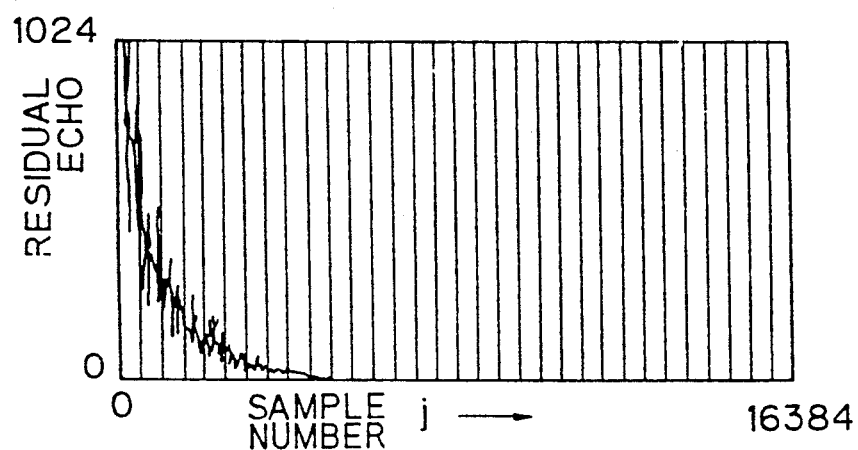
FIGS. 34A to 34D show the results of simulations which are carried out for comparing the convergence characteristics of the estimation system for the echo path gain $h_j(m)$ wherein the low-pass filter coefficient $\alpha'$ is a constant, with the convergence characteristics of the estimation system for the echo path gain $h_j(m)$ by the normalized least mean square (NLMS) algorithm.
Figure 34B:
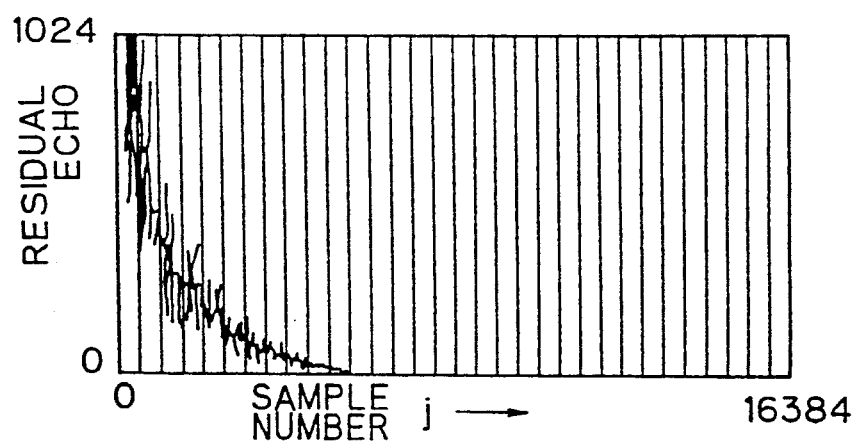
Figure 34C:
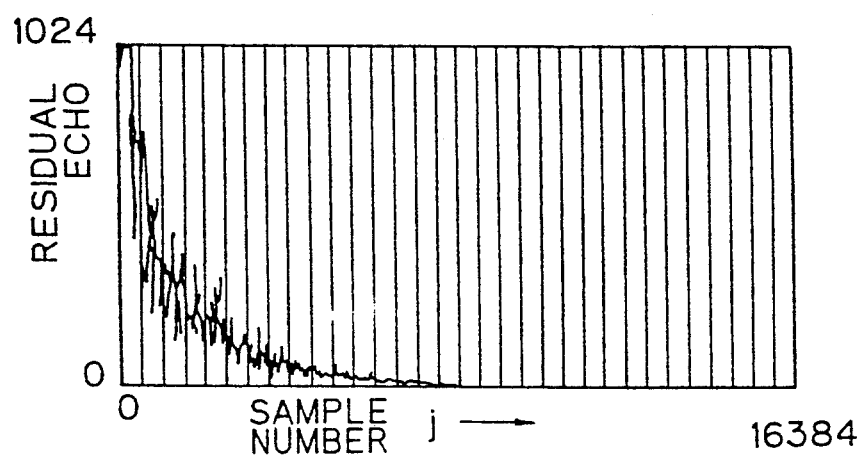
Figure 34D:
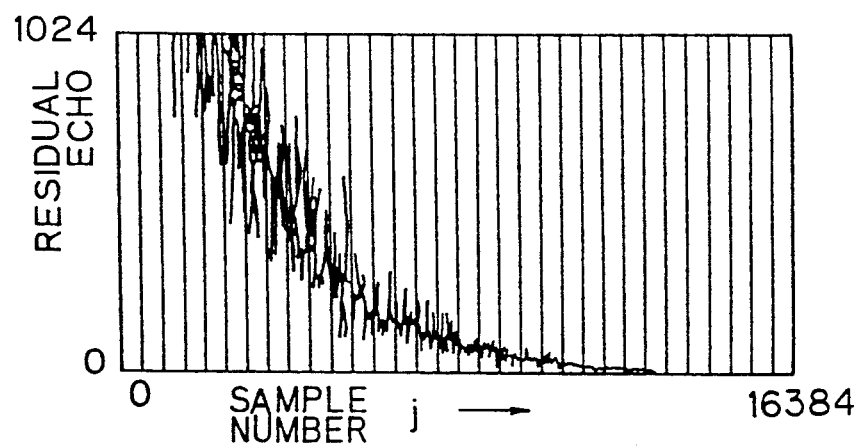

FIG. 34A shows the result when the low-pass filter coefficient $\alpha'$ in the integrating circuit 24 in FIG. 9 is set to $\alpha'$=1023/1024(=0.9990), which is the same as FIG. 31A. FIG. 34B shows the result when the coefficient correction constant K in the construction of FIG. 6 is set to K=0.5, which corresponds to the value of the low-pass filter coefficient $\alpha'$=1023/1024 by the equation (16). FIG. 34C shows the result when the low-pass filter coefficient $\alpha'$ in the integrating circuit 24 in FIG. 9 is set to $\alpha'$=2047/2048(=0.9961). FIG. 34D shows the result when the coefficient correction constant K in the construction of FIG. 6 is set to K=0.25, which corresponds to the value of the low-pass filter coefficient $\alpha'$=2047/2048 by the equation (16).

The above results of FIGS. 34A to 34D show that the convergence characteristics of the estimation system for the echo path gain $h_j(m)$ wherein the low-pass filter coefficient $\alpha'$ is a constant, are much more advantageous than the convergence characteristics of the estimation system for the echo path gain $h_j(m)$ by the normalized least mean square (NLMS) algorithm.

Figure 35:
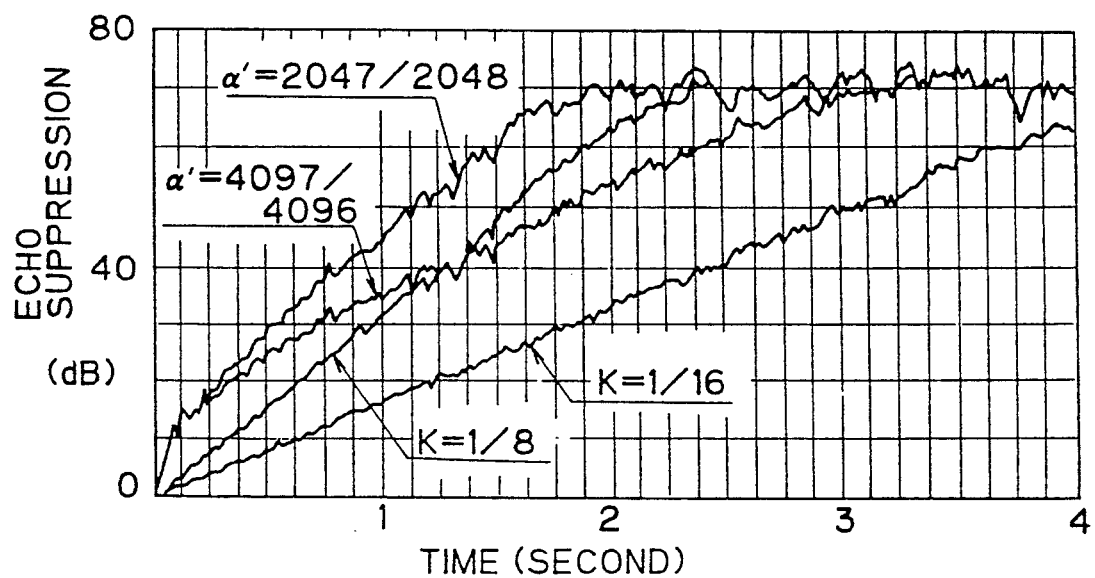
FIG. 35 shows the results of simulations which are carried out for the estimation system for the echo path gain $h_j(m)$ wherein the low-pass filter coefficient $\alpha'$ is a constant, and the estimation system for the echo path gain $h_j(m)$ by the normalized least mean square (NLMS) algorithm.

FIG. 35 shows the results of simulations which are carried out for the estimation system for the echo path gain $h_j(m)$ wherein the low-pass filter coefficient $\alpha'$ is a constant, and the estimation system for the echo path gain $h_j(m)$ by the normalized least mean square (NLMS) algorithm. The abscissa corresponds to elapse of time (in seconds), and the ordinate corresponds to the echo suppression (by dB). In the simulations, the number of taps in the adaptive digital filter is set to be equal to 256. Therefore, the low-pass filter coefficient $\alpha'$=2047/2048 corresponds to the coefficient correction constant K=⅛, and the low-pass filter coefficient $\alpha'$=4095/4096 corresponds to the coefficient correction constant K=1/16, by the equation (16), which is the number corresponding to the reverberation time in the example. As shown in FIG. 35, the convergence of the estimation for the echo path gain $h_j(m)$ wherein the low-pass filter coefficient $\alpha'$ is a constant and $\alpha'$=2047/2048, is 0.4 seconds faster than the convergence of the estimation system for the echo path gain $h_j(m)$ by the normalized least mean square (NLMS) algorithm wherein the coefficient correction constant K=⅛ corresponding to $\alpha'$=2047/2048, and the convergence of the estimation for the echo path gain $h_j(m)$ wherein the low-pass filter coefficient $\alpha'$ is a constant and $\alpha'$=4095/4096, is about 1.0 seconds faster than the convergence of the estimation system for the echo path gain $h_j(m)$ by the normalized least means square (NLMS) algorithm wherein the coefficient correction constant K=1/16 corresponds to $\alpha'$=4095/4096.

Figure 36:
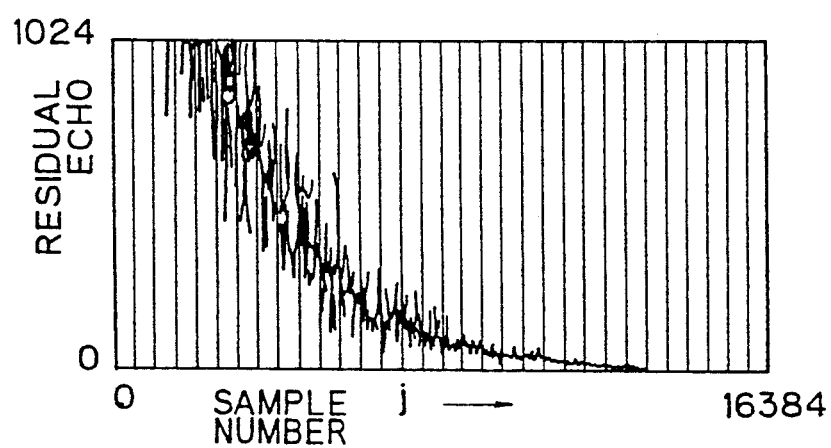
FIG. 36 shows the results of simulations which are carried out for the estimation system for the echo path gain $h_j(m)$ by the normalized least mean square (NLMS) algorithm wherein the coefficient correction constant $K=1.75$.

As mentioned before, in the prior art, it is considered that the larger the coefficient correction constant value K becomes, within the extent 0<K<2, the faster the convergence of the filter coefficient becomes and a less accurate estimation of the echo is carried out, and the smaller the coefficient correction constant value K becomes, the slower the convergence of the filter coefficient becomes and the more accurate estimation of the echo can be carried out. FIG. 36 shows the results of simulations which are carried out for the estimation system for the echo path gain $h_j(m)$ by the normalized least mean square (NLMS) algorithm wherein the coefficient correction constant K=1.75. Comparing the result of FIG. 25 (K=1.75) with the results of FIG. 34B (K=0.5) and FIG. 34D (K=0.25), it is understood that no improvement is obtained by setting the coefficient correction constant K=1.75. By further simulations (not shown) made by the applicants, no improvement is obtained by setting the coefficient correction constant K to a value larger than one. On the other hand, in the estimation using a constant low-pass filter coefficient $\alpha'$, as shown in FIG. 31C, the convergence characteristic is improved when $\alpha'=255/256$ which corresponds to K=2 when the number of taps is equal to 512.

As explained above, the estimation system using a constant low-pass filter coefficient $\alpha'$ is much advantageous than the normalized least mean square (NLMS) algorithm.

Stability of Normalized Least Mean Square (NLMS) Operation

In the construction of FIG. 5, the disturbance $Q_j(m)$ is considered to be reduced by the integrating operation through the low-pass filter included therein. When the low-pass filter coefficient in the low-pass filter is denoted by $\alpha_j$, the degree of the reduction $A_j$ of the disturbance $Q_j(m)$ which is expected to be finally achieved, is given by $$A_j = (1 - \alpha_j)^2 + \alpha_j^2 \cdot (1 - \alpha_j)^2 + \ldots \quad (17)$$
$$= (1 - \alpha_j)/(1 + \alpha_j).$$

When the dispersion of the estimation error $\Delta_j$ is denoted by $\sigma_o^2$, and the dispersion of the output signal $X_j$ is denoted by $\sigma_x^2$, the dispersion of the disturbance is approximated by $$(I-1)\cdot\sigma_o^2\cdot\sigma_x^2/\sigma_x^2 = (I-1)\cdot\sigma_o^2$$

Thus, the dispersion of the output of the low-pass filter is $$A_j\cdot(I-1)\cdot\sigma_o^2.$$

From the above estimation of the dispersion, the stability condition of the low-pass filter is $$\sigma_o^2 > A_j\cdot(I-1)\cdot\sigma_o^2.$$

Substituting the expression of (17) into the above stability condition, the stability condition is $$1 > (I-1)\cdot(1-\alpha_j)/(1+\alpha_j). \quad (18)$$

Substituting the above coefficient $\alpha_j$ by the average value $\alpha_a = 1 - K/I$, $$1 > (I-1)\cdot(K/I)/(2-K/I).$$

That is, $$1 > (I-1)\cdot K/(2I-K).$$

Thus, $$2 > K \quad (19)$$

is obtained. This is included in the relationship $$0 > K < 2. \quad (8)$$

The above stability condition (19) is obtained based on the assumption that the low-pass filter coefficient $\alpha_j$ is approximated by the average value $\alpha_a=1-K/I$. However, as explained before, generally, the low-pass filter coefficient $\alpha_j$ varies with the output signal $X_j$ in accordance with the equation (7). Therefore, when the low-pass filter coefficient $\alpha_j$ is less than the average value $\alpha_a=1-K/I$, the relationship (18) may not exist, and when the state wherein the relationship (18) does not exist, and continues for a long time, the output of the low-pass filter may diverge.

When the output signal $X_j$ is assumed to be white noise, the probability that the low-pass filter coefficient $\alpha_j$ is less than the average value $\alpha_a=1-K/I$, amounts to 32% based on the consideration of the standard dispersion $\sigma_x$. Therefore, the state wherein the relationship (18) does not exist, is liable to continue for a long time. Although the operation of the normalized least mean square (NLMS) algorithm theoretically converges in a sufficiently long time, in practice, registers in digital signal processors which are used for carrying out the above operation of the low-pass filter, have a definite length. Therefore, when the state wherein the relationship (18) does not exist, and continues for a long time, the operation of the estimation using the low-pass filter, diverges.

Conventionally, to avoid the above problem of divergence, the coefficient correction constant K must be set to be small enough based on experience. Therefore, conventionally, the convergence rate of the operation for the estimation becomes slow.

The range of the variation of the low-pass filter coefficient $\alpha_j$ is $$1 - K \leq \alpha_j \leq 1$$

Since the stability condition is most severe when $\alpha_j = 1 - K$, the relationship (19) becomes $$1 > (I-1)\cdot K/(2I-K).$$

That is, $$2 - K > (I-1)\cdot K.$$

Thus, $$K < 2/I \quad (20)$$

This is a rigorous and very severe condition. However, such a rigorous condition is required, for example, in the case where the output signal $X_j$ is an impulse response (or a step response) wherein only $X_j(m)$ is not zero, and $X_j(i)=0$ for all cases of $i \neq m$. Since, in practice, noise overlaps the successive sampled output signals $X_j$, the above severe condition is considered in practice not to be required.

Thus, if an increase in the estimation error due to the low-pass filter coefficients $\alpha_j$ which do not satisfy the above stability condition, can be absorbed by the registers in the digital signal processors, a coefficient correction constant K which may cause a small probability that a low-pass filter coefficient $\alpha_j$ does not satisfy the above stability condition, can be used.

For example, substituting $\alpha_j \geq 1 - 4K/I$ into the relationship (18) based on the fact that 95% of the low-pass filter coefficient $\alpha_j$ distributes in the region wherein $\alpha_j \geq 1 - 4K/I$, the following relationship $$K < \tfrac{1}{2} \quad (21)$$

is obtained.

Or, substituting $\alpha_j \geq 1 - 4K/I$ into the relationship (18) based on the fact that 99.7% of the low-pass filter coefficient $\alpha_j$ distributes in the region wherein $\alpha_j \geq 1 - 9K/I$, the following relationship $$K < 2/9 \quad (22)$$

is obtained.

When one of the above conditions (21) or (22) is satisfied, as long as an increase in the estimation error due to the low-pass filter coefficients $\alpha_j$ which do not satisfy the above stability condition (18), can be absorbed by the registers in the digital signal processors, the operation for the estimation is stable.

However, the probability of the divergence in the operation for the estimation is not zero. Therefore, by substituting the equation (7)

$$\alpha = [1 - K \cdot X_f(m)^2 / \Sigma X_f(i)^2],$$

into the above relationship (18), a condition $$K < 2\Sigma X_f(i)^2 / I \cdot X_f(m)^2 \quad (23)$$

is obtained. By monitoring the quantity of the right side of the relationship (23), and stopping the operation for the estimation of the echo path gain $h_f(m)$ when the above condition (23) is not satisfied, the large value of the coefficient correction constant K can be used in the normalized least mean square (NLMS) algorithm without divergence.

Figure 37:
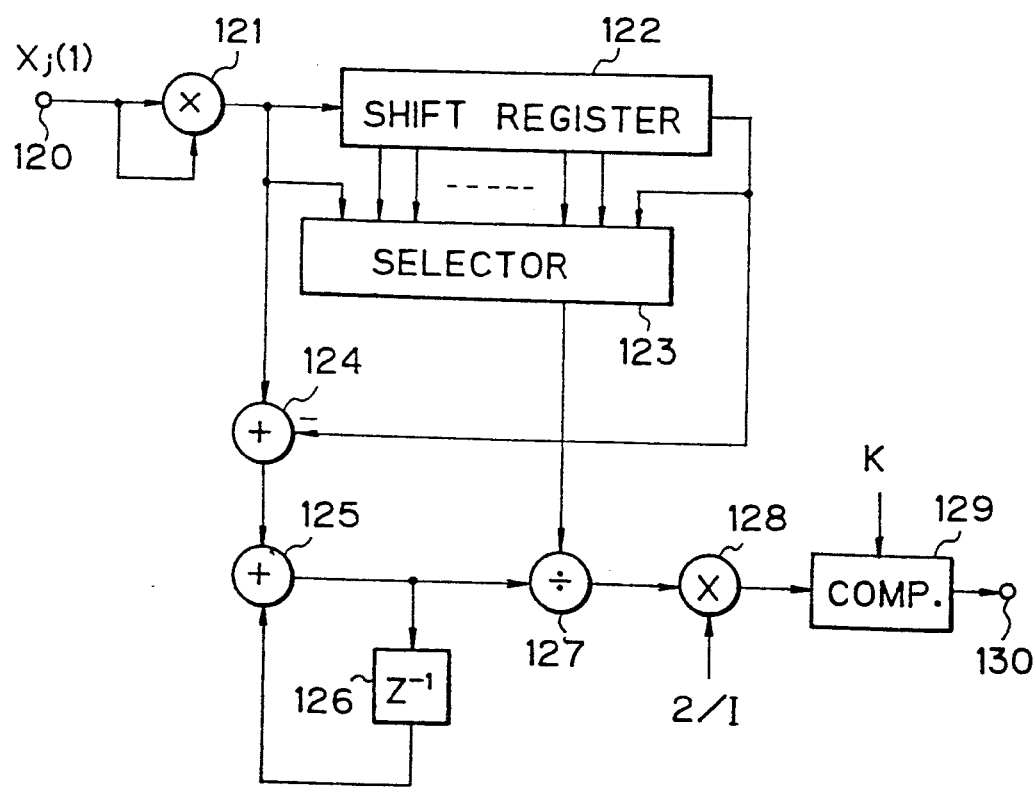
FIG. 37 shows an example of the construction for carrying out the operation of monitoring the quantity of the right side of the relationship (17), and generating a control signal to stop the operation for the estimation of the echo path gain hj(m) when the above condition (17) is not satisfied.

FIG. 37 shows an example of the construction for carrying out the operation of monitoring the quantity of the right side of the relationship (23), and generating a control signal to stop the operation for the estimation of the echo path gain $h_f(m)$ when the above condition (23) is not satisfied. The construction of FIG. 37 can be operated together with the operation in of the construction of FIG. 6.

In FIG. 37, reference numeral 120 denotes an input terminal, 121 denotes a square calculator, 122 denotes a shift register, 123 denotes a selector, 124 denotes a subtracter, 125 denotes an adder, 126 denotes a delay circuit, 127 denotes a divider, 128 denotes a multiplier, 129 denotes a comparator, and 130 denotes an output terminal.

The sampled output signal $X_f(1)$ is input through the input terminal 120, and the square of the sampled output signal $X_f(1)$ is obtained in the square calculator 121. The square $X_f(i)^2$ is serially input into the shift register 122. The shift register 122 generates and outputs in parallel squares of $(i-1)$-cycle-delayed sampled output signals $X_f(i)$ where $i = 2$ to I, and I is the number of taps in the adaptive digital filter. The selector 123 receives in parallel the square of the sampled output signal $X_f(1)$ and the squares of $(i-1)$-cycle-delayed sampled output signals $X_f(i)$ where $i = 2$ to I, and selects one of the squares of the signals $X_f(m)^2$ to supply the selected squares of the signals to the divider 127 as a divisor. The output $X_f(i)^2$ of the square calculator 121 is also supplied to the subtracter 124 as a minuend, and the squares of $(I-1)$-cycle-delayed sampled output signals $X_f(I)^2$ are supplied to the subtracter 124 as a subtrahend. The output of the subtracter 124 is supplied to the adder 125. The adder 125 and the delay circuit 126 constitute a loop, and the output of the subtracter 124 is accumulated through the loop. By the above construction, the output of the adder 125 is equal to $\Sigma X_f(i)^2$ where the summation is carried out for $i = 1$ to I, and is supplied to the divider 127 as a dividend. Thus, $\Sigma X_f(i)^2 / X_f(m)^2$ is obtained in the divider 127, and the output of the divider 127 is multiplied by the value $2/I$ in the multiplier 128. Therefore, $2\Sigma X_f(i)^2 / I X_f(m)^2$ is supplied to the comparator 129. The comparator 128 compares the output of the multiplier 128 with the value K. When the comparator 129 determines that $K \geq 2\Sigma X_f(i)^2 / I X_f(m)^2$, the comparator 129 outputs a control signal to stop the operation for estimating the echo path gain $h_f(m)$. The comparator 129 may be constructed so as to output the value K instead of the above control signal, and output zero as the K value when the comparator 129 determines that $K \geq 2\Sigma X_f(i)^2 / I \cdot X_f(m)^2$. In the above construction, the constructions for obtaining $\Sigma X_f(i)^2$ and $X_f(m)^2$ may be provided commonly with the constructions which carry out the same calculations for the operation of estimation of the echo path gain $h_f(m)$, respectively.

When the number of taps is sufficiently large, the following approximation $$\Sigma X_f(i)^2 = I \cdot \sigma_x^2$$

can be used, and therefore, the above condition (23) is rewritten as $$K < 2\sigma_x^2 / X_f(m)^2, \quad (24)$$

where an assumed value may be used for the value of $\sigma_x^2$. The relationship (24) is the stability condition for the normalized least mean square (NLMS) algorithm. However, as explained before, the normalization is not necessary in the operation for the estimation by the normalized least mean square (NLMS) algorithm because the normalization factor $1/\Sigma X_f(i)^2$ is provided for relatively suppressing the influence of the variation of the amplitude. When the normalization factor $1/\Sigma X_f(i)^2$ is not included, the stability condition (23) is rewritten as $$K < 2 / I \cdot X_f(m)^2. \quad (25)$$

When the length of the registers in the digital signal processor is long, it is expected that an increase in the estimation error due to the low-pass filter coefficients $\alpha_j$ which do not satisfy the above stability condition (25), can be absorbed by the registers in the digital signal processors. Therefore, by replacing $X_f(m)^2$ with the dispersion $\sigma_x^2$ of the $X_f(m)^2$ in the relationship (25), a relationship $$K < 2 / I \cdot \sigma_x^2. \quad (26)$$

is obtained causing the low-pass filter coefficients $\alpha_j$ not to satisfy the above stability condition (25) at a probability of 32%.

When the length of the registers in the digital signal processor is not long, it is expected that an increase in the estimation error due to the low-pass filter coefficients $\alpha_j$ which do not satisfy the above stability condition (25), can be absorbed by the registers in the digital signal processors. Therefore, by replacing $X_f(m)^2$ with twice the dispersion $\sigma_x^2$ of the $X_f(m)^2$ in the relationship (25), a relationship $$K < 1 / I \cdot \sigma_x^2. \quad (27)$$

is obtained causing the low-pass filter coefficients $a_j$ not to satisfy the above stability condition (25) at a lower probability than the above relationship (26). Or, by replacing $X_j(m)^2$ with $(3/2)\cdot\sigma_x^2$ of the $X_j(m)^2$ in the relationship (24), a relationship $$K < 2/[3I\cdot\sigma_x^2]. \tag{28}$$

is obtained.

In addition, by monitoring the quantity of the right side of the relationship (25), and stopping the operation for the estimation of the echo path gain $h_j(m)$ when the above condition (25) is not satisfied, a large value of the coefficient correction constant K can be used in the normalized least mean square (NLMS) algorithm without divergence.

Figure 38:
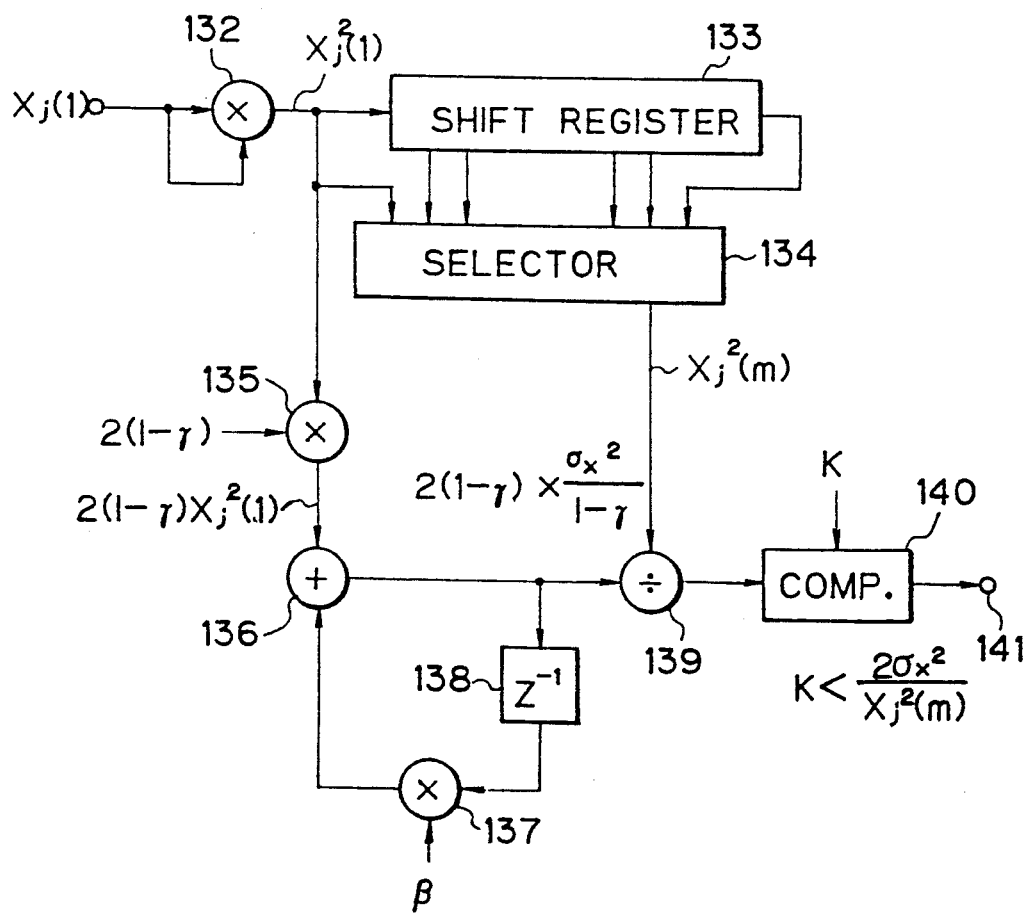
FIG. 38 shows an example of the construction for carrying out the operation of monitoring the quantity of the right side of the relationship (18), and generating a control signal to stop the operation for the estimation of the echo path gain $h_j(m)$ when the above condition (18) is not satisfied.

FIG. 38 shows an example of the construction for carrying out the operation of monitoring the quantity of the right side of the relationship (24), and generating a control signal to stop the operation for the estimation of the echo path gain $h_j(m)$ when the above condition (24) is not satisfied. The construction of FIG. 38 can be operated together with the operation of the construction of FIG. 6.

In FIG. 38, reference numeral 131 denotes an input terminal, 132 denotes a square calculator, 133 denotes a shift register, 134 denotes a selector, 135 denotes a multiplier, 136 denotes an adder, 137 denotes a multiplier, 138 denotes a delay circuit, 139 denotes a divider, 140 denotes a comparator, and 141 denotes an output terminal.

The sampled output signal $X_j(1)$ is input through the input terminal 131, and the square of the sampled output signal $X_j(1)$ is obtained in the square calculator 132. The square $X_j(i)^2$ is serially input into the shift register 133. The shift register 133 generates and outputs in parallel squares of (i−1)-cycle-delayed sampled output signals $X_j(i)$ where i=2 to I, and I is the number of taps in the adaptive digital filter. The selector 134 receives in parallel the square of the sampled output signal $X_j(1)$ and the squares of (i−1)-cycle-delayed sampled output signals $X_j(i)$ where i=2 to I, and selects one of the squares of the signals $X_j(m)^2$ to supply the selected squares of the signals to the divider 139 as a divisor. The output $X_j(i)^2$ of the square calculator 132 is also supplied to the multiplier 135, and is multiplied by a constant $2(1-\gamma)$ where $\gamma$ is the low-pass filter coefficient. The output of the multiplier 135 is supplied to the adder 136. The adder 136, the delay circuit 138, and the multiplier 137 constitute a loop, and the output of the multiplier 135 is accumulated through the loop. In the loop, the output of the adder 136 is supplied to the delay circuit 138, the output of the delay circuit 138 is supplied to the multiplier 137, and is multiplied by $\gamma$ in the multiplier 137, and the output of the multiplier 137 is supplied to the adder 136. Thus, the multiplier 135 and the above loop constitute a low-pass filter. The output of the low-pass filter is equal to $2\cdot(1-\gamma)\cdot\sigma_x^2/(1-\gamma)$, where $\sigma_x^2$ is the dispersion (average power) of the sampled output signal $X_j(i)$, and is supplied to the divider 139 as a dividend. Thus, $2\cdot\sigma_x^2/X_j(m)^2$ is obtained in the divider 139. The output $2\cdot\sigma_x^2/X_j(m)^2$ is compared with the coefficient correction constant K. When the comparator 140 determines that $K \geq 2\cdot\sigma_x^2/X_j(m)^2$, the comparator 140 outputs a control signal to stop the operation for estimating the echo path gain $h_j(m)$. The comparator 140 may be constructed so as to output the value K instead of the above control signal, and output zero as the K value when the comparator 129 determines that $K \geq 2\cdot\sigma_x^2/X_j(m)^2$.

In the above construction, the constructions for obtaining $\Sigma X_j(i)^2$ and $X_j(m)^2$ may be provided commonly with the constructions which carry out the same calculations for the operation of estimation of the echo path gain $h_j(m)$, respectively.

Although the above provision is made for operating with the construction of FIG. 6, a similar provision can be made for the aforementioned fourth and fifth embodiments. Since the estimation in the fourth and fifth embodiments is carried out in accordance with $$H_{j+1}(m) = H_j(m) + K\cdot E_j x_j(m)/r, \tag{14}$$

and the low-pass filter coefficient $\alpha$ is $$\alpha = [1 - K\cdot X_j(m)/r],$$

by substituting the equation $$\alpha = [1 - K\cdot X_j(m)/r],$$

into the above relationship (18), a condition $$K < 2r/I\cdot X_j(m)^2 \tag{29}$$

is obtained, where r is equal to one of the above norm $N_r$, the above integrated power $P_j$, and the above (m−1)-cycle-delayed integrated power $P_j(m)$. Therefore, by replacing $\Sigma X_j(i)^2$ in the above constructions for monitoring the stability conditions, with the above r value, the similar constructions for monitoring the stability conditions can be constructed for the fourth and fifth embodiments.

Realization and Application of the constructions of the present invention

All the constructions according to the present invention, which are explained above, can be realized by either hardware or software (in the digital signal processor).

In addition, the dividers which are provided in the constructions according to the present invention, may be replaced by a construction comprised of a reciprocal generator and a multiplier, and the subtracters which are provided in the constructions according to the present invention, may be replaced by a construction comprised of a polarity inverter and an adder.

Although all the above embodiments are explained for an echo canceler including an adaptive digital filter, as readily understood, all the above provisions can be applied to any other adaptive digital filter for estimating a response characteristic of a signal path by monitoring a sampled output signal of the signal path, estimating a predetermined number of filter coefficients which represent the response characteristic of the signal path, and generating an estimated output signal of the signal path using a plurality of successive sampled input signals of the signal path and the estimated filter coefficients, where the estimation is carried out so that a difference between the output signal and the estimated output signal is reduced.

We claim:

1. An adaptive digital filter for estimating a response characteristic of a signal path by monitoring a sampled output signal of said signal path, estimating a predetermined number of filter coefficients which represent the response characteristic of the signal path, and generating an estimated output signal of said signal path using a plurality of successive sampled input signals of the signal path and estimated filter coefficients, wherein an estimation is carried out so that a difference between said output signal and said estimated output signal is reduced, the filter comprising:

an input signal register for holding a plurality of sampled input signals which have been sampled since a predetermined number of cycles before the current time;

a filter coefficient register for holding said predetermined number of filter coefficients which respectively correspond to the plurality of sampled input signals;

a convolution calculating means for calculating a convolution between said input signal and said estimated response characteristic using said plurality of successive sampled input signals which are held in said input signal register, and said estimated filter coefficients which are held in said filter coefficient register;

an error obtaining means for obtaining a difference between said sampled output signal of said signal path and said convolution as an error in said estimation; and a filter coefficient estimating means for estimating said predetermined number of filter coefficients so that said error is reduced;

said filter coefficient estimating means comprising a filter coefficient renewing means for each of said predetermined number of filter coefficients, for renewing the corresponding filter coefficient in each cycle of sampling, and wherein said filter coefficient renewing means comprises a multiplier for obtaining a product of one of said sampled output signals corresponding to the filter coefficient renewing means, and said sampled input signal, an integrating means for integrating an output of said multiplier to extract a component of said filter coefficient corresponding to the filter coefficient renewing means, a power calculating means for calculating a power of said one of said sampled output signals corresponding to the filter coefficient renewing means, and a divider for dividing an output of the integrating means by an output of the power calculating means.

2. An adaptive digital filter according to claim 1, wherein said integrating means comprises a low-pass filter for integrating the output of the said multiplier to extract a component of said filter coefficient corresponding to the filter coefficient renewing means, wherein a low-pass filter coefficient in the low-pass filter is a constant.

3. An adaptive digital filter according to claim 2, wherein said integrating means further comprises a low-pass filter coefficient setting means for setting said low-pass filter coefficient in said low-pass filter, said low-pass filter coefficient is set to a small value near zero at the beginning of the operation of an echo canceler, and is renewed to be increased with an elapse of time.

4. An adaptive digital filter according to claim 3, wherein the low-pass filter coefficient in said low-pass filter is set to be equal to $(n-1)/n$ where n is an integer, and n is set to be equal to the number of the samples which are counted from the beginning of the operation of the adaptive digital filter for a predetermined time from the beginning of the operation of the adaptive digital filter, and n is renewed so that said low-pass filter coefficient is renewed to be increased with an elapse of time, after a predetermined time.

5. An adaptive digital filter according to claim 2, wherein said integrating means further comprises, an arithmetic average calculating means and low-pass filter coefficient setting means for calculating an arithmetic average of the input signals thereof, wherein said low-pass filter coefficient is set a small value near zero at the beginning of the operation of an echo canceler, and is renewed to be increased with an elapse of time, and a selecting control means for selecting said arithmetic average calculating means to be used as said integrating means for a predetermined time from the beginning of the operation of the adaptive digital filter, and selecting said low-pass filter to be used as said integrating means after a predetermined time.

6. An adaptive digital filter according to claim 2, wherein m-th filter coefficient renewing means corresponding to m-th filter coefficient, where m is an integer satisfying $1 \leq m \leq I$ where I is equal to said number of the filter coefficients further comprises, a power calculation means for calculating an integrated power ($P_j$) of said sampled input signals, where the gain in said power calculation means is set to be equal to a gain in said low-pass filter, and a power delay means for delaying said integrated power ($P_j$) by $(m-1)$ cycles to obtain a $(m-1)$-cycle-delayed integrated power ($P_j(m)$), and the $(m-1)$-cycle-delayed integrated power ($P_j(m)$) is supplied to said divider as a divisor.

7. An adaptive digital filter according to claim 2, wherein m-th filter coefficient renewing means corresponding to m-th filter coefficient, where m is an integer satisfying $1 \leq m \leq I$ where I is equal to said number of the filter coefficients further comprises a power calculation means for receiving one of said sampled input signals which is sampled $(m-1)$ cycles before the current time, and is held in the input signal register, and calculating an $(m-1)$-cycle-delayed integrated power ($P_j(m)$) of the received sampled input signal, where the gain in said power calculation means is set to be equal to a gain in said low-pass filter, and the $(m-1)$-cycle-delayed integrated power ($P_j(m)$) is supplied to said divider as a divisor.

8. An adaptive digital filter according to claim 1, wherein m-th filter coefficient renewing means corresponding to m-th filter coefficient, where m is an integer satisfying $1 \leq m \leq I$ where I is equal to said number of the filter coefficients, further comprises a sum-of-products calculating means for receiving the output of the convolution calculating means, and obtaining and outputting a sum-of-products $\Sigma_m H_j(i) X_j(i)$ where $X_j(i)$ is the sampled input signal which has been sampled $(i-1)$ cycles before the current time j, $H_j(i)$ denotes a filter coefficient corresponding to the sampled input signal $X_j(i)$, and $\Sigma_m$ is a summation of all the filter coefficient of the adaptive digital filter except $i=m$, and a subtracter which receives said sampled output signal and the output of the convolution calculating means, subtracts the output of the convolution calculating means from said sampled output signal, and said multiplier receives the output of the subtracter instead of said sampled output signal.

9. An adaptive digital filter according to claim 8, further comprising a filter coefficient modifying means for modifying the values of the filter coefficients which are supplied to the convolution calculating means.

10. An adaptive digital filter according to claim 9, wherein said filter coefficient modifying means comprises:
   a comparing means where $1 \leq i \leq I$ and I is the number of the filter coefficients, for each filter coefficient, for receiving said error in said estimation, and comparing the error with a reference level which is predetermined for each filter coefficient, and
   a modifying means for outputting zero to said convolution calculating means instead of the corresponding filter coefficient when said error is below said reference level, and outputting the corresponding filter coefficient when said error exceeds said reference level.

11. An adaptive digital filter according to claim 10, wherein each said reference level is preset so that the filter coefficients are supplied to the convolution calculating means in the order of the corresponding sampled input signals which are held in the input signal register, from the newest to the oldest.

12. An adaptive digital filter according to claim 9, wherein said filter coefficient modifying means comprises
   a comparing means where $1 \leq i \leq I$ and I is the number of the filter coefficients, for each filter coefficient, for receiving said error in said estimation, and comparing the error with a plurality of reference levels which are predetermined for each filter coefficient, to determine the level of the error, and
   a modifying means for multiplying the corresponding filter coefficient by a plurality of factors according to the level of the error, and outputting the multiplied filter coefficient to said convolution calculating means,
   said reference levels and said factors being predetermined so that said multiplied filter coefficients which are supplied to said convolution calculation means instead of the filter coefficients, gradually increase from zero to the whole values of the filter coefficients.

13. An adaptive digital filter according to claim 9, wherein said filter coefficient modifying means comprises
   a comparing means where $1 \leq i \leq I$ and I is the number of the filter coefficients, for each filter coefficient, for receiving a timer count which indicates an elapse of time from the beginning of the operation of the adaptive digital filter, and comparing the timer count with a reference level which is predetermined for each filter coefficient, and
   a modifying means for outputting zero to said convolution calculating means instead of the corresponding filter coefficient when said timer count is below said reference level, and outputting the corresponding filter coefficient when said timer count exceeds said reference level.

14. An adaptive digital filter according to claim 13, wherein each said reference level is preset so that the filter coefficients are supplied to the convolution calculating means in the order of the corresponding sampled input signals which are held in the input signal register, from the newest to the oldest.

15. An adaptive digital filter according to claim 9, wherein said filter coefficient modifying means comprises
   a comparing means where $1 \leq i \leq I$ and I is the number of the filter coefficients, for each filter coefficient, for receiving a timer count in said estimation, and comparing the timer count with a plurality of reference levels which are predetermined for each filter coefficient, to determine the level of the timer count, and
   a modifying means for multiplying the corresponding filter coefficient by a plurality of factors according to the level of the timer count, and outputting the multiplied filter coefficient to said convolution calculating means,
   said reference levels and said factors being predetermined so that multiplied filter coefficients which are supplied to said convolution calculation means instead of the filter coefficients, gradually increase from zero to the whole values of the filter coefficients.

16. An adaptive digital filter for estimating a response characteristic of a signal path by monitoring a sampled output signal of said signal path, estimating a predetermined number of filter coefficients which represent the response characteristic of the signal path, and generating an estimated output signal of said signal path using a plurality of successive sampled input signals of the signal path and estimated filter coefficients, wherein an estimation is carried out so that a difference between said output signal and said estimated output signal is reduced, the filter comprising:
   an input signal register for holding a plurality of sampled input signals which have been sampled since a predetermined number of cycles before the current time;
   a filter coefficient register for holding said predetermined number of filter coefficients which respectively correspond to the plurality of sampled input signals;
   a convolution calculating means for calculating a convolution between said input signal and said estimated response characteristic using a plurality of successive sampled input signals which are held in said input signal register, and said estimated filter coefficients which are held in said filter coefficient register;
   an error obtaining means for obtaining a difference between said sampled output signal of said signal path and said convolution as an error in said estimation; and
   a filter coefficient estimating means for estimating said predetermined number of filter coefficients so that said error is reduced;
   said filter coefficient estimating means comprising a filter coefficient renewing means for each of said predetermined number of filter coefficients, for renewing the corresponding filter coefficient in each cycle of sampling, and wherein
   said filter coefficient renewing means comprises
   a multiplier for obtaining a product of one of said sampled output signals corresponding to the filter coefficient renewing means, and said sampled input signal,
   an accumulating means for accumulating an output of the multiplier, a power calculating means for calculating a power of said one of said sampled output signals corresponding to the filter coefficient renewing means, a divider for dividing an output of the accumulating by an output of the power calculating means, and an integrating means for integrating the output of said divider to extract a component of said filter coefficient corresponding to the filter coefficient renewing means.

17. An adaptive digital filter according to claim 16, wherein said integrating means comprises a low-pass filter for integrating the output of the said divider to extract a component of said filter coefficient corresponding to the filter coefficient renewing means, wherein a low-pass filter coefficient in the low-pass filter is a constant.

18. An adaptive digital filter according to claim 17, wherein said integrating means further comprises a low-pass filter coefficient setting means for setting said low-pass filter coefficient in said low-pass filter, said low-pass filter coefficient is set to a small value near zero at the beginning of the operation of an echo canceler, and is renewed to be increased with an elapse of time.

19. An adaptive digital filter according to claim 18, wherein the low-pass filter coefficient in said low-pass filter is set to be equal to $(n-1)/n$ where n is an integer, and n is set to be equal to the number of the samples which are counted from the beginning of the operation of the adaptive digital filter for a predetermined time from the beginning of the operation of the adaptive digital filter, and n is renewed so that said low-pass filter coefficient is renewed to be increased with an elapse of time, after a predetermined time.

20. An adaptive digital filter according to claim 17, wherein said integrating means further comprises an arithmetic average calculating means low-pass filter coefficient setting means for calculating an arithmetic average of the input signals thereof, wherein said low-pass filter coefficient is set to a small value near zero at the beginning of the operation of the echo canceler, and is renewed to be increased with an elapse of time, and a selecting control means for selecting said arithmetic average calculating means to be used as said integrating means for a predetermined time from the beginning of the operation of the adaptive digital filter, and selecting said low-pass filter to be used as said integrating means after a predetermined time.

21. An adaptive digital filter according to claim 17, wherein m-th filter coefficient renewing means corresponding to m-th filter coefficient, where m is an integer satisfying $1 \leq m \leq I$ where I is equal to said number of the filter coefficients, further comprises a power calculation means for calculating an integrated power ($P_j$) of said sampled input signals, where the gain in said power calculation means is set to be equal to a gain in said low-pass filter, and a power delay means for delaying said integrated power ($P_j$) by $(m-1)$ cycles to obtain $(m-1)$-cycle-delayed integrated power ($P_j(m)$), and the $(m-1)$-cycle-delayed integrated power ($P_j(m)$) is supplied to said divider as a divisor.

22. An adaptive digital filter according to claim 17, wherein m-th filter coefficient renewing means corresponding to m-th filter coefficient, where m is an integer satisfying $1 \leq m \leq I$ where I is equal to said number of the filter coefficients, further comprises a power calculation means for receiving one of said sampled input signals which is sampled $(m-1)$ cycles before the current time, and is held in the input signal register, and calculating an $(m-1)$-cycle-delayed integrated power ($P_j(m)$) of the received sampled input signal, where the gain in said power calculation means is set to be equal to a gain in said low-pass filter, and the $(m-1)$-cycle-delayed integrated power ($P_j(m)$) is supplied to said divider as a divisor.

23. An adaptive digital filter according to claim 16, wherein m-th filter coefficient renewing means corresponding to m-th filter coefficient, where m is an integer satisfying $1 \leq m \leq I$ where I is equal to said number of the filter coefficients, further comprises a sum-of-products calculating means for receiving the output of the convolution calculating means, and obtaining and outputting a sum-of-products $\Sigma_m H_j(i) X_j(i)$ where $X_j(i)$ is the sampled input signal which has been sampled $(i-1)$ cycles before the current time j, $H_j(i)$ denotes a filter coefficient corresponding to the sampled input signal $X_j(i)$, and $\Sigma_m$ is a summation of all the filter coefficients of the adaptive digital filter except $i=m$, and a subtracter which receives said sampled output signal and the output of the convolution calculating means, subtracts the output of the convolution calculating means from said sampled output signal, and said multiplier receives the output of the subtracter instead of said sampled output signal.

24. An adaptive digital filter according to claim 23, further comprising a filter coefficient modifying means for modifying the values of the filter coefficients which are supplied to the convolution calculating means.

25. An adaptive digital filter according to claim 24, wherein said filter coefficient modifying means comprises a comparing means where $1 \leq i \leq I$ and I is the number of filter coefficients, for each filter coefficient, for receiving said error in said estimation, and comparing the error with a reference level which is predetermined for each filter coefficient, and a modifying means for outputting zero to said convolution calculating means instead of the corresponding filter coefficient when said error is below said reference level, and outputting the corresponding filter coefficient when said error exceeds said reference level.

26. An adaptive digital filter according to claim 25, wherein each said reference level is preset so that the filter coefficients are supplied to the convolution calculating means in the order of the corresponding sampled input signals which are held in the input signal register, from the newest to the oldest.

27. An adaptive digital filter according to claim 24, wherein said filter coefficient modifying means comprises a comparing means where $1 \leq i \leq I$ and I is the number of the filter coefficients, for each filter coefficient, for receiving said error in said estimation, and comparing the error with a plurality of reference levels which are predetermined for each filter coefficient, to determine the level of the error, and a modifying means for multiplying the corresponding filter coefficient by a plurality of factors according to the level of the error, and outputting the multiplied filter coefficient to said convolution calculating means, said reference levels and said factors being predetermined so that said multiplied filter coefficients which are supplied to said convolution calculation means instead of the filter coefficients, gradually increase from zero to the whole values of the filter coefficients.

28. An adaptive digital filter according to claim 24, wherein said filter coefficient modifying means comprises a comparing means where $1 \leq i \leq I$ and I is the number of the filter coefficients, for each filter coefficient, for receiving a timer count which indicates an elapse of time from the beginning of the operation of the adaptive digital filter, and comparing the timer count with a reference level which is predetermined for each filter coefficient, and a modifying means for outputting zero to said convolution calculating means instead of the corresponding filter coefficient when said timer count is below said reference level, and outputting the corresponding filter coefficient when said timer count exceeds said reference level.

29. An adaptive digital filter according to claim 28, wherein each said reference level is preset so that the filter coefficients are supplied to the convolution calculating means in the order of the corresponding sampled input signals which are held in the input signal register, from the newest to the oldest.

30. An adaptive digital filter according to claim 24, wherein said filter coefficient modifying means comprises a comparing means where $1 \leq i \leq I$ and I is the number of filter coefficients, for each filter coefficient, for receiving a timer count in said estimation, and comparing the timer count with a plurality of reference levels which are predetermined for each filter coefficient, to determine the level of the timer count, and a modifying means for multiplying the corresponding filter coefficient by a plurality of factors according to the level of the timer count, and outputting the multiplied filter coefficient to said convolution calculating means, said reference levels and said factors being predetermined so that said multiplied filter coefficients which are supplied to said convolution calculation means instead of the filter coefficients, gradually increases from zero to the whole values of the filter coefficients.

31. An adaptive digital filter for estimating a response characteristic of a signal path by monitoring a sampled output signal of said signal path, estimating a predetermined number of filter coefficients which represent the response characteristic of the signal path, and generating an estimated output signal of said signal path using a plurality of successive sampled input signals of the signal path and estimated filter coefficients, wherein an estimation is carried out so that a difference between said output signal and said estimated output signal is reduced, the filter comprising:

an input signal register for holding a plurality of sampled input signals which have been sampled since a predetermined number of cycles before the current time;

a filter coefficient register for holding said predetermined number of filter coefficients which respectively correspond to the plurality of sampled input signals;

a convolution calculating means for calculating a convolution between said input signal and said estimated response characteristic using a plurality of successive sampled input signals which are held in said input signal register, and said estimated filter coefficients which are held in said filter coefficient register;

an error obtaining means for obtaining a difference between said sampled output signal of said signal path and said convolution as an error in said estimation; and a filter coefficient estimating means for estimating said predetermined number of filter coefficients so that said error is reduced;

said filter coefficient estimating means comprising a filter coefficient renewing means for each of said predetermined number of filter coefficients, for renewing the corresponding filter coefficient in each cycle of sampling, and wherein said filter coefficient renewing means comprises a dividing means for dividing said sampled input signal by one of said sampled output signals corresponding to the filter coefficient renewing means, a zero detecting means for determining that said one of said sampled output signals corresponding to the filter coefficient renewing means is below a predetermined level, an integrating means for integrating the output of the said dividing means so that a component of said filter coefficient corresponding to the filter coefficient renewing means is extracted in an output thereof, and a stop control means for stopping the operation of said integrating means when said zero detecting means determines that said one of said sampled output signals corresponding to the filter coefficient renewing means is below the predetermined level.

32. An adaptive digital filter according to claim 31, wherein said integrating means comprises a low-pass filter for integrating the output of the said dividing means to extract a component of said filter coefficient corresponding to the filter coefficient renewing means, wherein a low-pass filter coefficient in the low-pass filter is a constant.

33. An adaptive digital filter according to claim 32, wherein said integrating means further comprises a low-pass filter coefficient setting means for setting said low-pass filter coefficient in said low-pass filter, said low-pass filter coefficient is set to a small value near zero at the beginning of the operation of an echo canceler, and is renewed to be increased with the elapse of time.

34. An adaptive digital filter according to claim 33, wherein the low-pass filter coefficient in said low-pass filter is set to be equal to $(n-1)/n$ where n is an integer, and n is set to be equal to the number of the samples which are counted from the beginning of the operation of the adaptive digital filter for a predetermined time from the beginning of the operation of the adaptive digital filter, and n is renewed so that said low-pass filter coefficient is renewed to be increased with an elapse of time, after a predetermined time.

35. An adaptive digital filter according to claim 32, wherein said integrating means further comprises an arithmetic average calculating means and low-pass filter coefficient setting means for calculating an arithmetic average of the input signals thereof, wherein said low-pass filter coefficient is set a small value near zero at the beginning of the operation of the echo canceler, and is renewed to be increased with an elapse of time, and a selecting control means for selecting said arithmetic average calculating means to be used as said integrating means for a predetermined time from the beginning of the operation of the adaptive digital filter, and selecting said low-pass filter to be used as said integrating means after a predetermined time.

36. An adaptive digital filter according to claim 31, wherein m-th filter coefficient renewing means corresponding to m-th filter coefficient, where m is an integer satisfying $1 \leq m \leq I$ where I is equal to said number of the filter coefficients, further comprises, a sum-of-products calculating means for receiving the output of the convolution calculating means, and obtaining and outputting a sum-of-products $\Sigma_m H_j(i)X_j(i)$ where $X_j(i)$ is the sampled input signal which has been sampled $(i-1)$ cycles before the current time j, $H_j(i)$ denotes a filter coefficient corresponding to the sampled input signal $X_j(i)$, and $\Sigma_m$ is a summation of all the filter coefficients of the adaptive digital filter except $i=m$, and a subtracter which receives said sampled output signal and the output of the convolution calculating means, subtracts the output of the convolution calculating means from said sampled output signal, and said dividing means receiving the output of the subtracter instead of said sampled output signal.

37. An adaptive digital filter according to claim 36, further comprising a filter coefficient modifying means for modifying the values of the filter coefficients which are supplied to the convolution calculating means.

38. An adaptive digital filter according to claim 37, wherein said filter coefficient modifying means comprises a comparing means where $1 \leq i \leq I$ and I is the number of the filter coefficients, for each filter coefficient, for receiving said error in said estimation, and comparing the error with a reference level which is predetermined for each filter coefficient, and a modifying means for outputting zero to said convolution calculating means instead of the corresponding filter coefficient when said error is below said reference level, and outputting the corresponding filter coefficient when said error exceeds said reference level.

39. An adaptive digital filter according to claim 38, wherein each said reference level is preset so that the filter coefficients are supplied to the convolution calculating means in the order of the corresponding sampled input signals which are held in the input signal register, from the newest to the oldest.

40. An adaptive digital filter according to claim 37, wherein said filter coefficient modifying means comprises a comparing means where $1 \leq i \leq I$ and I is the number of the filter coefficients, for each filter coefficient, for receiving said error in said estimation, and comparing the error with a plurality of reference levels which are predetermined for each filter coefficient, to determine the level of the error, and a modifying means for multiplying the corresponding filter coefficient by a plurality of factors according to the level of the error, and outputting the multiplied filter coefficient to said convolution calculating means, said reference levels and said factors being predetermined so that said multiplied filter coefficients which are supplied to said convolution calculation means instead of the filter coefficients, gradually increase from zero to the whole values of the filter coefficients.

41. An adaptive digital filter according to claim 37, wherein said filter coefficient modifying means comprises a comparing means where $1 \leq i \leq I$ and I is the number of the filter coefficients, for each filter coefficient, for receiving a timer count which indicates an elapse of time from the beginning of the operation of the adaptive digital filter, and comparing the timer count with a reference level which is predetermined for each filter coefficient, and a modifying means for outputting zero to said convolution calculating means instead of the corresponding filter coefficient when said timer count is below said reference level, and outputting the corresponding filter coefficient when said timer count exceeds said reference level.

42. An adaptive digital filter according to claim 41, wherein each said reference level is preset so that the filter coefficients are supplied to the convolution calculating means in the order of the corresponding sampled input signals which are held in the input signal register, from the newest to the oldest.

43. An adaptive digital filter according to claim 37, wherein said filter coefficient modifying means comprises a comparing means where $1 \leq i \leq I$ and I is the number of the filter coefficients, for each filter coefficient, for receiving a timer count in said estimation, and comparing the timer count with a plurality of reference levels which are predetermined for each filter coefficient, to determine the level of the timer count, and a modifying means for multiplying the corresponding filter coefficient by a plurality of factors according to the level of the timer count, and outputting the multiplied filter coefficient to said convolution calculating means, said reference levels and said factors are predetermined so that said multiplied filter coefficients which are supplied to said convolution calculation means instead of the filter coefficients, gradually increase from zero to the whole values of the filter coefficients.

44. An adaptive digital filter according to claim 31, wherein said divider in each filter coefficient renewing means comprises a reciprocal calculating means for obtaining a reciprocal of said one of said sampled output signals corresponding to the filter coefficient renewing means, and a multiplier for multiplying said sampled input signal by the output of the reciprocal calculating means.

45. An adaptive digital filter for estimating a response characteristic of a signal path by monitoring a sampled output signal of said signal path, estimating a predetermined number of filter coefficients which represent the response characteristic of the signal path, and generating an estimated output signal of said signal path using a plurality of successive sampled input signals of the signal path and estimated filter coefficients, wherein an estimation is carried out so that a difference between said output signal and said estimated output signal is reduced, the filter comprising:

an input signal register for holding a plurality of sampled input signals which have been sampled since a predetermined number of cycles before the current time;

a filter coefficient register for holding said predetermined number of filter coefficients which respectively correspond to the plurality of sampled input signals;

a convolution calculating means for calculating a convolution between said input signal and said estimated response characteristic using a plurality of successive sampled input signals which are held in said input signal register, and said estimated filter coefficients which are held in said filter coefficient register;

an error obtaining means for obtaining a difference between said sampled output signal of said signal path and said convolution as an error in said estimation; and a filter coefficient estimating means for estimating said predetermined number of filter coefficients so that said error is reduced;

said filter coefficient estimating means comprising a filter coefficient renewing means for each of said predetermined number of filter coefficients, for renewing the corresponding filter coefficient in each cycle of sampling, and wherein m-th filter coefficient renewing means corresponding to m-th filter coefficient, where m is an integer satisfying $1 \leq i \leq I$ where I is equal to said number of filter coefficients, comprises a low-pass filter for integrating said sampled input signals so that a component of said filter coefficient corresponding to the filter coefficient renewing means is extracted in the output thereof, and said low-pass filter comprises a first multiplier for multiplying each of said sampled input signals by a first factor which is equal to $K \cdot X_j(m)/r$, where K is a coefficient correction constant, $X_j(m)$ is the sampled input signal which have been sampled $(m-1)$ cycles before the current time j, j denotes a number indicating a current time, and r denotes a value for normalizing the first factor, an adder, a delay means for delaying an output of said adder, and a second multiplier for multiplying an output of the delay means by a second factor which is equal to $1 - K \cdot X_j(m)^2/r$, said adder adding outputs of the first and second multipliers, and the output of the adder becoming the output of said filter coefficient renewing means.

46. An adaptive digital filter according to claim 45, wherein said m-th filter coefficient renewing means further comprises a norm calculation means for calculating a norm $$N_r = \sum_{k=1}^{n} X_k(m)^2$$

where $X_k(m)$ is the sampled input signal which has been sampled $(m-1)$ cycles before the current time k, n is the maximum number of k in the sampled input signals which are held in the input signal register, and said norm $(N_r)$ is supplied to said first and second multipliers as said value (r).

47. An adaptive digital filter according to claim 46, wherein the number of the sampled input signals which are held in said input signal register is larger than the number of the filter coefficients.

48. An adaptive digital filter according to claim 45, wherein each of said filter coefficient renewing means further comprises a power calculation means for calculating an integrated power of said sampled input signals, where the gain in said power calculation means can be set to a predetermined value.

49. An adaptive digital filter according to claim 48, wherein m-th filter coefficient renewing means corresponding to m-th filter coefficient, where m is an integer satisfying $1 \leq m \leq I$ where I is equal to said number of the filter coefficients, further comprises a power delay means for delaying said integrated power $(P_j)$ by $(m-1)$ cycles to obtain $(m-1)$-cycle-delayed integrated power $(P_j(m))$, and the $(m-1)$-cycle-delayed integrated power $(P_j(m))$ is supplied to said first and second multipliers as said value (r).

50. An adaptive digital filter according to claim 45, wherein said m-th filter coefficient renewing means corresponding to said m-th filter coefficient, where m is an integer satisfying $1 \leq m \leq I$ where I is equal to said number of the filter coefficients, further comprises a norm calculation means for calculating a norm $$N_r = \sum_{k=1}^{n} X_k(m)^2$$

where $X_k(m)$ is the sampled input signal which has been sampled $(m-1)$ cycles before the current time k, n is the maximum number of k in the sampled input signals which are held in the input signal register, and said norm $(N_r)$ is supplied to said first and second multipliers as said value (r) in a first stage of the operation of the adaptive digital filter, a power calculation means for calculating an integrated power $(P_j)$ of said sampled input signals, where the gain in said power calculation means can be set to a predetermined value, and the integrated power $(P_j)$ is supplied to said first and second multipliers as said value (r) in a second stage of the operation of the adaptive digital filter, and a power delay means for delaying said integrated power $(P_j)$ by $(m-1)$ cycles to obtain a $(m-1)$-cycle-delayed integrated power $(P_j(m))$, and the $(m-1)$-cycle-delayed integrated power $(P_j(m))$ is supplied to said first and second multipliers as said value (r) in a third stage of the operation of the adaptive digital filter.

51. An adaptive digital filter according to claim 50, wherein the number of the sampled input signals which are held in said input signal register is larger than the number of the filter coefficients.

52. An adaptive digital filter according to claim 45, wherein said m-th filter coefficient renewing means corresponding to said m-th filter coefficient, where m is an integer satisfying $1 \leq m \leq I$ where I is equal to said number of the filter coefficients, further comprises a sum-of-products calculating means for receiving the output of the convolution calculating means, and obtaining and outputting a sum-of-products $\Sigma_m H_j(i) X_j(i)$ where $X_j(i)$ is the sampled input signal which has been sampled $(i-1)$ cycles before the current time j, $H_j(i)$ denotes a filter coefficient corresponding to the sampled input signal $X_j(i)$, and $\Sigma_m$ is a summation of all the filter coefficients of the adaptive digital filter except $i=m$, and a subtracter which receives said sampled output signal and the output of the convolution calculating means, and subtracts the output of the convolution calculating means from said sampled output signal, and said first multiplier receiving the output of the subtracter instead of said sampled output signal.

53. An adaptive digital filter according to claim 52, further comprising a filter coefficient modifying means for modifying the values of the filter coefficients which are supplied to the convolution calculating means.

54. An adaptive digital filter according to claim 53, wherein said filter coefficient modifying means comprises a comparing means where $1 \leq i \leq I$ and I is the number of the filter coefficients, for each filter coefficient, for receiving said error in said estimation, and comparing the error with a reference level which is predetermined for each filter coefficient, and a modifying means for outputting zero to said convolution calculating means instead of the corresponding filter coefficient when said error is below said reference level, and outputting the corresponding filter coefficient when said error exceeds said reference level.

55. An adaptive digital filter according to claim 54, wherein each said reference level is preset so that the filter coefficients are supplied to the convolution calculating means in the order of the corresponding sampled input signals which are held in the input signal register, from the newest to the oldest.

56. An adaptive digital filter according to claim 53, wherein said filter coefficient modifying means comprises a comparing means where $1 \leq i \leq I$ and I is the number of the filter coefficients, for each filter coefficient, for receiving said error in said estimation, and comparing the error with a plurality of reference levels which are predetermined for each filter coefficient, to determine the level of the error, and a modifying means for multiplying the corresponding filter coefficient by a plurality of factors according to the level of the error, and outputting the multiplied filter coefficient to said convolution calculating means, said reference levels and said factors being predetermined so that said multiplied filter coefficients which are supplied to said convolution calculation means instead of the filter coefficients, gradually increase from zero to the whole values of the filter coefficients.

57. An adaptive digital filter according to claim 53, wherein said filter coefficient modifying means comprises a comparing means where $1 \leq i \leq I$ and I is the number of the filter coefficients, for each filter coefficient, for receiving a timer count which indicates an elapse of time from the beginning of the operation of the adaptive digital filter, and comparing the timer count with a reference level which is predetermined for each filter coefficient, and a modifying means for outputting zero to said convolution calculating means instead of the corresponding filter coefficient when said timer count is below said reference level, and outputting the corresponding filter coefficient when said timer count exceeds said reference level.

58. An adaptive digital filter according to claim 57, wherein each said reference level is preset so that the filter coefficients are supplied to the convolution calculating means in the order of the corresponding sampled input signals which are held in the input signal register, from the newest to the oldest.

59. An adaptive digital filter according to claim 53, wherein said filter coefficient modifying means comprises a comparing means where $1 \leq i \leq I$ and I is the number of the filter coefficients, for each filter coefficient, for receiving said timer count in said estimation, and comparing the timer count with a plurality of reference levels ($Th_{i1}$ to $Th_{i3}$) which are predetermined for each filter coefficient, to determine the level of the timer count, and a modifying means for multiplying the corresponding filter coefficient by a plurality of factors according to the level of the timer count, and outputting the multiplied filter coefficient to said convolution calculating means, said reference levels and said factors being predetermined so that said multiplied filter coefficients which are supplied to said convolution calculation means instead of the filter coefficients, gradually increase from zero to the whole values of the filter coefficients.

60. An adaptive digital filter according to claim 45, further comprising a stability condition monitoring means for determining whether or not a stability condition $$K < 2r/I \cdot X_j(m)^2$$

is satisfied, where I is the number of the filter coefficients, K is said coefficient correction constant, r is said value in the divider, $X_j(m)$ is the sampled input signal which has been sampled $(m-1)$ cycles before the current time j, and a stop control means for generating a stop control signal which stops the operation of the adaptive digital filter when said stability condition is not satisfied.

61. An adaptive digital filter for estimating a response characteristic of a signal path by monitoring a sampled output signal of said signal path, estimating a predetermined number of filter coefficients which represent the response characteristic of the signal path, and generating an estimated output signal of said signal path using a plurality of successive sampled input signals of the signal path and estimated filter coefficients, wherein an estimation is carried out so that a difference between said output signal and said estimated output signal is reduced, the filter comprising:

an input signal register for holding a plurality of sampled input signals which have been sampled since a predetermined number of cycles before the current time;

a filter coefficient register for holding said predetermined number of filter coefficients which respectively correspond to the plurality of sampled input signals;

a convolution calculating means for calculating a convolution between said input signal and said estimated response characteristic using a plurality of successive sampled input signals which are held in said input signal register, and said estimated filter coefficients which are held in said filter coefficient register;

an error obtaining means for obtaining a difference between said sampled output signal of said signal path and said convolution as an error in said estimation; and a filter coefficient estimating means for estimating said predetermined number of filter coefficients so that said error is reduced;

said filter coefficient estimating means comprising a filter coefficient renewing means for each of said predetermined number of filter coefficients, for renewing the corresponding filter coefficient in each cycle of said sampling, and said filter coefficient renewing means comprising a first multiplier for multiplying each of said sampled output signals by a coefficient correction constant (K), a divider for dividing an output of the first multiplier by a value (r) for normalizing the first factor, a second multiplier for multiplying an output of the divider by one of the sampled output signals, and an adder for adding a previously estimated filter coefficient corresponding to the filter coefficient renewing means, to the output of the second multiplier.

62. An adaptive digital filter according to claim 61, wherein said m-th filter coefficient renewing means corresponding to m-th filter coefficient, where m is an integer satisfying $1 \leq m \leq I$ where I is equal to said number of the filter coefficients, further comprises a norm calculation means for calculating a norm $$N_r = \sum_{k=1}^{n} X_k(m)^2$$

where $X_k(m)$ is the sampled input signal which has been sampled $(m-1)$ cycles before the current time k, n is the maximum number of k in the sampled input signals which are held in the input signal register, and said norm $(N_r)$ is supplied to said divider as said value (r).

63. An adaptive digital filter according to claim 62, wherein the number of the sampled input signals which are held in said input signal register is larger than the number of the filter coefficients.

64. An adaptive digital filter according to claim 61, wherein each of said filter coefficient renewing means further comprises a power calculation means for calculating an integrated power $(P_j)$ of said sampled input signals, where the gain in said power calculation means can be set to a predetermined value.

65. An adaptive digital filter according to claim 64, wherein m-th filter coefficient renewing means corresponding to m-th filter coefficient, where m is an integer satisfying $1 \leq m \leq I$ where I is equal to said number of the filter coefficients, further comprises a power delay means for delaying said integrated power $(P_j)$ by a $(m-1)$ cycles to obtain $(m-1)$-cycle-delayed integrated power $(P_j(m))$, and the $(m-1)$-cycle-delayed integrated power $(P_j(m))$ is supplied to said divider as said value (r).

66. An adaptive digital filter according to claim 61, wherein m-th filter coefficient renewing means corresponding to m-th filter coefficient, where m is an integer satisfying $1 \leq m \leq I$ where I is equal to said number of the filter coefficients, further comprises a norm calculation means for calculating a norm $$N_r = \sum_{k=1}^{n} X_k(m)^2$$

where $X_k(m)$ is the sampled input signal which has been sampled $(m-1)$ cycles before the current time k, n is the maximum number of k in the sampled input signals which are held in the input signal register, and said norm $(N_r)$ is supplied to said divider as said value (r) in a first stage of the operation of the adaptive digital filter, a power calculation means for calculating an integrated power $(P_j)$ of said sampled input signals, where the gain in said power calculation means can be set to a predetermined value, and the integrated power $(P_j)$ is supplied to said divider in a second stage of the operation of the adaptive digital filter, and a power delay means for delaying said integrated power $(P_j)$ by $(m-1)$ cycles to obtain a $(m-1)$-cycle-delayed integrated power $(P_j(m))$, and the $(m-1)$-cycle-delayed integrated power $(P_j(m))$ is supplied to said divider as said value (r) in a third stage of the operation of the adaptive digital filter.

67. An adaptive digital filter according to claim 66, wherein the number of the sampled input signals which are held in said input signal register is larger than the number of the filter coefficients.

68. An adaptive digital filter according to claim 61, wherein each of said filter coefficient renewing means further comprises, a subtracter which receives said sampled output signal and the output of the convolution calculating means, and subtracts the output of the convolution calculating means from said sampled output signal, and said first multiplier receiving the output of the subtracter instead of said sampled output signal.

69. An adaptive digital filter according to claim 68, further comprising a filter coefficient modifying means for modifying the values of the filter coefficients which are supplied to the convolution calculating means.

70. An adaptive digital filter according to claim 69, wherein said filter coefficient modifying means comprises a comparing means where $1 \leq i \leq I$ and I is the number of the filter coefficients, for each filter coefficient, for receiving said error in said estimation, and comparing the error with a reference level which is predetermined for each filter coefficient, and a modifying means for outputting zero to said convolution calculating means instead of the corresponding filter coefficient when said error is below said reference level, and outputting the corresponding filter coefficient when said error exceeds said reference level.

71. An adaptive digital filter according to claim 70, wherein said each reference level is preset so that the filter coefficients are supplied to the convolution calculating means in the order of the corresponding sampled input signals which are held in the input signal register, from the newest to the oldest.

72. An adaptive digital filter according to claim 69, wherein said filter coefficient modifying means comprises
 a comparing means where $1 \leq i \leq I$ and I is the number of the filter coefficients, for each filter coefficient, for receiving said error in said estimation, and comparing the error with a plurality of reference levels which are predetermined for each filter coefficient, to determine the level of the error, and
 a modifying means for multiplying the corresponding filter coefficient by a plurality of factors according to the level of the error, and outputting the multiplied filter coefficient to said convolution calculating means,
 said reference levels and said factors being predetermined so that said multiplied filter coefficients which are supplied to said convolution calculation means instead of the filter coefficients, gradually increase from zero to the whole values of the filter coefficients.

73. An adaptive digital filter according to claim 69, wherein said filter coefficient modifying means comprises
 a comparing means where $1 \leq i \leq I$ and I is the number of the filter coefficients, for each filter coefficient, for receiving a timer count which indicates an elapse of time from the beginning of the operation of the adaptive digital filter, and comparing the timer count with a reference level which is predetermined for each filter coefficient, and
 a modifying means for outputting zero to said convolution calculating means instead of the corresponding filter coefficient when said timer count is below said reference level, and outputting the corresponding filter coefficient when said timer count exceeds said reference level.

74. An adaptive digital filter according to claim 73, wherein each said reference level is preset so that the filter coefficients are supplied to the convolution calculating means in the order of the corresponding sampled input signals which are held in the input signal register, from the newest to the oldest.

75. An adaptive digital filter according to claim 69, wherein said filter coefficient modifying means comprises
 a comparing means where $1 \leq i \leq I$ and I is the number of the filter coefficients, for each filter coefficient, for receiving said timer count in said estimation, and comparing the timer count with a plurality of reference levels which are predetermined for each filter coefficient, to determine the level of the timer count, and
 a modifying means for multiplying the corresponding filter coefficient by a plurality of factors according to the level of the timer count, and outputting the multiplied filter coefficient to said convolution calculating means,
 said reference levels and said factors being predetermined so that said multiplied filter coefficients which are supplied to said convolution calculation means instead of the filter coefficients, gradually increase from zero to the whole values of the filter coefficients.

76. An adaptive digital filter according to claim 61, further comprising
 a stability condition monitoring means for determining whether or not a stability condition $$K < 2r/I \cdot X_j(m)^2$$

is satisfied, where I is the number of the filter coefficients, K is said coefficient correction constant, r is said value in the divider, $X_j(m)$ is the sampled input signal which have been sampled $(m-1)$ cycles before the current time j, and
 a stop control means for generating a stop control signal which stops the operation of the adaptive digital filter when said stability condition is not satisfied.

* * * * *